(12) United States Patent
Popovic

(10) Patent No.: US 8,111,994 B2
(45) Date of Patent: Feb. 7, 2012

(54) BALANCED BYPASS CIRCULATORS AND FOLDED UNIVERSALLY-BALANCED INTERFEROMETERS

(75) Inventor: Milos Popovic, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 872 days.

(21) Appl. No.: 11/840,028

(22) Filed: Aug. 16, 2007

(65) Prior Publication Data

US 2008/0044184 A1    Feb. 21, 2008

Related U.S. Application Data

(60) Provisional application No. 60/838,005, filed on Aug. 16, 2006.

(51) Int. Cl.
| | |
|---|---|
| G02F 1/03 | (2006.01) |
| G02B 6/26 | (2006.01) |
| G02B 6/28 | (2006.01) |
| G02B 6/34 | (2006.01) |

(52) U.S. Cl. .......... 398/82; 398/79; 385/2; 385/16; 385/18; 385/24; 385/37; 385/140; 359/247

(58) Field of Classification Search .......... 398/82; 359/608, 618; 250/227.27
See application file for complete search history.

(56) References Cited

U.S. PATENT DOCUMENTS

| | | | |
|---|---|---|---|
| 3,558,213 A | 1/1971 | Marcatili | |
| 4,142,775 A | 3/1979 | Ramaswamy et al. | |
| 4,679,893 A | 7/1987 | Ramer | |
| 4,781,424 A | 11/1988 | Kawachi et al. | |
| 4,852,117 A | 7/1989 | Po | |
| 5,371,817 A | 12/1994 | Revelli, Jr. et al. | |
| 5,418,868 A | 5/1995 | Cohen et al. | |
| 5,592,500 A | 1/1997 | Shirasaki | |
| 5,625,403 A | 4/1997 | Hazman | |
| 5,900,637 A | 5/1999 | Smith | |
| 6,025,943 A | 2/2000 | Meekers et al. | |
| 6,031,957 A | 2/2000 | Suzuki et al. | |
| 6,052,495 A | 4/2000 | Little et al. | |
| 6,157,765 A | 12/2000 | Bruce et al. | |
| 6,289,151 B1 * | 9/2001 | Kazarinov et al. | 385/32 |
| 6,351,575 B1 | 2/2002 | Gampp et al. | |
| 6,442,311 B1 | 8/2002 | Barbarossa et al. | |
| 6,480,644 B1 * | 11/2002 | MacDonald | 385/16 |
| 6,529,277 B1 | 3/2003 | Weitekamp | |
| 6,563,631 B2 | 5/2003 | Delprat et al. | |
| 6,636,669 B1 | 10/2003 | Chin et al. | |

(Continued)

FOREIGN PATENT DOCUMENTS

EP    0646832    4/1995

(Continued)

OTHER PUBLICATIONS

Invitation to Pay Additional Fees for corresponding PCT Application No. PCT/US2007/018207, mailed Jun. 2, 2008, 5 pages.

(Continued)

Primary Examiner — Shi K Li
Assistant Examiner — Oommen Jacob
(74) Attorney, Agent, or Firm — Goodwin Procter LLP

(57) ABSTRACT

The invention generally relates, in one aspect, to an interferometer system. The interferometer system includes a splitter/combiner element (SCE), a first bi-directional optical path, and a second bi-directional optical path.

20 Claims, 41 Drawing Sheets

U.S. PATENT DOCUMENTS

| | | | |
|---|---|---|---|
| 6,668,111 B2 | 12/2003 | Tapalian et al. | |
| 6,690,871 B2 | 2/2004 | Lee et al. | |
| 6,711,200 B1 | 3/2004 | Scherer et al. | |
| 6,829,269 B2 | 12/2004 | Goodhue et al. | |
| 6,839,482 B2 | 1/2005 | Margalit et al. | |
| 6,847,750 B1 | 1/2005 | Baumann et al. | |
| 6,947,632 B2 | 9/2005 | Fischer | |
| 7,062,126 B2 | 6/2006 | Kersey et al. | |
| 7,102,469 B2 | 9/2006 | Kim et al. | |
| 7,110,632 B2 | 9/2006 | Abeles | |
| 7,123,800 B2 | 10/2006 | Kaplan | |
| 7,145,660 B2 | 12/2006 | Margalit et al. | |
| 7,149,378 B2 | 12/2006 | Baumann et al. | |
| 7,164,838 B2 | 1/2007 | Blauvelt et al. | |
| 7,200,308 B2 | 4/2007 | Hochberg et al. | |
| 7,215,848 B2 | 5/2007 | Tan et al. | |
| 7,292,751 B2 | 11/2007 | Popovic | |
| 7,339,724 B2 | 3/2008 | Hochberg et al. | |
| 7,424,192 B2 | 9/2008 | Hochberg et al. | |
| 7,450,811 B2 | 11/2008 | Hashimoto | |
| 7,539,375 B2 | 5/2009 | Popovic | |
| 7,643,714 B2 | 1/2010 | Hochberg et al. | |
| 7,973,265 B2 | 7/2011 | Chu et al. | |
| 2001/0040681 A1 | 11/2001 | Paiam et al. | |
| 2001/0046344 A1 | 11/2001 | Hayashi et al. | |
| 2002/0067540 A1* | 6/2002 | Delprat et al. | 359/344 |
| 2002/0076188 A1 | 6/2002 | Kimerling et al. | |
| 2002/0122648 A1 | 9/2002 | Mule' et al. | |
| 2002/0136481 A1 | 9/2002 | Mule' et al. | |
| 2002/0172466 A1 | 11/2002 | Baumann et al. | |
| 2002/0181829 A1 | 12/2002 | Margalit et al. | |
| 2003/0015770 A1 | 1/2003 | Talin et al. | |
| 2003/0128922 A1 | 7/2003 | Kolodziejski et al. | |
| 2003/0138178 A1 | 7/2003 | Kimerling et al. | |
| 2003/0156780 A1 | 8/2003 | Margalit et al. | |
| 2003/0174974 A1* | 9/2003 | Yasuda et al. | 385/80 |
| 2003/0210860 A1 | 11/2003 | Margalit | |
| 2003/0219052 A1 | 11/2003 | Goodhue et al. | |
| 2004/0008942 A1 | 1/2004 | Scheuer et al. | |
| 2004/0008968 A1 | 1/2004 | Lee et al. | |
| 2004/0013355 A1 | 1/2004 | Margalit | |
| 2004/0042726 A1* | 3/2004 | Kersey et al. | 385/37 |
| 2004/0056243 A1 | 3/2004 | Atanackovic et al. | |
| 2004/0114899 A1 | 6/2004 | Mattsson | |
| 2004/0156580 A1* | 8/2004 | Baumann et al. | 385/16 |
| 2004/0161188 A1 | 8/2004 | Su et al. | |
| 2004/0264905 A1 | 12/2004 | Blauvelt et al. | |
| 2005/0029536 A1 | 2/2005 | Sugitatsu et al. | |
| 2005/0036737 A1 | 2/2005 | Stuart | |
| 2005/0068602 A1 | 3/2005 | Tormen et al. | |
| 2005/0077526 A1 | 4/2005 | Shin et al. | |
| 2005/0147348 A1* | 7/2005 | Grunnet-Jepsen et al. | 385/37 |
| 2005/0163418 A1 | 7/2005 | Wong et al. | |
| 2005/0169566 A1 | 8/2005 | Takahashi | |
| 2005/0196103 A1 | 9/2005 | Kaplan | |
| 2005/0255619 A1 | 11/2005 | Negro et al. | |
| 2005/0259937 A1 | 11/2005 | Whaley et al. | |
| 2005/0275921 A1* | 12/2005 | Haus et al. | 359/247 |
| 2006/0008272 A1* | 1/2006 | Abeles | 398/48 |
| 2006/0029325 A1 | 2/2006 | Fardi et al. | |
| 2006/0034569 A1* | 2/2006 | Shih et al. | 385/39 |
| 2006/0083456 A1 | 4/2006 | Burns et al. | |
| 2006/0134535 A1 | 6/2006 | Porque | |
| 2006/0198566 A1 | 9/2006 | Watts | |
| 2006/0239614 A1 | 10/2006 | Montgomery et al. | |
| 2006/0274995 A1 | 12/2006 | Lee et al. | |
| 2006/0291791 A1 | 12/2006 | Hochberg et al. | |
| 2007/0035800 A1 | 2/2007 | Hochberg et al. | |
| 2007/0133934 A1 | 6/2007 | Blauvelt et al. | |
| 2007/0211992 A1 | 9/2007 | Chu et al. | |
| 2007/0230867 A1* | 10/2007 | Chen et al. | 385/24 |
| 2007/0253663 A1 | 11/2007 | Keyser et al. | |
| 2008/0002992 A1 | 1/2008 | Hochberg et al. | |
| 2008/0013876 A1 | 1/2008 | Gill et al. | |
| 2008/0014534 A1 | 1/2008 | Barwicz et al. | |
| 2008/0199123 A1 | 8/2008 | Pan et al. | |
| 2008/0266639 A1 | 10/2008 | Melloni et al. | |
| 2008/0273835 A1 | 11/2008 | Popovic | |
| 2009/0022445 A1 | 1/2009 | Hochberg et al. | |
| 2009/0028567 A1 | 1/2009 | Socci et al. | |
| 2009/0032805 A1 | 2/2009 | Ty Tan et al. | |
| 2009/0087137 A1 | 4/2009 | Doan | |
| 2009/0220228 A1 | 9/2009 | Popovic | |
| 2009/0239323 A1 | 9/2009 | Tan et al. | |
| 2009/0256136 A1 | 10/2009 | Tan et al. | |
| 2009/0314763 A1 | 12/2009 | Chu et al. | |
| 2010/0002994 A1 | 1/2010 | Baehr-Jones et al. | |
| 2010/0209038 A1 | 8/2010 | Popovic et al. | |

FOREIGN PATENT DOCUMENTS

| | | |
|---|---|---|
| EP | 0726627 | 8/1996 |
| EP | 0909963 | 4/1999 |
| EP | 1024378 | 8/2000 |
| EP | 1241497 | 9/2002 |
| EP | 1717616 | 11/2006 |
| EP | 1785771 | 5/2007 |
| JP | 2001-194160 A | 7/2001 |
| WO | WO-85/01123 | 3/1985 |
| WO | WO-00/50938 | 8/2000 |
| WO | WO-01/23955 | 4/2001 |
| WO | WO-01/55814 | 8/2001 |
| WO | WO-01/88580 | 11/2001 |
| WO | WO-01/96913 | 12/2001 |
| WO | WO-02/17004 | 2/2002 |
| WO | WO-02/063389 | 8/2002 |
| WO | WO-02/101421 | 12/2002 |
| WO | WO-03/036841 | 5/2003 |
| WO | WO-03/043247 | 5/2003 |
| WO | WO-2005/010618 | 2/2005 |
| WO | WO-2005/036793 | 4/2005 |
| WO | WO-2005/104147 | 11/2005 |
| WO | WO-2005/106551 | 11/2005 |
| WO | WO-2006/025760 | 3/2006 |
| WO | WO-2006/076585 | 7/2006 |
| WO | WO-2007/014218 | 2/2007 |
| WO | WO-2007/067165 | 6/2007 |
| WO | WO-2007/084600 | 7/2007 |
| WO | WO-2007/086888 | 8/2007 |
| WO | WO-2008/005061 | 1/2008 |
| WO | WO-2009/017769 | 2/2009 |

OTHER PUBLICATIONS

International Search Report for corresponding PCT Application No. PCT/US2007/018207, mailed Jul. 29, 2008, 5 pages.

Written Opinion for corresponding PCT Application No. PCT/US2007/018207, mailed Jul. 29, 2008, 8 pages.

Campbell et. al., "GaAs Electro-optic directional-coupler switch," Applied Physics Letters, vol. 27, No. 4, (Aug. 1975), pp. 202-205.

Findakly et al., "On the Crosstalk of Reversed-$\Delta\beta$ Directional Coupler Switches," Journal of Lightwave Technology, vol. 6, No. 1, (Jan. 1988), pp. 36-40.

Haus et al., "Elimination of cross talk in optical directional couplers," Applied Physics Letters, vol. 46, No. 1, (Jan. 1, 1985), pp. 1-3.

Haus et al., "Broadband hitless bypass switch for integrated photonic circuits," IEEE Photon Technol. Lett., vol. 18, No. 10, (May 15, 2006), pp. 1137-1139.

Kogelnik et al., "Switched Directional Couplers with Alternating $\Delta\beta$," IEEE Journal of Quantum Electronics, QE-12, No. 7, (Jul. 1976), pp. 396-401.

Korotky, "Three-Space Representation of Phase-Mismatch Switching in Coupled Two-State Optical Systems," IEEE J. Quantum Electronics, vol. QE-22, No. 6, (Jun. 1986), pp. 952-958.

Madsen et al., "A Multi-Port Add/Drop Router Using UV-Induced Gratings in Planar Waveguides," Lucent Technologies, Bell Labs Innovations, ThH3-1, (Feb. 1999), pp. 104-106.

Madsen et al., "Hitless Reconfigurable Add/Drop Multiplexers Using Bragg Gratings in Planar Waveguides," OSA TOPS, vol. 29, WDM Components, pp. 54-60.

Oda et al., "A Wide-FSR Waveguide Double-Ring Resonator for Optical FDM Transmission Systems" Journal of Lightwave Technology, vol. 9, No. 6, (Jun. 1991), pp. 728-736.

Papuchon et al., "Electrically switched optical directional coupler: Cobra," Applied Physics Letters, vol. 27, No. 5, (Sep. 1, 1975), pp. 289-291.

Popovic et al., "General approach to hitless switching and FSR extension resonators in integrated photonic circuits" Paper OWI66, 2006 Optical Fiber Communication Conference and National Fiber Optic Engineers Conference IEEE, Piscataway, NJ, USA, (Mar. 5, 2006), 3 pages.

Scotti et al., "A Hitless Reconfigurable Add/Drop Multiplexer for WDM Networks Utilizing Planar Waveguides, Thermo-Optic Switches and UV-Induced Gratings," Lucent Technologies, Bell Labs, OFC '98 Technical Digest, (Feb. 1998), pp. 142-143.

Sugimoto et al., "Waveguide polarization-independent optical circulator" IEEE Photon Technol. Lett., vol. 11, No. 3, pp. 355-357, (Mar. 1999), pp. 355-357.

Tormen, Maurizo, "Passive Optical Integrated Components for Telecommunication" Thesis, Université de Nice-Sopia Antipolis, Institute Non-Lineairé de Nice, UFR Sciences, Ecole Doctorale de Physique, (Nov. 2003), pp. 1-196.

Weber et al., "Crosstalk and Switching Characteristics in Directional Couplers," IEEE Journal of Quantum Electronics, vol. 24, No. 3, (Mar. 1988), pp. 537-548.

Yanagase et al., "Box-Like Filter Response and Expansion of FSR by a Vertically Triple Coupled Microring Resonator Filter" Journal of Lightwave Technology, vol. 20, No. 8, (Aug. 2002), pp. 1525-1529.

Altug et al. "Ultrafast Photonic Crystal Nanocavity Laser," Nature Physics 2, 2006, pp. 484-488.

Badolato et al. "Deterministic Coupling of Single Quantum Dots to Single Nanocavity Modes," Science 308, 2005, pp. 1158-1161.

Baehr-Jones et al. "High-Q Ring Resonators in Thin Silicon-on-Insulator," 85 Appl. Phys. Lett. 16, Oct. 2004, pp. 3346-3347.

Barbarossa et al. "Novel Double-Ring Optical-Guided-Wave Vernier Resonator," 144 IEEE Proc.-Optoelectron. 4, Aug. 1997, pp. 203-208.

Barbarossa et al. "Theoretical Analysis of Triple-Coupler Ring-Based Optical Guided-Wave Resonator," 13 J. Lightwave Tech. 2, Feb. 1995, pp. 148-157.

Barbarossa et al. "Triple-Coupler Ring-Based Optical Guided-Wave Resonator," 30 IEEE Electronics Lett. 2, Jan. 20, 1994, pp. 131-133.

Barwicz et al. "Polarization-transparent microphotonic devices in the Strong Confinement Limit," Nature Photonics 1, Jan. 2007, pp. 57-60.

Barwicz "3D analysis of scattering losses due to sidewall roughness in microphotonic waveguides: high index-contrast," 2005 Conf. on Lasers and Electro-Optics (CLEO), 2005, vol. 2, pp. 1333-1335.

Batten et al. "Building Manycore Processor-to-DRAM Networks with Monolithic CMOS Si Photonics," IEEE Micro, Jul. 2009, p. 8-21.

Becker et al. "Optical Properties of Semiconductors. III. Infra-red Transmission of Silicon," 76 Physical Rev. A, 1949, pp. 1531-1532.

Bethe "Theory of Diffraction by Small Holes," 66 Phys. Rev. 7-8, Oct. 1944, pp. 163-182.

Bogaerts et al. "Low-loss, low-cross-talk crossings for silicon-on-insulator nanophotonic waveguides," 32 Optics Letters 19, 2007, pp. 2801-2803.

Bozhevolnyi et al. "Channel Plasmon Subwavelength Waveguide Components Including Interferometers and Ring Resonators," Nature 440, 2006, pp. 508-511.

Bustillo et al. "Surface Micromachining for Microelectromechanical Systems," Proc. of the IEEE 86, 1998, pp. 1552-1574.

Chan et al. "Single-mode and Polarization-independent Silicon-on-insulator waveguides with Small Cross Section," 23 J. Lightwave Tech. 6, Jun. 2005, pp. 2103-2111.

Chen et al. "Low-loss multimode-interference-based crossings for Silicon Wire Waveguides," 18 IEEE Photonics Letters 21, 2006, pp. 2260-2262.

Chremmos et al. "Properties of Regular Polygons of Coupled Microring Resonators," 46 Applied Optics Optical Society of America 31, Nov. 1, 2007, pp. 7730-7738.

Chuang, Physics of Optoelectronic Devices, Wiley, NY, 1995, 3 pages.

Daldosso et al. "Comparison Among Various Si3N4 Waveguide Geometries Grown within a CMOS Fabrication Pilot Line," 22 J. Lightwave Tech. 7, Jul. 2004, pp. 1734-1740.

Daldosso et al. "Fabrication and Optical Characterization of thin two-dimensional Si3N4 Waveguides," Mat. Sci. in Semicond. Proc. 7, 2004, pp. 453-58.

Darmawan et al. "Nested Ring Mach-Zender Interferometer," 15 Optics Express Opt. Soc. America 2, Jan. 2001, pp. 437-448.

DeVaux et al. "High-Speed Tandem of MQW Modulators for Coded Pulse Generation With 14-DB Fiber-to-Fiber Gain," 8 IEEE Photonics Tech. Lett. 2, Feb. 1996, pp. 218-220.

Doerr et al. "Wavelength Add-Drop Node Using Silica Waveguide Integration," 22 J. Lightwave Tech. 12, Dec. 2004, pp. 2755-2762.

Domash et al. "Tunable and Switchable Multiple-Cavity Thin Film Filters," 22 J. Lightwave Tech. 1, Jan. 2004, pp. 126-135.

Dumon et al. "Low-loss photonic wires and compact ring resonators in silicon-on-insulator," 5450 Proc. SPIE 1, 2004, pp. 360-368.

Eichenfield et al. "Actuation of Micro-optomechanical Systems via Cavity-enhanced Optical Dipole Forces," 1 Nature Photonics 7, 2007, pp. 416-422.

Espinola et al. "Fast and Low-Power Thermooptic Switch on Thin Silicon-on-Insulator," 15 IEEE Photon. Tech. Lett. 10, 2003, pp. 1366-1368.

Fan et al. "Theoretical Analysis of Channel Drop Tunneling Processes," 59 Phys. Rev. B 2, Jun. 15, 1999, pp. 15882-15892.

Geuzebroek et al. "Thermally Tuneable, Wide FSR Switch based on Micro-ring Resonators," Proc. Symp. IEEE/LEOS Benelux Chapter, 2002, pp. 155-158.

Gheorma et al. "Fundamental Limitations of Optical Resonatory Based High-Speed EO Modulators," IEEE Photon. Tech. Lett. vol. 14, No. 6, 2002, pp. 795-797.

Goebuchi et al. "Fast and Stable Wavelength-Selective Switch Using Double-Series Coupled Dielectric Microring Resonator," 18 IEEE Photonics Tech. Lett. 3, Feb. 1, 2006, pp. 538-540.

Green et al. "Ultra-compact, low RF power, 10 Gb/s silicon Mach-Zehnder modulator" Optics Express 15, 2007, 17106-17113.

Green et al. "Optical modulation using anti-crossing between paired amplitude and phase resonators," Optics Express 15, 2007, pp. 17264-17272.

Gritsenko et al. "Short-range order in non-stoichiometric amorphous silicon oxynitride and silicon-rich nitride," 297 J. Non-Crystalline Solids 1, Jan. 2002, pp. 96-101.

Gunn "CMOS Photonics for High-Speed Interconnects," IEEE Micro 26 (2), Mar./Apr. 2006, pp. 58-66.

Guo et al. "Characterization of Si3N4/SiO2 Planar Lightwave Circuits and Ring Resonators," Proc. of SPIE, vol. 5350, 2004, pp. 13-22.

Guo et al. "High-Q Microring Resonator for Biochemical Sensors," 5728 Proc. SPIE, 2005, pp. 83-92.

Gupta et al. "Cascaded Over- and Under-Coupled Resonators (COUR): Reducing Group Delay Dispersion and Overcoming the Sensitivity-Bandwidth Trade-off," Conf. on Lasers and Electro-Optics (CLEO), 2008, paper CTuNN5, pp. 1604-1605.

Haus, Waves and Fields in Optoelectronics, Prentice-Hall, Englewood Cliffs, NJ, 1984, 5 pages.

Holzwarth et al. "High Speed analog-to-digital conversion with silicon photonics," in Proc. SPIE 7220, 2009, 72200B, pp. 1-15.

Holzwarth et al. "Localized Substrate Removal Technique Enabling Strong-Confinement Microphotonics in Bulk Si CMOS Processes," CLEO/QELS, May 4-9, 2008, 2 pages.

In et al. "Origami Fabrication of Nanostructured, Three-dimensional Devices: Electrochemical Capacitors with Carbon Electrodes," Appl. Phys. Lett. 88, 2006, 83104, 3 pages.

Jackson, Classical Electrodynamics, Wiley, NY, 1999, 2 pages.

Johnson et al. "Perturbation Theory for Maxwell's Equations with Shifting Boundaries," Phys. Rev. E, 65, 2002, 066611, 7 pages.

Kelly et al. "Monolithic Suspended Optical Waveguides for InP MEMS," 16 IEEE Photonics Tech. Letters 5, 2004, pp. 1298-1300.

Khan et al. "Mode-Coupling Analysis of Multipole Symmetric Resonant Add/Drop Filters," 35 IEEE J. of Quantum Elec. 10, Oct. 1999, pp. 1451-1460.

Khurgin et al. "Expanding the Bandwidth of Slow-Light Photonic Devices Based on Coupled Resonators," 30 Optics Lett. 5, Mar. 1, 2005, pp. 513-515.

Kippenberg et al. "Analysis of Radiation-pressure Induced Mechanical Oscillation of an Optical Microcavity," Phys. Rev. Lett. 95, 2005, 033901, pp. 1-12.

Lee et al. "MEMS-Actuated Microdisk Resonators with Variable Power Coupling Ratios," 17 IEEE Photonics Tech. Lett. 5, May 2005, pp. 1034-1036.

Lee et al. "Tunable Coupling Regimes of Silicon Microdisk Resonators using MEMS Actuators," 14 Optics Express 11, May 29, 2006, pp. 4703-4712.

Li et al. "Coupled-ring-resonator-based silicon modulator for enhanced performance," Optics Express 16, 2008, pp. 13342-13348.

Little et al. "Filter Synthesis for Periodically Coupled Microring Resonators," 25 Optics Lett. 5, Mar. 1, 2000, pp. 344-346.

Little et al. "Microring Resonator Channel Dropping Filters," J. Lightwave Tech. 15, 1997, pp. 998-1005.

Little et al. "Very High-order Microring Resonator Filters for WDM Applications," 16 IEEE Photonics Tech. Lett. 10, Oct. 2004, pp. 2263-2265.

Little et al. "Wavelength Switching and Routing using Absorption and Resonance," 10 IEEE Photonics Tech. Lett. 6, Jun. 1998, pp. 816-818.

Liu et al. "Low-loss waveguide crossing using a multimode interference structure," 241 Optics Communications 1-3, 2004, pp. 99-104.

Maboudian et al. "Critical Review: Adhesion in Surface Micromechanical Structures," J. Vac. Sci. Tech. B, 15, 1997, pp. 1-20.

Madsen et al., Optical Filter Design and Analysis: A Signal Processing Approach, Wiley, NY, 1999, 18 pages.

Madsen "Efficient Architectures for Exactly Realizing Optical Filters with Optimum Bandpass Designs," 10 IEEE Photonics Tech. Lett. 8, Aug. 1998, pp. 1136-1138.

Manolatou et al. "Coupling of Modes Analysis of Resonant Channel Add-Drop Filters," 35 IEEE J. of Quantum Elec. 9, Sep. 1999, pp. 1322-1331.

Manolatou et al. "High-Density Integrated Optics," 17 J. Lightwave Tech. 9, Sep. 1999, pp. 1682-1692.

McDonald "Electric and Magnetic Coupling through Small Apertures in Shield Walls of any Thickness," MTT-20 IEEE Trans. on Microwave Theory & Techniques 10, Oct. 1972, pp. 689-695.

Melchiorri et al. "Propagation Losses of Silicon Nitride Waveguides in the Near Infrared Range," Appl. Phys. Lett. 86, 2005, 121111, 13 pages.

Melloni et al. "Synthesis of Direct-Coupled-Resonators Bandpass Filters for WDM Systems Lightwave Technology," 20 J. Lightwave Tech. 2, 2002, pp. 296-303.

Melloni et al. "Three-Arm Mach-Zehnder Interferometers," in Integrated Photonics Research and Applications/Nanophotonics, Technical Digest (CD), Optical Society of America, 2006, paper IMC1, 3 pages.

Mizrahi et al., "Mirror Manipulation by Attractive and Repulsive Forces of Guided Waves," Opt. Express 13, 2005, pp. 9804-9811.

Mizrahi et al. "Two Slab Optical Spring," Optics Lett. 32, 2007, pp. 692-694.

Nichol et al. "Thin Membrane Self-alignment using Nanomagnets for Three-dimensional Nanomanufacturing," J. Vac. Sci. Tech B (Microelectronics & Nanometer Structures) 24, 2006, pp. 3128-3132.

Nichols et al. "A Preliminary Communication on the Pressure of Heat and Light Radiation," Phys. Rev. 13, 1901, pp. 307-320.

Nielson et al. "Integrated Wavelength-selective Optical MEMS Switching using Ring Resonator Filters," IEEE Photonics Tech. Lett. 17, 2005, pp. 1190-1192.

Nielson, "Micro-opto-mechanical Switching and Tuning for Integrated Optical Systems," Ph.D. Thesis, Massachusetts Institute of Technology, 2004, 259 pages.

Notomi et al. "Optomechanical Wavelength and Energy Conversion in High-Q Double-layer Cavities of Photonic Crystal Slabs," Phys. Rev. Lett. 97, 2006, 023903, 4 pages.

Okamoto, Fundamentals of Optical Waveguides, Elsevier Academic Press, MA, 2006, 2 pages.

Philipp et al. "Amorphous Silicon Rich Silicon Nitride Optical Waveguides for High Density Integrated Optics," 40 IEEE Electronics Letters 7, Apr. 2004, pp. 419-420.

Poon et al. "Wavelength-selective reflector based on a circular array of coupled microring resonators," 16 IEEE Photonics Technology Letters 5, May 2004, pp. 1331-1333.

Popovic et al. "High-index-contrast, Wide-FSR Microring-Resonator Filter Design and Realization with Frequency-shift Compensation," in Optical Fiber Communication Conf., Tech. Dig.,2005, Paper OFK1, vol. 5, pp. 213-215.

Popovic et al. "Multistage High-Order Microring-Resonator add-drop Filters," 31 Optics Lett. 17, Sep. 2006, pp. 2571-2573.

Popovic et al. "Coupling-induced resonance frequency shifts in coupled dielectric multi-cavity filters", Optics Express 14, Feb. 2006, pp. 1208-1222.

Popovic "Air Trenches for Dense Silica Integrated Optics," MS Thesis, Massachusetts Institute of Technology, Dept. of Electrical Engineering & Computer Science, Feb. 2002, pp. 1-135.

Popovic "Optimally efficient resonance-tuned optical modulators," in CLEO 2009, paper CTuV6, May 2009, 2 pages.

Popovic "Resonant optical modulators beyond conventional energy-efficiency and modulation frequency limitations," Integrated Photonics Research, Silicon and Nanophotonics (IPRSN), Monterey, CA, Jul. 25, 2010, 3 pages.

Popovic "Theory and Design of High-Index-Contrast Microphotonic Circuits," Ph.D. Thesis, Massachusetts Institute of Technology, Dept. of Electrical Engineering & Computer Science, Feb. 2008, 358 pages.

Popovic "Complex-Frequency Leaky Mode Computations using PML Boundary Layers for Dielectric Resonant Structures," Proc. of Integ. Photonics Res., Jun. 2003, 3 pages.

Povinelli et al. "Enhancement mechanisms for optical forces in integrated optics," Proc. of SPIE Optical Trapping & Optical Manip. III 15, vol. 6326, 2006, 632609, 8 pages.

Povinelli et al. "Evanescent-wave Bonding Between Optical Waveguides," Optics Lett. 30, 2005, pp. 3042-3044.

Povinelli et al. "High-Q Enhancement of Attractive and Repulsive Optical Forces between Coupled Whispering-gallery-mode Resonators," Opt. Express 13, 2005, pp. 8286-8295.

Preston et al. "High-Speed All-Optical Modulation Using Polycrystalline Silicon Microring Resonators," Applied Physics Letters, vol. 92, No. 15, Apr. 15, 2008, pp. 151104, 3 pages.

Qi et al. "A Three-dimensional Optical Photonic Crystal with Designed Point Defects," Nature 429, 2004, pp. 538-542.

Rabiei et al. "Polymer Micro-Ring Filters and Modulators," J. Lightwave Tech. vol. 20, No. 11, 2002, pp. 1968-1975.

Rakich et al. "Achieving Centimeter-scale supercollimation in a Large-area Two-dimensional Photonic Crystal," Nature Materials 5, 2006, pp. 93-96.

Rakich et al. "Cavity-Trapping via Optical-forces in Integrated Photonics," Massachusetts Institute of Technology, Research Laboratory of Electronics, 2006, 18 pages.

Rakich et al. "Trapping, corraling and spectral bonding of optical resonances through optically induced potentials," Nature Photonics, vol. 1, Nov. 2007, pp. 658-665.

Rakich et al. "Ultrawide Tuning of Photonic Microcavities via Evanescent Field Perturbation," Optics Lett. 31, 2006, pp. 1241-1243.

Rezzonico et al. "Electro-optic Charon polymeric microring modulators," Optics Express 16, 2008, pp. 613-627.

Rhodes "A Low-Pass Filter Prototype Network for Microwave Linear Phase Filters," MTT-18 IEEE Trans. Microwave Theory Tech. 6, Jun. 1970, pp. 290-301.

Sacher et al. "Dynamics of microring resonator modulators," Optics Express 16, 2008, pp. 15741-15753.

Sarid, Scanning Force Microscopy with Applications to Electric, Magnetic, and Atomi Forces, Oxford University Press, NY, 1994., 2 pages.

Saynatjoki et al. "High-index-contrast Optical Waveguides on Silicon," ICPS-27, 2005, 2 pages.

Song et al. "Ultra-high-Q Photonic Double-heterostructure Nanocavity," Nature Materials 4, 2005, pp. 207-210.

Spector et al. "Hybrid multi-mode/single-mode Waveguides for Low Loss," Massachusetts Institute of Technology, OAA/IPR, 2004, 3 pages.

Srinivasan et al. "Alkyltrichlorosilane-based Self-assembled Monolayer Films for Stiction Reduction in Silicon Micromachines," J. of Microelectromechanical Sys. 7, 1998, pp. 252-260.

Suh et al. "Temporal Coupled-Mode Theory and the Presence of Non-Orthogonal Modes in Lossless Multimode Cavities," 40 IEEE J. of Quantum Elec. 10, Oct. 2004, pp. 1511-1518.

Takahashi et al. "Tunable Chromatic Dispersion Compensator Utilizing Silica Waveguide Ring Resonator having Mach-Zehnder Interferometric Variable Coupler Eliminating Crossing Point of Waveguides," 15th Annual Meeting of IEEE Lasers and Electro-Optics Society, v.2, Nov. 10-14, 2002, pp. 665-666.

Tang et al. Highly efficient optical phase modulator in SOI waveguides, 31 Electronics Letters 6, 1995, pp. 451-452.

Van Spengen et al. "A Physical Model to Predict Stiction in MEMS," J. of Micromechanics & Microengineering 12, 2002, pp. 702-713.

Watts et al. "Maximally Confined Silicon Microphotonic Modulators and Switches," IEEE Proc. of the LEOS Ann. Meet., p paper WF1, 2008, pp. 457-458.

Wei et al. "Compound Ring Resonator with Double Couplers," 186 Optics Communications 4-6, Dec. 15, 2000, pp. 283-290.

Williamson "Sensitivity-bandwidth product for electro-optic modulators," Optics Letters 26, 2001, pp. 1362-1363.

Xu et al. "Experimental Realization of an on-Chip All-Optical Analogue to Electromagnetically Induced Transparency," Phys. Rev. Lett. 96, 2006, pp. 1-4.

Xu et al. "Micrometre-scale silicon electro-optic modulator," Nature, vol. 435, 2005, pp. 325-327.

Yanik et al. "Stopping Light All Optically," 92 Phy. Rev. Lett. 8, Feb. 27, 2004, pp. 1-4.

Yariv et al. "Coupled-Resonator Optical Waveguide: a Proposal and Analysis," 24 Optics Lett. 11, Jun. 1, 1999, pp. 711-713.

Examination Report in European Patent Application No. 04786154.7, mailed Jul. 16, 2008, 3 pages.

International Search Report for PCT Application No. PCT/US06/028848, mailed Feb. 7, 2008, 3 pages.

Written Opinion for PCT Application No. PCT/US06/028848, mailed Feb. 7, 2008, 7 pages.

International Search Report for PCT Application No. PCT/US2007/026513, mailed Jun. 19, 2008, 2 pages.

Written Opinion for PCT Application No. PCT/US2007/026513, mailed Jun. 19, 2008, 10 pages.

International Search Report for PCT Application No. PCT/US2008/003957, mailed Sep. 29, 2009, 6 pages.

Written Opinion for PCT Application No. PCT/US2008/003957, mailed Sep. 29, 2009, 10 pages.

International Search Report for PCT Application No. PCT/US2005/043762, mailed Jun. 19, 2008, 3 pages.

Written Opinion for PCT Application No. PCT/US2005/043762, mailed Jun. 19, 2008, 6 pages.

International Search Report for PCT Application No. PCT/US2007/015740, mailed Feb. 18, 2008, 3 pages.

Written Opinion for PCT Application No. PCT/US2007/015740, mailed Feb. 18, 2008, 6 pages.

International Search Report for PCT Application No. PCT/US2008/003300, mailed Oct. 14, 2008, 6 pages.

Written Opinion for PCT Application No. PCT/US2008/003300, mailed Oct. 14, 2008, 10 pages.

International Search Report for PCT Application No. PCT/US2008/080749, mailed May 25, 2009, 5 pages.

Written Opinion for PCT Application No. PCT/US2008/080749, mailed May 25, 2009, 9 pages.

International Search Report for PCT Application No. PCT/US2008/082054, mailed Mar. 18, 2009, 2 pages.

Written Opinion for PCT Application No. PCT/US2008/082054, mailed Mar. 18, 2009., 6 pages.

International Search Report for PCT Application No. PCT/US2009/041668, mailed Sep. 11, 2009, 3 pages.

Written Opinion for PCT Application No. PCT/US2009/041668, mailed Sep. 11, 2009, 5 pages.

International Search Report for PCT Application No. PCT/US2009/066537, mailed Apr. 16, 2010, 3 pages.

Written Opinion for PCT Application No. PCT/US2009/066537, mailed Apr. 16, 2010, 9 pages.

International Search Report for PCT Application No. PCT/US2010/036630, mailed Sep. 15, 2010, 4 pages.

Written Opinion for PCT Application No. PCT/US2010/036630, mailed Sep. 15, 2010, 3 pages.

* cited by examiner

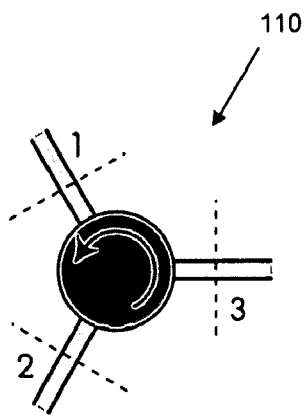
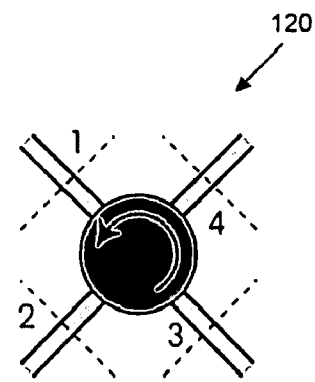
FIG. 10
FIG. 11
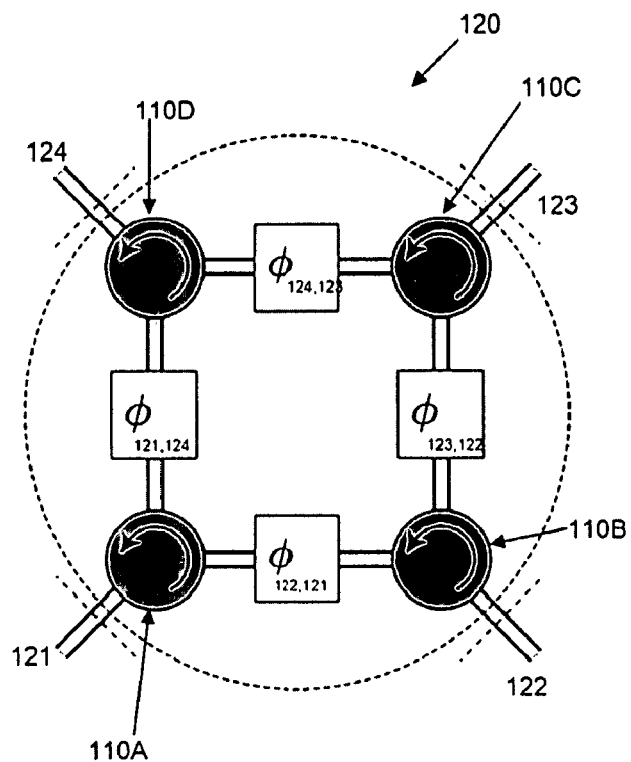
FIG. 12

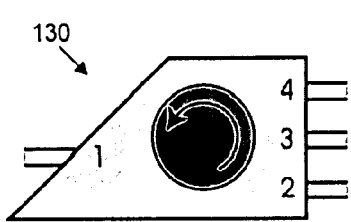
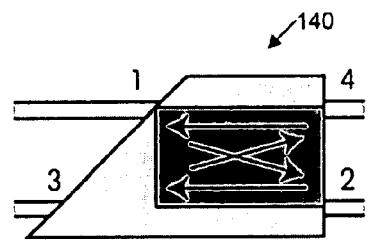
FIG. 13     FIG. 14
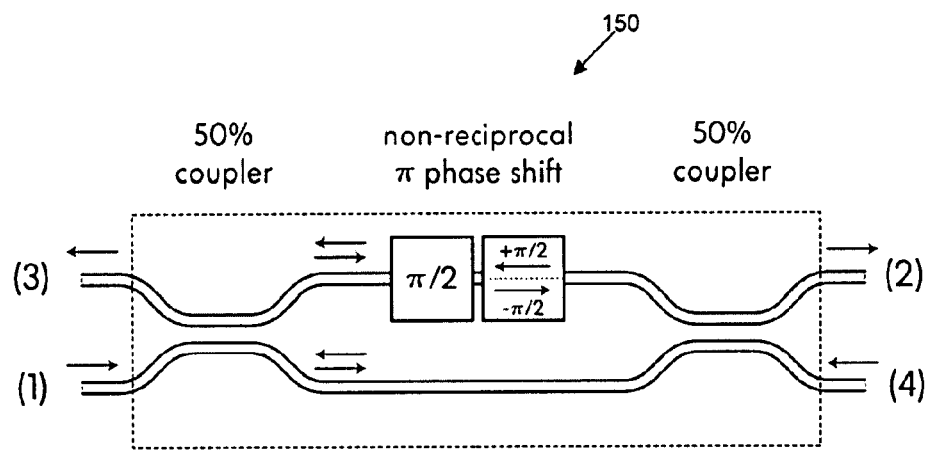
FIG. 15
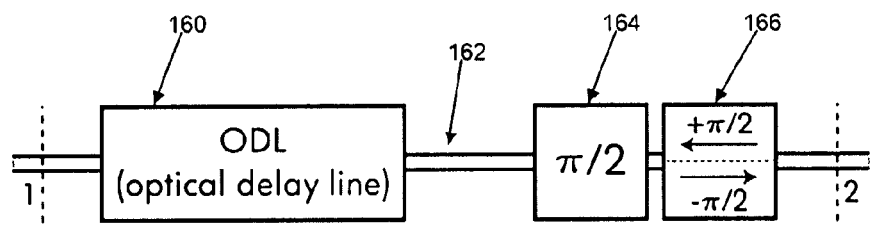
FIG. 16

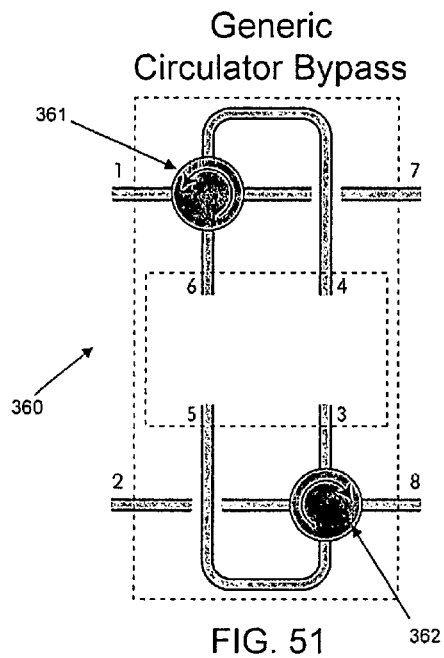
FIG. 51  Generic Circulator Bypass
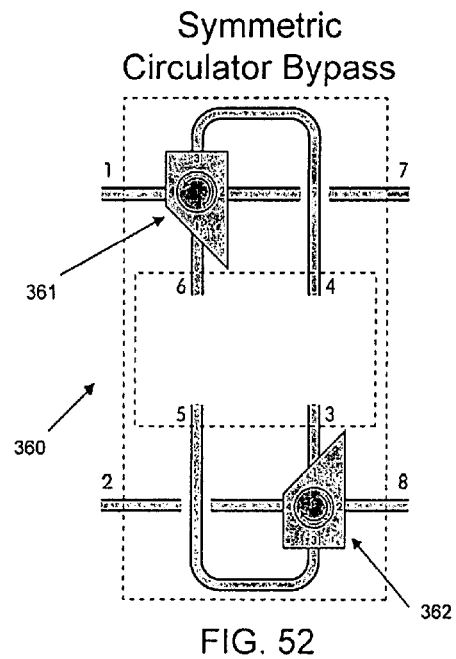
FIG. 52  Symmetric Circulator Bypass
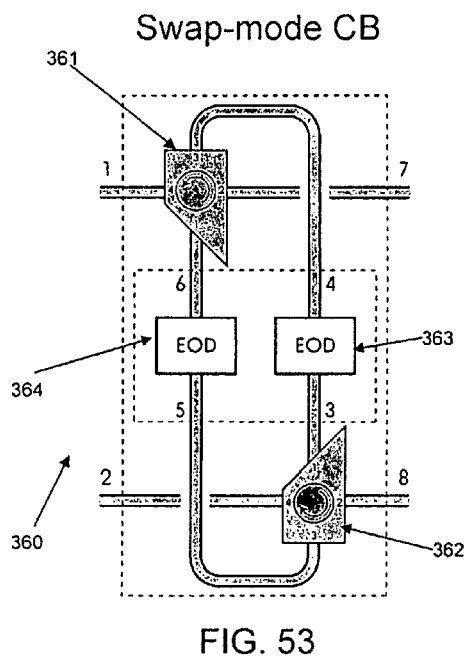
FIG. 53  Swap-mode CB
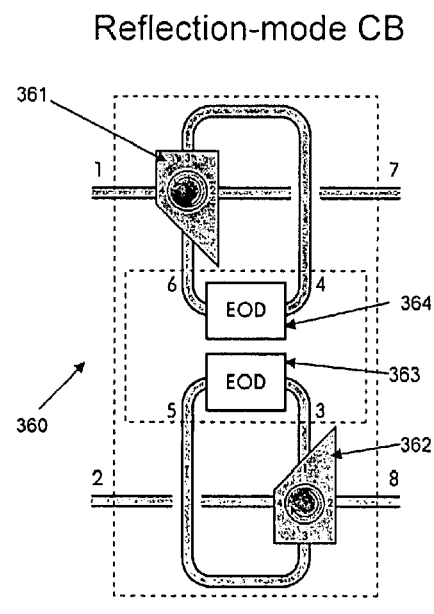
FIG. 54  Reflection-mode CB

BALANCED BYPASS CIRCULATORS AND FOLDED UNIVERSALLY-BALANCED INTERFEROMETERS

CROSS-REFERENCE TO RELATED APPLICATION

This application claims priority to and the benefit of, and incorporates herein by reference in its entirety, U.S. Provisional Patent Application No. 60/838,005, which was filed on Aug. 16, 2006.

TECHNICAL FIELD

The invention generally relates to the field of integrated optics. More particularly, the invention relates to fabrication-error-tolerant, controllable coherent bypass interferometers for use in combination with a variety of integrated optical circuits, such as, for example, integrated optical filters, dispersion compensators, and other optical signal processing devices. Some of the applications of these bypass interferometers include the multiplication of the free spectral range and the wavelength tunability of, and the hitless tuning and switching of, integrated optical filters suitable for optical channel add-drop filters for integrated optics. In addition, these bypass interferometers enable swapping—without temporary shutdown—of integrated optical processing devices into or out of a live wide-spectrum, e.g., a wavelength-division-multiplexed ("WDM"), optical network link.

BACKGROUND

WDM optical transmission systems carry multiple wavelength channels simultaneously on a single guiding optical line. Their large information capacity is useful in telecommunication applications, in intra-chip and inter-chip photonic networks for advanced high-performance microprocessors and systems for supercomputers, and in various high-bandwidth applications where electronic-photonic hybrid integrated circuits may offer significant advantages, such as in high-resolution, high-sampling-rate analog-to-digital converters, in voice and image data processing, and in biological data processing that is well suited to data parallelism.

With conventional microphotonic filters it is often difficult to achieve hitless tuning and to extend the tunable free spectral range ("FSR") of the filters to permit addressing a wider optical wavelength range. In addition, replacement of optical components in a live network typically requires temporary shutoff of the WDM network link on which the component is operating, and a down time during replacement.

Interferometric bypass schemes for achieving hitless tuning and the multiplication of the tunable FSR of optical filters are known. These schemes typically employ a class of interferometers termed universally balanced interferometers 10 as shown in FIGS. 1 and 2, though this class of interferometers is not limited to those applications, i.e., hitless filter tuning and FSR multiplication. The schemes are, for successful operation, dependent on having identical splitter 12 and combiner 14 devices, where the splitter 12 splits the input spectrum entering from an input waveguide 24 into two interferometer optical paths or arms 16, 17 and the combiner 14 recombines all signals that remain in the two arms 16, 17 after passing through any optical filters 20 (or other types of embedded optical signal processing devices) into a single output waveguide 18. In the case of hitless tuning/switching, where the splitter 12 and combiner 14 are broadband switches actuated in unison, symmetry implies that the actuation needs to be substantially synchronized. Therefore, in order to scale to very high switching speeds, designs that avoid complex control circuitry and synchronization requirements, while preserving symmetry, are desirable. In the case of the multiplication of the tunable FSR of filters, the splitter 12 and combiner 14 are wavelength filters that need to be identical. Even though the geometry of the universally balanced interferometers 10 is generally first-order insensitive to asymmetries between the splitter 12 and the combiner 14, if the filters are very narrowband, even a small dimensional difference between the two can shift the resonances of the splitter 12 and the combiner 14 apart by more than their bandwidth, and, therefore, significantly compromise their functionality. Thus, an intrinsically more tolerant design is desirable for universally balanced interferometers 10 utilizing splitters 12 and combiners 14 that have narrowband spectral-response features.

Finally, integrated optical circuits are generally inserted into an offline network, and the network then made live. Thus, replacement of integrated optical components, for failure replacement or upgrade, currently requires temporary interruption of network service passing through the device and a down time, since the device ports must be disconnected from the network. Since a WDM network carries a multitude of channels, the majority of which may not be processed by the device being replaced, the device replacement unnecessarily causes a service interruption on a number of express channels. As WDM networks scale to larger numbers of wavelength channels accommodated by a wider spectral range of wavelengths and/or a higher spectral efficiency and utilization of the spectrum, disrupting the majority of channels at a single point may cause greater disturbance to the overall network. Therefore, it is also of interest to find an approach to "hot-swap" an optical signal processing component within the network, that is, to replace it without interrupting service to channels which are physically passing through the optical component being replaced, but are functionally bypassing the component as so-called express channels.

TERMS AND INVENTIVE CONCEPTS

As used throughout the remainder of this specification:

Operating wavelength range ("OWR") of a device generally means the range of input signal wavelengths for which the device is required to substantially perform its stated function, that is, to meet certain performance specifications. For example, for a channel add-drop filter for telecommunication networks, the OWR is preferably an optical band several 10's of nanometers wide, near 1550 nm optical wavelength, e.g., the C-band communication window of 1530 nm to 1570 nm. For some devices, the OWR may be a non-contiguous range of wavelengths. This is the case, for example, for a hitless switch as part of a hitless tunable filter, because hitless switching requirements only apply to channels outside the add-drop filter's passband. More specifically, the OWR of the hitless switch is a range of wavelengths not including a region near the filter passband, where the filter imposes significant amplitude and phase modulation on the express wavelength.

Lossless, reflectionless ("LR") 4-port generally means an optical device having two input ports and two output ports. The optical device generally has a reflection back to the input ports of less than 3 dB (more preferably less than 10 dB, and even more preferably less than 20 dB) and it passes a substantially high portion of the total power entering the input ports to the output ports, within its OWR.

Splitter element ("SE") generally means a four-port optical device distinguished by its function to take an input signal at a single input port and split it in some manner, which may be wavelength and/or time dependent, between two output ports. For successful operation, the SE, where it is reciprocal, may be a reflectionless four-port optical device or an LR four-port optical device. Where the SE is non-reciprocal, it is, for successful operation, an LR four-port device.

Combiner element ("CE") generally means a four-port optical device distinguished by its function to take two signals, one entering each input port, and substantially combine them into a single output port, over the OWR of the device. For successful operation, the CE, where it is reciprocal, may be a reflectionless four-port optical device or an LR four-port optical device. Where the CE is non-reciprocal, it is, for successful operation, an LR four-port device.

Splitter/combiner element ("SCE") generally means a four-port distinguished by its function to operate both as an SE and as a CE over the OWR of the device, for different choices of input and output ports and excitation conditions. For successful operation, the SCE, where it is reciprocal, may be a reflectionless four-port optical device or an LR four-port optical device. Where the SCE is non-reciprocal, it is, for successful operation, an LR four-port device. It is to be understood that, in all parts of this specification, where a lossless and reflectionless operation requirement is stated for an SE, CE, or SCE, the requirement of substantially reflectionless operation is by itself sufficient to allow successful operation in the case of a reciprocal SE, CE, or SCE.

Differential phase shift ("DPS") generally refers to a phase difference in propagation between a pair of optical paths, where the optical signal in one optical path has an accumulated phase due to propagation that is different from that of an optical signal propagating in the second path, the phase difference being substantially the same over the OWR.

Universally balanced interferometer ("UBI") generally refers to an instance 10 of a general class of interferometer of the same name illustrated in FIGS. 1 and 2. It includes a splitter element 12 and a combiner element 14—each being a device with two input ports and two output ports and having substantially low loss and reflection—that are connected by a pair of optical paths 16, 17 with a 180° differential phase shift 22 and an embedded optical device 20 in one, the other, or both optical paths or arms 16, 17. The concept of operation and the complete properties of UBIs are described in U.S. patent application Ser. No. 11/041,350 ("the '350 Application"), filed on Jan. 24, 2005, and International Patent Application No. PCT/US2006/028848 ("the '848 Application"), filed on Jul. 25, 2006, the entire disclosures of which are hereby incorporated herein by reference in their entirety.

Embedded optical device ("EOD") generally refers to an arbitrary optical device, with one input port, one output port, and possibly a number of other access ports. The device is embedded within a second optical device by virtue of having the one input port and one output port connected to the second optical device, and operates over at least a part of the OWR of the second optical device. The EOD generally represents the functional optical signal processing device to which, for example, the hitless switching, multiplication of the tunable FSR, and/or hot-swappable connection is to be added, using the methods and devices described herein.

Optical circulator, or circulator, generally means a non-reciprocal optical device with a plurality N of ports, which may be numbered 1 to N, such that a signal entering port k, where k is an integer between 1 and N inclusive, is substantially fully transmitted to port (k mod N)+1, where mod represents modulo (i.e., remainder) with respect to integer division. That is, input signal entering port 1 goes to port 2, 2 to 3, . . . , N−1 to N, and N to 1. By substantially full transmission it is meant that transmission to the target port is better than approximately 10%, and preferably better than 50%, but more importantly that the transmission to all other ports is substantially lower than to the target port by more than approximately 10 dB, and preferably by more than 20 dB.

Group-delay-matched circulator bypass ("GMCB") generally means an optical device having a first and a second bi-directional (input/output) port, a third output port, and a fourth input port, where a signal within the OWR entering the first port exits the second port, a signal entering the second port exits the third port, and a signal entering the fourth port exits the first port. The device may be matched to a corresponding EOD such that when the input port of the EOD is connected to the third port of the GMCB and the output port of the EOD is connected to the fourth port of the GMCB, the group delay in propagation from the first port to the second port is substantially equal to the group delay in propagation from the second port to the first port (via the third port, the EOD, and the fourth port) at wavelengths within the OWR at which the EOD does not substantially affect the signal other than imposing a substantially broadband flat group delay in passing through the device. More generally, the group delay is generally matched at those wavelengths within the OWR at which the amplitude transmission from the first to the second port, and from the second to the first port, are substantially equal. In addition to matched group delays from port one to port two and from port two to port one, propagation in the two directions has a substantially fixed differential phase shift over the OWR. In one embodiment, the DPS is 180°. In another embodiment, the DPS is 0°. Alternatively, in still other embodiments, other DPSs are possible.

SUMMARY OF THE INVENTION

The present invention features an improved approach to constructing coherent bypass interferometers, including universally balanced interferometers of the type described above with reference to FIGS. 1 and 2.

More specifically, the present invention features, in one embodiment, integrated bypass interferometer designs that are folded, including but not limited to folded UBIs, that eliminate possible asymmetries in the physical realization between the splitter element and the combiner element by merging them into a single splitter/combiner element that intrinsically preserves symmetry, by nature of the folded arrangement. Accordingly, the operation of the device is made very robust to fabrication error, and the need to synchronize the splitter element actuation and the combiner element actuation in the case where they are dynamically variable (tunable or switchable) elements is eliminated.

In folded UBIs, there needs to be a 180° DPS within the interferometer arms and the possibility of inserting a distinct EOD in line with only one or both arms. Therefore, the folded designs of the present invention employ, in one embodiment, a GMCB. The EOD to be bypassed by the interferometer action is connected to the input and the output port of the GMCB. The two bidirectional ports of the GMCB are connected to corresponding ports of a single SCE, which operates bi-directionally in the present case. In such an embodiment, the SCE is electromagnetically reciprocal.

In different implementations of this invention, GMCB embodiments (e.g., FIGS. 17 to 21 and 51 to 55), embodiments of folded UBIs using a GMCB (e.g., FIGS. 4, 22A, 22B, 22C, and 23 to 26), and embodiments of dual folded UBIs using a single GMCB (e.g., FIGS. 47 and 48) are utilized.

In still other implementations of this invention, broadband and fabrication tolerant designs are provided for the hitless switching and tuning of integrated optical filters (e.g., FIG. 27), designs are provided for the multiplication of the tunable FSR of integrated optical filters (e.g., FIGS. 30 and 36), and photonic circuit designs are provided for the hot-swapping of integrated optical components and subsystems into an optical network (e.g., FIGS. 49 and 50).

The present invention contemplates the use of non-reciprocal (magneto-optic) optical elements, i.e., circulators. Integrated optic circulators are known, and whether or not they are readily available for integrated photonics applications, they are well described in the literature (for example in N. Sugimoto et al., *IEEE Photon. Technol. Lett.*, vol. 11, no. 3, page 355-357, March 1999). Accordingly, hybrid as well as fully integrated circulators can be implemented for integrated photonic circuits without undue experimentation.

In general, in one aspect, the invention features an interferometer system. The system includes a first splitter/combiner element that has an input port, an output port, a first bi-directional port, and a second bi-directional port. The system further includes a first bi-directional optical path for communicating light between the first bi-directional port of the first SCE and an optical device, and a second bi-directional optical path for communicating light between the second bi-directional port of the first SCE and the optical device. The first SCE is configured to split an input signal received at the input port among the first and second bi-directional ports and to combine signals received at the first and second bi-directional ports into an output signal at the output port. A substantial portion of light (i.e., preferably more than 10%, and even more preferably more than 50%) at at least one wavelength that exits the first SCE through the first bi-directional port re-enters the first SCE through the second bi-directional port.

In various embodiments of this aspect of the invention the interferometer system further includes the optical device, which may be a GMCB. The GMCB may include at least one EOD, for example first and second EODs, and at least one optical circulator. In one embodiment, the GMCB includes a first optical path through the first EOD and a second optical path through the second EOD. Each of the first and second optical paths may be either unidirectional or bi-directional. In addition, the first optical path may be physically separate from the second optical path. For its part, the first SCE may be, for example, a $\Delta\beta$-type switch, a microring-resonator-based filter, or a Mach-Zehnder-interferometer-like lattice filter.

In one embodiment, the optical device introduces a phase delay to a first signal propagating through the optical device from the first bi-directional port of the first SCE to the second bi-directional port of the first SCE that differs by approximately $(\pi+2\pi k)$ radians, k an integer, from the phase delay of a second signal propagating through the optical device from the second bi-directional port of the first SCE to the first bi-directional port of the first SCE. The second EOD included within the optical device may, for example, introduce a phase shift to a signal that propagates through the second optical path that is different from a phase shift that the first EOD included within the optical device introduces to a signal that propagates through the first optical path.

In another embodiment, the system includes a second SCE in communication with the optical device. The second SCE may, for example, itself include an input port, an output port, a first bi-directional port, and a second bi-directional port. The second SCE may be configured to split an input signal received at the input port of the second SCE among the first and second bi-directional ports of the second SCE and to combine signals received at the first and second bi-directional ports of the second SCE into an output signal at the output port of the second SCE. A control circuit may be coupled to the second SCE.

In still another embodiment, a substantial portion of light (i.e., preferably more than 10%, and even more preferably more than 50%) at at least one wavelength that exits the first SCE through the second bi-directional port re-enters the first SCE through the first bi-directional port. The light that exits the first SCE through the first bi-directional port and re-enters the first SCE through the second bi-directional port may experience a first phase shift spectrum and the light that exits the first SCE through the second bi-directional port and re-enters the first SCE through the first bi-directional port may experience a second phase shift spectrum. The first phase shift spectrum and the second phase shift spectrum may differ by approximately $\pi$ radians plus an integer multiple of $2\pi$ radians over an operating wavelength range of the interferometer system. For example, the difference between the first phase shift spectrum and the second phase shift spectrum may be, modulo $2\pi$ radians, between $0.7\pi$ and $1.3\pi$ radians (or, more preferably, between $0.9\pi$ and $1.1\pi$ radians) within the operating wavelength range of the interferometer system. Generally speaking, a phase shift spectrum is a phase shift at all wavelengths in the operating wavelength range of a device, such as the interferometer system.

In general, in another aspect, the invention features a circulator bypass for use in an interferometer system. The circulator bypass includes a first bi-directional input/output port, a second bi-directional input/output port, a first optical circulator coupled to at least one of the first and second bi-directional input/output ports, a first optical path extending from the first bi-directional input/output port to the second bi-directional input/output port, and a second optical path extending from the second bi-directional input/output port to the first bi-directional input/output port. The first and second optical paths both support a substantial transmission efficiency of light (i.e., preferably more than 10%, and even more preferably more than 50%) at at least one wavelength, and the group delay in propagation of light through the first optical path is substantially equal to the group delay in propagation of light through the second optical path.

In various embodiments of this aspect of the invention, the first optical path permits substantial transmission of light (i.e., preferably more than 10%, and even more preferably more than 50%) from the first bi-directional input/output port to the second bi-directional input/output port over an operating wavelength range of the circulator bypass, and the second optical path permits substantial transmission of light (i.e., preferably more than 10%, and even more preferably more than 50%) from the second bi-directional input/output port to the first bi-directional input/output port over the operating wavelength range of the circulator bypass. The two optical paths may be spatially separated in at least a part of the propagation path.

The circulator bypass may include at least one embedded optical device coupled to the first optical circulator. The embedded optical device may include an optical delay line (e.g., a length of optical waveguide), an optical signal processing device (e.g., a filter), and/or a phase shifter. Light propagating from the first to the second bi-directional input/output port may pass through a first embedded optical device, while light propagating from the second to the first bi-directional input/output port may bypass the first embedded optical device and/or pass through a second embedded optical device.

The circulator bypass may also include a second optical circulator coupled to a different one of the first and second bi-directional input/output ports than the first optical circulator. In one embodiment, each of the first and second optical circulators includes first, second, and third ports. In one such embodiment, the first port of the first optical circulator is coupled to the first bi-directional input/output port of the circulator bypass, the first port of the second optical circulator is coupled to the second bi-directional input/output port of the circulator bypass, the second port of the first optical circulator is coupled through a third optical path to the third port of the second optical circulator, and the third port of the first optical circulator is coupled through a fourth optical path to the second port of the second optical circulator. A phase shift spectrum accumulated due to propagation in the third optical path may differ from a phase shift spectrum accumulated due to propagation in the fourth optical path by π radians plus an integer multiple of 2π radians over an operating wavelength range of the circulator bypass. In addition, at least one of the third and fourth optical paths may include an embedded optical device. The first optical circulator and the second optical circulator may also be substantially identical physical structures.

In general, in yet another aspect, the invention features a method for replacing an old photonic device in a live wavelength-division-multiplexed optical transmission network. The method includes coherently transferring all wavelengths in a WDM signal that are passing substantially unaffected through the old photonic device to a bypass path (e.g., in a hitless manner), detaching the old photonic device from the live WDM optical transmission network without shutoff of the WDM optical transmission network, inserting a new photonic device in the place of the old photonic device in the live WDM optical transmission network, and coherently transferring to the new photonic device all the wavelengths in the WDM signal that were transferred to the bypass path. Typically, wavelengths in a WDM signal pass substantially unaffected through a photonic device when each channel signal is not strongly amplitude or phase filtered on the wavelength scale of its bandwidth and a reasonable transmission amplitude is transmitted through the photonic device. More specifically, in one embodiment, the wavelengths in a WDM signal that are passing substantially unaffected through a photonic device are those wavelengths that pass from an input port of the photonic device that is connected to the WDM network to an output port of the photonic device that is connected to the WDM network without substantial change of spectral shape near the wavelengths in the amplitude spectrum (the input to output transmission function preferably varying by less than 3 dB over one wavelength channel, and more preferably less than 1 dB over the one wavelength channel), without substantial group delay variation over the spectrum of each channel (preferably by less than 50%, and more preferably by less than 10%), and with substantial overall amplitude transmission (preferably exceeding 10%, more preferably exceeding 50%, and even more preferably exceeding 90%).

In various embodiments of this aspect of the invention, prior to transferring to the new photonic device all the wavelengths in the WDM signal that were transferred to the bypass path, the group delay between the bypass path and a device path in which the new photonic device is placed may be ensured to be balanced (for example, the group delay between the bypass path and the device path may be sensed and adjusted), it may be ensured that there is a 180° differential phase shift at all wavelengths that are to pass through the new photonic device unaffected (for example, the differential phase shift may be sensed and adjusted), and/or the loss balance between the bypass path and the device path may be sensed and adjusted.

In general, in still another aspect, the invention features an interferometer system. The system includes a splitter/combiner element that has a first bi-directional port, a second bi-directional port, and a third bi-directional port. The system further includes a first optical path for bi-directionally communicating light between the second bi-directional port of the SCE and an optical device, and a second optical path for bi-directionally communicating light between the third bi-directional port of the SCE and the optical device. The SCE is configured to split an input signal received at the first bi-directional port among the second and third bi-directional ports and to combine signals received at the second and third bi-directional ports into an output signal at the first bi-directional port. A substantial portion of light (i.e., preferably more than 10%, and even more preferably more than 50%) at at least one wavelength that exits the SCE through the second bi-directional port re-enters the SCE through the second bi-directional port, a substantial portion of light (i.e., preferably more than 10%, and even more preferably more than 50%) at that least one wavelength that exits the SCE through the third bi-directional port re-enters the SCE through the third bi-directional port, and the phase shift of a first signal accumulated by propagating in the first optical path from the SCE, through the optical device, and back to the SCE and the phase shift of a second signal accumulated by propagating in the second optical path from the SCE, through the optical device, and back to the SCE are substantially equal or differ by a multiple of 2π radians at that at least one wavelength.

In various embodiments of this aspect of the invention, the interferometer system further includes the optical device. The optical device may include at least one embedded optical device, such as a filter. For example, the optical device may include a first embedded optical device coupled to the first optical path of the interferometer system and a second embedded optical device coupled to the second optical path of the interferometer system. The optical device may also include at least one optical circulator or at least one reflector, such as a Bragg reflector or a waveguide loop mirror. An optical circulator may also be coupled to the first bi-directional port of the SCE.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments and implementations are described with reference to the following drawings, in which:

FIG. 10 is a schematic diagram showing an ideal 3-port optical circulator;

FIG. 11 is a schematic diagram showing an ideal 4-port optical circulator;

FIG. 12 is a schematic diagram showing an ideal 4-port optical circulator as formed of ideal 3-port circulators, and showing that the phase responses of transmission from port 121→122, 122→123, 123→124 and 124→121 can all be independently chosen without restriction;

FIG. 13 is a schematic diagram showing a representation of a 4-port circulator device to be used in the present invention, with the irregular polygon shape representing the allowed absence of any particular geometrical symmetry;

FIG. 14 is a schematic diagram showing a representation of a 4-port circulator device, with the irregular polygon shape representing the allowed absence of any particular geometrical symmetry;

FIG. 15 is a schematic diagram illustrating one possible physical realization of a 4-port optical circulator of the port topology shown in FIG. 14;

FIG. 16 is a schematic diagram showing a bidirectional optical delay line including an optical path with a group delay and a non-reciprocal phase shift of 180°, that is, where the phase in traversing the delay line in one direction is 180° different than that in the opposite propagation direction;

FIG. 51 is a schematic diagram of a generic circulator bypass according to one implementation of the invention;

FIG. 52 is a schematic diagram of a generic circulator bypass having explicit symmetry built into the design according to another implementation of the invention;

FIG. 53 is a schematic diagram of a circulator bypass according to yet another implementation of the invention, the circulator bypass comprising a symmetric generic circulator bypass and two arbitrary embedded optical devices, connected to allow "swap-mode" operation, wherein signal entering port one exits port two and vice versa;

FIG. 54 is a schematic diagram of a circulator bypass according to still another implementation of the invention, the circulator bypass comprising a symmetric generic circulator bypass and two arbitrary embedded optical devices, connected to allow "reflection-mode" operation, wherein signal entering port one exits port one, and signal entering port two exits port two;

DESCRIPTION

In its various implementations and embodiments, the present invention relates to coherent bypass interferometers, such as, for example, UBIs, folded interferometer designs, and GMCB devices, including configurations of GMCBs that have loss and phase or group delay balancing with respect to the two traversal directions of the GMCB.

Figure 1:
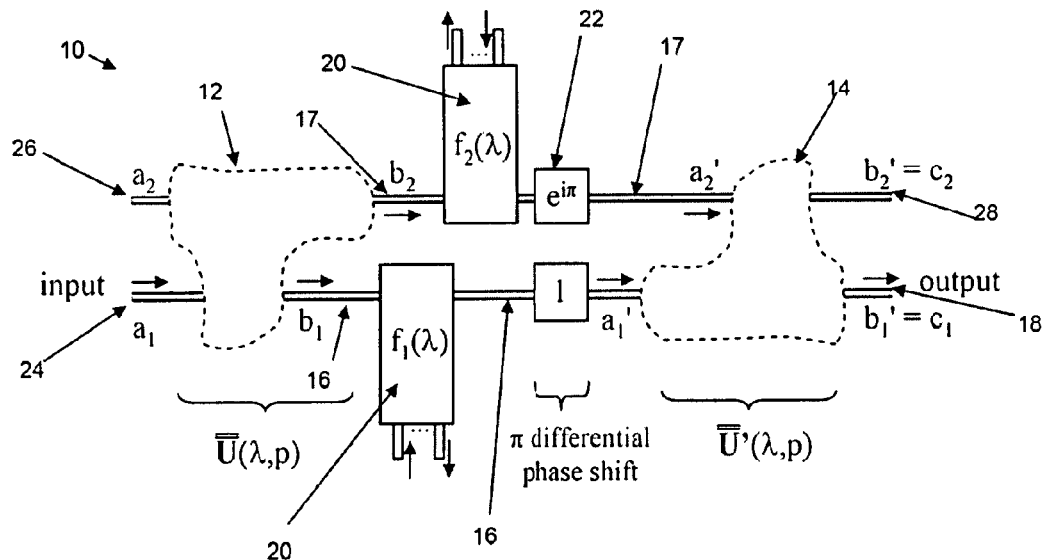
FIG. 1 is a schematic diagram illustrating a UBI, based on a reciprocal SE and CE.
Figure 2:
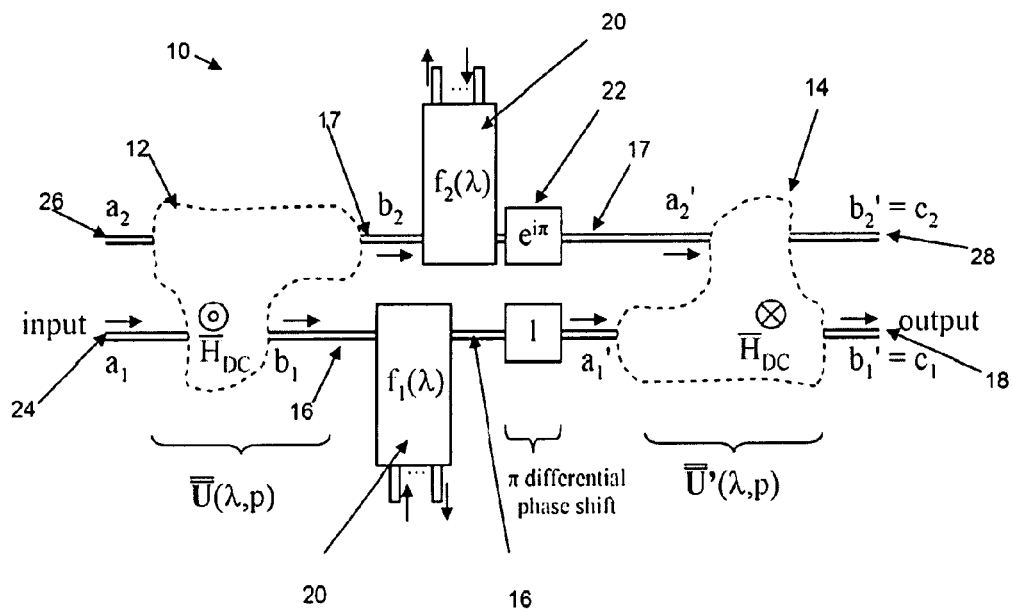
FIG. 2 is a schematic diagram illustrating a UBI where the SE is a non-reciprocal device, and the corresponding CE is a non-reciprocal device with opposite sign of built-in or applied direct-current magnetic bias field.

As described above, UBIs are a general class of optical interferometers 10, illustrated in FIGS. 1 and 2. In UBIs that employ electromagnetically reciprocal SE 12 and CE 14 devices, each of the SE 12 and CE 14 has two input ports, two output ports, and an associated transfer matrix. The transfer matrix of the CE 14 is the "diagonal transpose" (as described in the '350 and the '848 Applications) of the transfer matrix of the SE 12, or, alternatively, is "output-phase-equivalent" (as described in the '350 and the '848 Applications) to the diagonal transpose of the transfer matrix of the SE 12. In the former case, this includes but is not limited to a CE 14 that is substantially identical to the SE 12, as shown in FIG. 1, but is mirror-imaged through a horizontal reflection axis and a vertical reflection axis on the page (i.e., rotated 180° in the plane of the chip surface). In the latter case, this includes but is not limited to a CE 12 that is substantially identical to the SE 14, rotated 180° as above, followed by an all-pass filter of arbitrary design at each of the two output ports.

The UBI may also employ non-reciprocal SE 12 and CE 14 devices, as illustrated in FIG. 2. In that case, in the magneto-optic materials of the SE 12 and CE 14 there is either a built-in or applied DC magnetic bias field, as represented in FIG. 2 as $H_{DC}$. The field $H_{DC}$ in the SE 12 may be directed along any spatial orientation. For successful operation as a UBI, the CE 14 preferably has the same relationship to the SE 12 in terms of the transfer matrix as it does for the reciprocal case (described above). Physically, the relationship of the CE 14 to the SE 12 in terms of geometrical structure is also the same as above for this non-reciprocal case, but the magnetic bias field $H_{DC}$ in the CE 14 first needs to be reversed in direction from the magnetic bias field $H_{DC}$ in the SE 12, and the CE 14 then rotated 180° relative to the SE 12 as described above.

The function of all UBIs is, in the absence of EODs 20, to take all signals entering the first input port 24 and recombine them substantially in the first output port 18, and likewise recombine all signals entering the second input port 26 substantially in the second output port 28, within the OWR. More generally, when loss mechanisms in the device 10 cause substantial loss of signal, the successful operation of UBIs can be described by the property of recombining all remaining signal in one output port, i.e., in having substantially higher transmission to the recombining output port than to the other output port, over the OWR. In the case where EODs 20 are present in the UBI 10, the signals entering one input port are recombined in the single corresponding output port at all wavelengths in the OWR at which the EODs 20 do not substantially affect the signal in amplitude or phase. More generally, if there is an EOD 20 in each arm 16, 17, the input signal at a port is recombined in a single output port at all wavelengths at which the EODs 20 do not substantially alter the ratio of amplitudes in the two arms 16, 17, and do not substantially alter the DPS between the arms 16, 17, while common-mode amplitude and phase modulation is permitted.

Preferably, each port 24, 26, 18, 28 is accessed by a single-mode waveguide, such that two input waveguides and two output waveguides are present. More generally, any structure may be used that provides the guided modes to serve as the two input ports 24, 26 or two output ports 18, 28, such as, for example, a two-moded waveguide for each of the input and output port sets. Even more generally, any configuration accepting two distinct spatial optical modes may be used, including two substantially orthogonal free-space optical modes.

Figure 7:
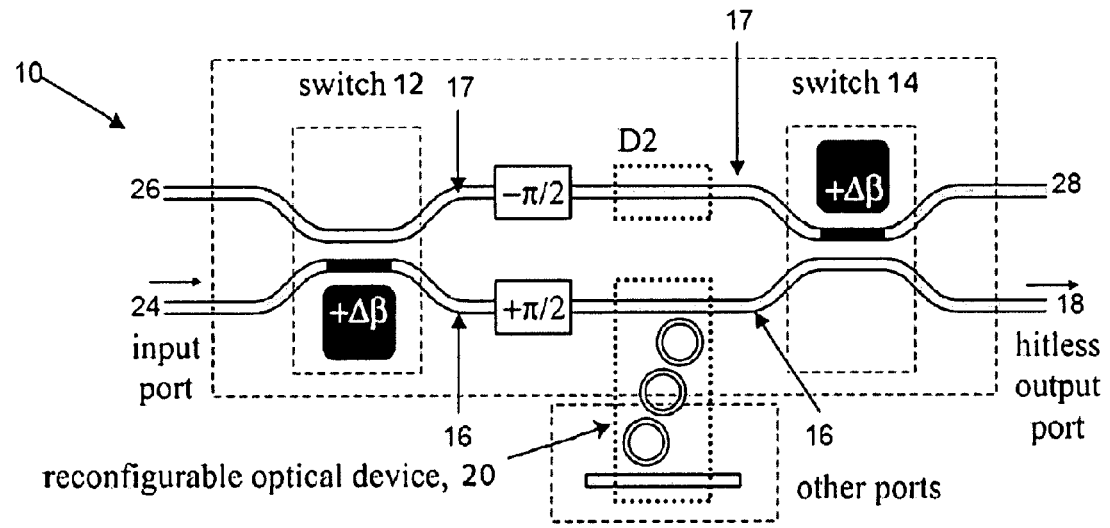
FIG. 7 is a schematic diagram showing a hitless tunable filter design, using a UBI wherein the SE and CE are Δβ-type switches, and the EOD is a third-order microring-resonator filter.

Different embodiments of the UBI 10 may be used for several exemplary applications as follows. FIG. 7 is an exemplary schematic diagram showing a hitless tunable filter design, using a UBI 10 wherein the SE 12 and CE 14 are $\Delta\beta$-type switches, and the EOD 20 is a third-order microring-resonator filter, as described in the '350 Application. In one state of SE switch 12 and CE switch 14, all signals entering the first input port 24 within the OWR fully pass in the bottom arm 16 of the interferometer 10, through the filter EOD 20, and all signals not substantially affected by the filter 20 (i.e., that are away from the filtering wavelength) exit the first output port 18 on the right. In a second state of SE switch 12 and CE switch 14, all signals entering the first input port 24 within the OWR fully pass in the top arm 17 of the interferometer 10, bypassing the filter 20, and exit the first output port 18. In other, intermediate states of SE switch 12 and CE switch 14, which have a continuously variable coupling ratio, the signal is split between the top arm 17 and the bottom arm 16 according to the particular coupling ratio. However, all signals not substantially affected by the filter 20 are recombined into the first output port 18, due to the proper phasing provided by the UBI 10 structure. Therefore, all input signal wavelengths not substantially affected by the resonant filter 20 exit in a single output port 18 before, during, and after switching from the filter arm 16 to the bypass arm 17 and back. While the input signal is routed to the bypass path 17, the filter 20 wavelength may be tuned to a new channel, without disturbing intermediate wavelength channels between the initial and target channel wavelengths. Hence, a hitless tuning structure is provided for a filter of arbitrary design.

Figure 8:
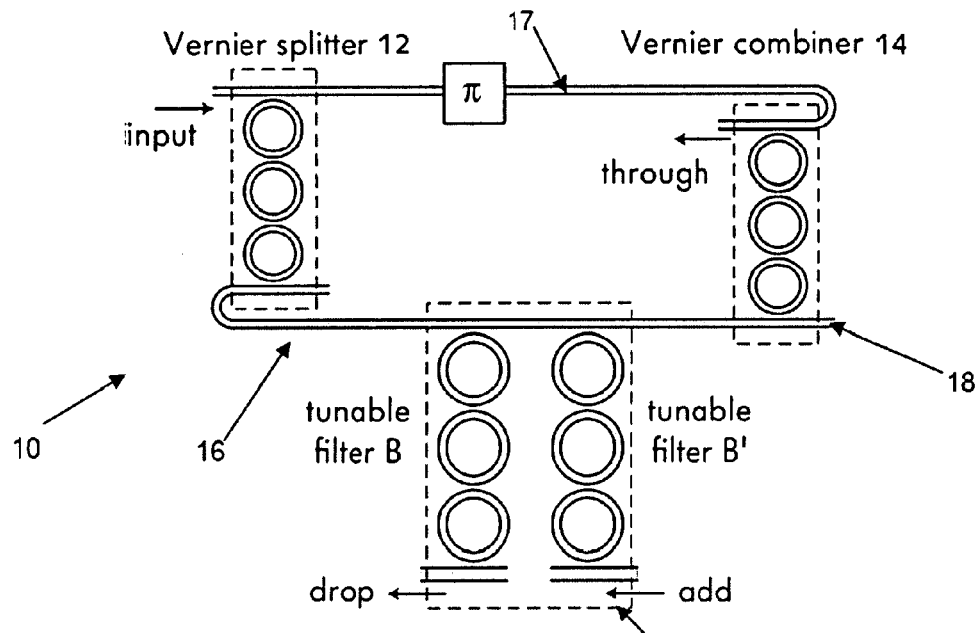
FIG. 8 is a schematic diagram of a UBI-based Vernier scheme, based on an SE and CE that are microring-resonator filters, where the EOD is a cascade of two third-order microring-resonator filters, and showing a filter design with a multiplied tunable FSR.

FIG. 8 is an exemplary schematic diagram of a UBI-based Vernier scheme, based on an SE 12 and a CE 14 that are microring-resonator filters, where the EOD 20 is a cascade of two third-order microring-resonator filters. A filter design with a multiplied tunable FSR, as described in the '848 Application, is depicted. Here the SE filter 12 and the CE filter 14 have one FSR, while the EOD 20 has a second, different FSR.

Input signals resonant with one of the SE 12 resonances are dropped to the bottom arm 16, while the remaining signals bypass in the top arm 17. Furthermore, signal wavelengths dropped to the bottom arm 16 enter the EOD 20, and those resonant with the EOD 20 (having a different FSR) are dropped, while the remaining wavelengths continue and are reinserted into the output port 18 by the CE filter 14.

Figure 9:
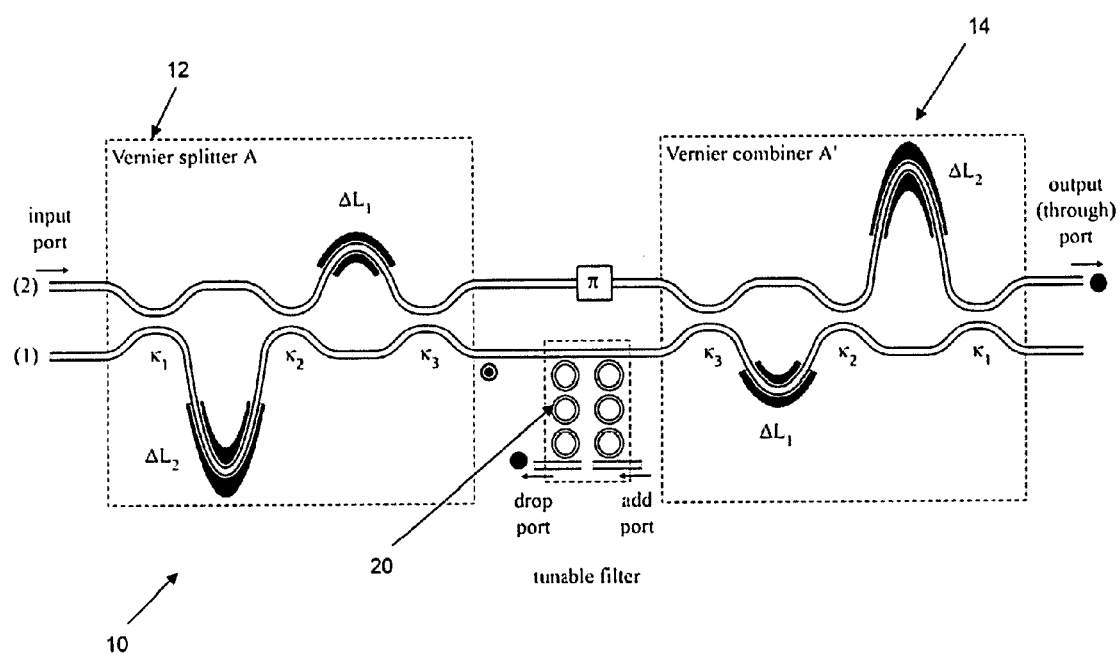
FIG. 9 is a schematic diagram of a UBI-based Vernier scheme, based on an SE and CE that are Mach-Zehnder-interferometer-like lattice filters, where the EOD is a cascade of two third-order microring-resonator filters, and showing a filter design with a multiplied tunable FSR.

FIG. 9 is an exemplary schematic diagram of a UBI-based Vernier scheme, based on an SE 12 and a CE 14 that are Mach-Zehnder-interferometer-like lattice filters, where the EOD 20 is a cascade of two third-order microring-resonator filters. A filter design with a multiplied tunable FSR, as described in the '848 Application, is depicted. The operation is similar to the device illustrated in FIG. 8, but the use of lattice filters for the SE 12 and the CE 14 greatly reduces the group delay and the dispersion added by the SE 12 and the CE 14 into through port channels, as described in the '848 Application.

Because UBIs 10, if using a non-reciprocal SE 12 and a non-reciprocal CE 14, depend on the LR condition in the SE 12 and the CE 14 (and on the reflectionless condition if a reciprocal SE 12 and a reciprocal CE 14 are used), on symmetry in that the CE 14 is structurally identical to the SE 12 and connected as described (or else related to the SE 12 in terms of transfer matrices as described above), and on the 180° DPS in the optical paths 16, 17, for practical applicability of UBIs 10 it is important to consider the sensitivity of successful operation to deviation from these conditions in practice. In one aspect of the invention, designs are provided that reduce these sensitivities to enable the realization of robust, and—in the case of tunable or switchable devices—simple to control, UBIs.

Figure 3:
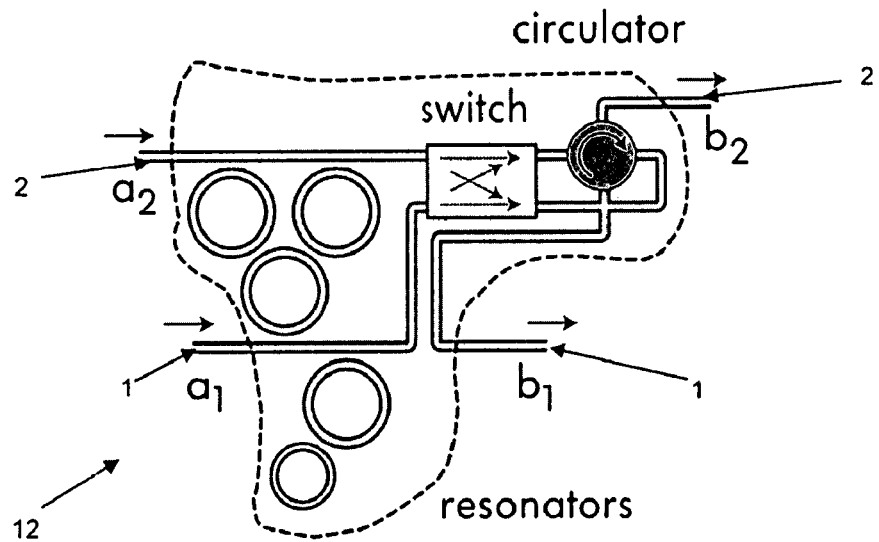
FIG. 3 is a schematic diagram illustrating an arbitrary lossless, reflectionless optical device with two input ports and two output ports, to show the generality of the SE design allowable within a UBI.

FIG. 3 is an illustration of an exemplary SE 12, showing that UBIs 10 may have arbitrary, complex structures as the SE 12 (and CE 14), with the only requirement that the SE 12 be substantially lossless and reflectionless when it is non-reciprocal and that it be substantially reflectionless when it is reciprocal.

For the ideal lossless, reflectionless case, the SE 12 transfer matrix is unitary, as described in the '350 and the '848 Applications. Small amounts of loss and reflection may be tolerated, in which case the SE 12 is termed as substantially lossless and reflectionless. Depending on the particular choice of SE 12 and CE 14 device, losses on the order of 50% (3 dB) may be acceptable, but for several practical applications losses less than 10% are more preferable, and substantially lower losses, such as less than 1%, are even more preferable. In terms of reflection, for successful operation, reflection levels less than −10 dB may be acceptable, although reflection suppression greater than 20 dB is more preferable. However, more generally, UBIs 10 can be shown to work properly even for arbitrarily high losses, if the SE 12 and CE 14 are reciprocal devices.

UBIs 10 that use a highly lossy SE 12 and CE 14 device cannot be expected to recombine all input signal energy at the output, since some signal energy is lost to the particular loss mechanisms present in the SE 12 and CE 14, which may be broadband or arbitrarily wavelength dependent. The best possible outcome in terms of proper UBI 10 operation would be for all remaining signal to be recombined into a single output port. This may be accomplished by lossy UBIs 10 when the SE 12 and CE 14 are reciprocal. With reference to FIG. 3, if the transfer matrix of the SE 12 is $$\bar{\bar{U}}_{SE} = \begin{bmatrix} u_{11} & u_{12} \\ u_{21} & u_{22} \end{bmatrix}$$

relating outputs $\bar{b}=[b_1,b_2]^T$ to inputs $\bar{a}=[a_1,a_2]^T$ as $\bar{b}=\bar{\bar{U}}_{SE}\cdot\bar{a}$, then the transfer matrix for reverse operation with inputs $\bar{b}$ and outputs $\bar{a}$ is the transpose matrix, $\bar{\bar{U}}_{SE}^T$, by reciprocity. Since the CE 14 is 180° rotated with respect to the SE 12, port numbers 1 and 2 are swapped, so that the transfer matrix of the CE 14 is actually the transpose of the SE 12 transfer matrix, pre- and post-multiplied by a Pauli matrix [0,1;1,0] representing the port swapping:

$$\bar{\bar{U}}_{CE} = \begin{bmatrix} 0 & 1 \\ 1 & 0 \end{bmatrix} \cdot \bar{\bar{U}}_{SE}^T \cdot \begin{bmatrix} 0 & 1 \\ 1 & 0 \end{bmatrix}$$

The total transfer matrix of the UBI 10 comprising a reciprocal, lossy SE 12, a pair of optical waveguides with a $\pi$ radian DPS, and a corresponding CE 14 as described above is:

$$\bar{\bar{T}} = \bar{\bar{U}}_{CE} \cdot \begin{bmatrix} 1 & 0 \\ 0 & e^{i\pi} \end{bmatrix} \cdot \bar{\bar{U}}_{SE} = \begin{vmatrix} u_{11}u_{22}-u_{21}u_{12} & 0 \\ 0 & -u_{11}u_{22}+u_{21}u_{12} \end{vmatrix}$$

Therefore, although the diagonal elements show that recombining output may in general have lossy and wavelength dependent recombination, the zero off-diagonal elements show that this is the best that can be done with the given lossy SE 12 and CE 14 devices as all remaining power is recombined into one output port. As a result, the general property of UBIs 10 to recombine an arbitrarily split input signal is shown to hold for arbitrarily large losses in the case of reciprocal SEs 12 and CEs 14, in the sense that all remaining power is recombined into one port. Thus, it is to be understood that where, in this specification, a lossless and reflectionless operation requirement is stated for the SE 12, the CE 14, or an SCE, the requirement of substantially reflectionless operation is by itself sufficient to allow successful UBI 10 operation in the case of a reciprocal SE 12, CE 14, or SCE.

Figure 5:
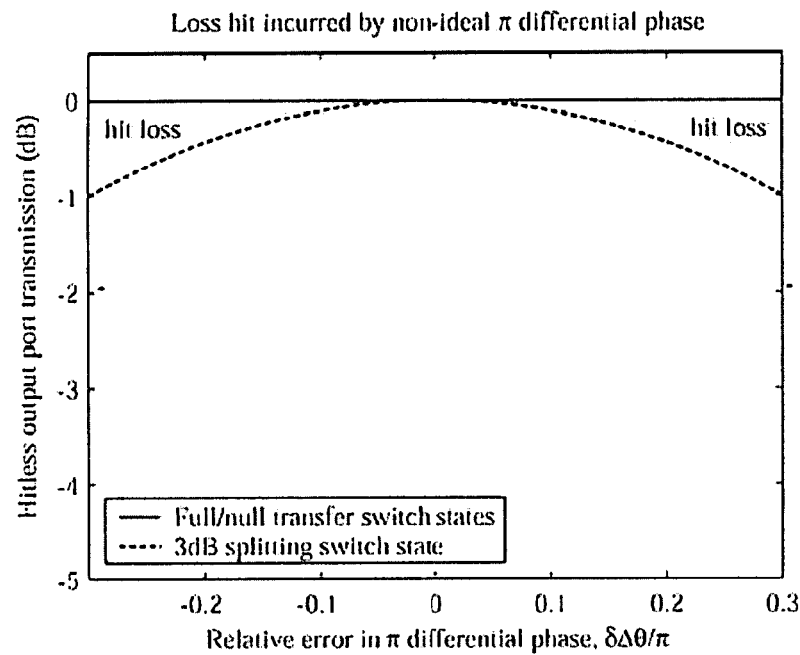
FIG. 5 is a graph illustrating loss in the recombining UBI output port incurred by deviation from an ideal 180° DPS.

Sensitivity of UBIs 10 to phase error is shown in FIG. 5, where the loss incurred in the signal-recombining output port is plotted as a function of relative error in the 180° DPS in the optical paths 16, 17. In practice, errors up to approximately 30% in the phase produce tolerable deviation from complete recombination, resulting in incurred loss of less than 1 dB in the recombined output port, for any choice of splitting ratio in the SE 12, assuming identical CE 14 and SE 12. This shows how close to 180° the DPS in the optical paths should be. Accordingly, the first optical path 16 and second optical path 17 are configured to introduce, at substantially all wavelengths of the input spectrum within an OWR of the UBI 10, a phase shift selected from a range of $0.7\pi$ to $1.3\pi$ radians, more preferably from a range of $0.9\pi$ to $1.1\pi$ radians, and most preferably $\pi$ radians, to the optical radiation propagating through the first optical path 16 with respect to the optical radiation propagating through the second optical path 17. The previous sensitivities have assumed identical CE 14 and SE 12 devices, i.e., transfer matrices that are diagonal transposes of each other.

Figure 6:
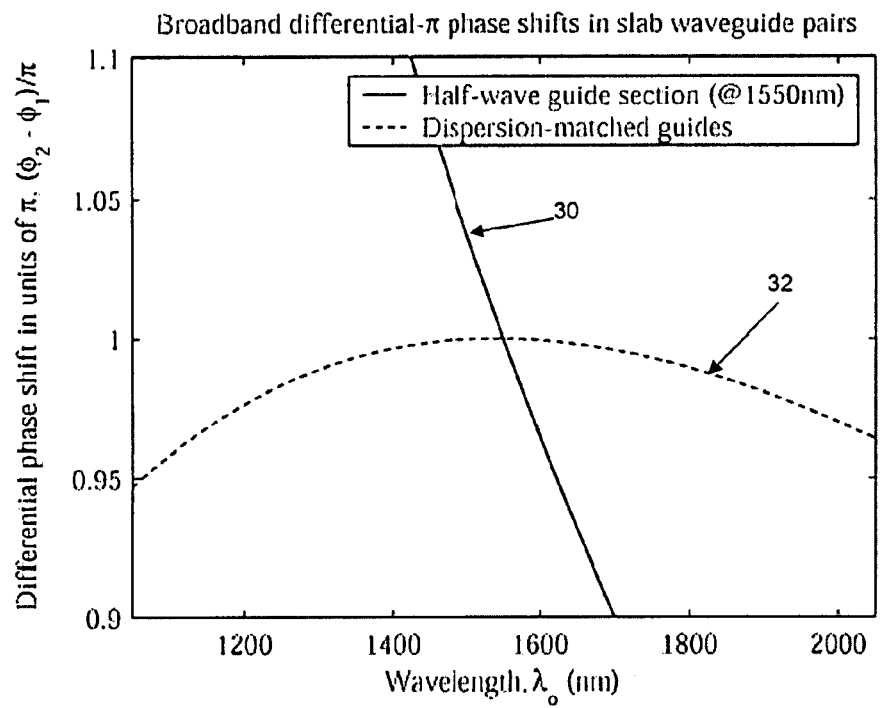
FIG. 6 is a graph illustrating exemplary physical realizations of a broadband 180° DPS in slab waveguide pairs.

FIG. 6 illustrates the performance of possible physical realizations of a broadband 180° DPS, and specifically the deviation from an ideal 180° DPS vs. wavelength. The simplest realization of a $\pi$-radian (i.e., 180°) DPS is a half-guided-wavelength (at center-band) extra-length of waveguide section, in one arm 16 or 17 relative to the other arm 17 or 16. The guided wavelength of the propagating mode is related to its propagation constant $\beta$ as $\lambda_{guide}=2\pi/\beta$. A half guided-wavelength is equivalent to a $\pi$-radian phase shift. Waveguide dispersion causes the phase shift to vary with wavelength, but the short length guarantees a reasonably large bandwidth. For example, identical cross-section slab waveguide arms with a core index of 2.2, a cladding index of 1.445, and a thicknesses of 0.5 µm (TE) give less than 5% deviation in the $\pi$ shift over 140 nm bandwidth, as shown in FIG. 6 in solid line 30. If wider bandwidths are required, a dispersion-engineered waveguide pair can be designed giving a $\pi$-radian DPS over almost an octave, as shown in dotted line 32 in FIG. 6 and as described in the '350 Application.

Suppose now that we have an SE 12 and a CE 14 that are nominally identical, with the transfer matrix of the CE 14 being the diagonal transpose of that of the SE 12, due to the 180° rotated orientation of the CE 14 with respect to the SE 12 and its operation in reverse. The transfer matrix of the SE 12 can take the form:

$$\bar{\bar{U}}_{SE} = e^{i\theta_o} \begin{bmatrix} \sqrt{1-\kappa}\,e^{i\theta_1} & i\sqrt{\kappa}\,e^{i\theta_2} \\ i\sqrt{\kappa}\,e^{-i\theta_2} & \sqrt{1-\kappa}\,e^{-i\theta_1} \end{bmatrix}$$

where there are four free parameters, $\kappa$ is the coupling ratio, and $\theta_o$, $\theta_1$, $\theta_2$ are arbitrary phases that may be freely chosen. All four parameters may be frequency dependent and time dependent, e.g. in a tunable filter or a switch.

Then suppose that we introduce an arbitrary antisymmetric error to the coupling ratio $\kappa$ in the transfer matrix of the SE 12 and CE 14. The coupling ratio $\kappa$ in the SE 12 is increased by $\delta\kappa$, such that $\kappa\rightarrow\kappa+\delta\kappa$, and the coupling ratio of the CE 14 is decreased by $\delta\kappa$. Since perturbations cannot increase $\kappa$ to first order when $\kappa=1$ (nominally) or decrease it when $\kappa=0$, we rewrite the coupling ratio in terms of a beat length so that $\sqrt{\kappa}\equiv\sin(\theta_\kappa)$ and $\sqrt{1-\kappa}\equiv\cos(\theta_\kappa)$. The phase $\theta_\kappa$ has physical significance as an optical beat length in a synchronous directional coupler for example, and therefore errors in $\theta_\kappa$ are an appropriate way to characterize error sensitivity. The transfer matrix of the SE 12 can then be rewritten as $$\bar{\bar{U}}_{SE} = e^{i\theta_o} \begin{vmatrix} \cos(\theta_\kappa)e^{i\theta_1} & i\sin(\theta_\kappa)e^{i\theta_2} \\ i\sin(\theta_\kappa)e^{-i\theta_2} & \cos(\theta_\kappa)e^{-i\theta_1} \end{vmatrix}. \quad (1)$$

If an asymmetric fabrication error is introduced, $\theta_\kappa\rightarrow\theta_\kappa+\delta\theta$ in the SE 12 and $\theta_\kappa\rightarrow\theta_\kappa-\delta\theta$ in the CE 14, the transfer matrix of the SE 12 is now $$\bar{\bar{U}}_{SE} = e^{i\theta_o} \begin{vmatrix} \cos(\theta_\kappa+\delta\theta)e^{i\theta_1} & i\sin(\theta_\kappa+\delta\theta)e^{i\theta_2} \\ i\sin(\theta_\kappa+\delta\theta)e^{-i\theta_2} & \cos(\theta_\kappa+\delta\theta)e^{-i\theta_1} \end{vmatrix} \quad (2)$$

and the transfer matrix of the CE 14 is $$\bar{\bar{U}}_{CE} = e^{i\theta_o} \begin{vmatrix} \cos(\theta_\kappa-\delta\theta)e^{-i\theta_1} & i\sin(\theta_\kappa-\delta\theta)e^{i\theta_2} \\ i\sin(\theta_\kappa-\delta\theta)e^{-i\theta_2} & \cos(\theta_\kappa-\delta\theta)e^{i\theta_1} \end{vmatrix}. \quad (3)$$

Then, the total transfer matrix $\bar{\bar{T}}$ of the UBI 10, without the EODs 20, is $$\bar{\bar{T}} = \bar{\bar{U}}_{CE} \cdot \begin{vmatrix} 1 & 0 \\ 0 & e^{i\pi} \end{vmatrix} \cdot \bar{\bar{U}}_{SE} \quad (4)$$

$$= e^{i2\theta_o} \begin{vmatrix} \cos(2\delta\theta) & -ie^{i(\theta_1+\theta_2)}\sin(2\delta\theta) \\ ie^{-i(\theta_1+\theta_2)}\sin(2\delta\theta) & -\cos(2\delta\theta) \end{vmatrix}.$$

The response is independent of the nominal coupling phase $\theta_\kappa$, i.e., of the coupling ratio $\kappa$. If the antisymmetric coupling perturbation is zero, $\delta\theta \to 0$, the CE 14 is identical to the SE 12 and the total transfer matrix is $$\bar{\bar{T}} = e^{i2\theta_o} \begin{vmatrix} 1 & 0 \\ 0 & -1 \end{vmatrix} \quad (5)$$

which is the transfer matrix of an ideal UBI 10. On the other hand, if asymmetry is present due to fabrication errors, $\delta\theta \neq 0$, the matrix elements $T_{11}$ and $T_{22}$ that are unity in magnitude in an ideal UBI 10, and are the response functions of interest, are reduced from unity to second-order in $\delta\theta$ (since $\cos(2\delta\theta)=1-2\cdot\delta\theta^2+O(\delta\theta^4)$). This results from a Taylor series expansion of the matrix in eqn. (4) to first order in $\delta\theta$. Therefore, the UBI 10 response function is first-order insensitive to small asymmetric perturbations in the coupling ratio of the SE 12 and CE 14.

This insensitivity can be stated in terms of the coupling ratio $\kappa$. Since $\kappa+\delta\kappa=\sin^2(\theta_\kappa+\delta\theta)$, for small $\delta\theta$ the coupling ratio error $\delta\kappa$ and corresponding coupling phase error $\delta\theta$ are related by: $\delta\kappa=2\sqrt{\kappa}\sqrt{1-\kappa}\,\delta\theta$. Therefore, a given error in the coupling phase results in the largest absolute perturbation to the coupling ratio $\kappa$ when $\kappa=1/2$, i.e., at the 3 dB coupling ratio point.

Even though the recombining response, as shown, is first-order insensitive to antisymmetric perturbations to the coupling ratio pair representing the SE 12 and CE 14 device at any particular wavelength in the OWR of the UBI 10, this does not mean that all UBI 10 designs are highly tolerant to dimensional errors. In some possible device designs for an SE 12, the $\delta\kappa$ (or $\delta\theta$) perturbation of the ideal transfer matrix, if resulting from a dimensional error for example, can be highly sensitive to that dimensional error. In this case, a minute dimensional error can cause a large $\delta\kappa$, and thus first-order insensitivity in $\delta\kappa$ will be insufficient to preserve successful operation. An important example is high-quality factor (high Q), i.e., narrow-band, resonators. A resonant filter, such as a microring-resonator-based channel add-drop filter, supports drop-port responses that have narrow resonant lineshapes. The sensitivity of the resonant frequency to dimensional error can be very large. For example, consider silicon-nitride (SiN) waveguides of 800 nm width and 400 nm height in cross-section, and a 2.2 core index, a 1.45 silica undercladding, and air-clad on the top and sides. Microring resonators formed of such waveguides have approximately 40 GHz/nm sensitivity of the resonance frequency to the width of the waveguide, the width being lithographically defined and therefore typically a larger contribution to resonance error than waveguide thickness. Thus, only a 1 Å error in ring waveguide width will shift a resonance by 4 GHz. If the bandwidth of the resonant response of interest of the device is on the order of 4 GHz, clearly the transmission of the device can change from nearly 100% to nearly 0% at one wavelength, due to the dimensional error. The resulting $\delta\kappa$ in the coupling ratio of a SE containing such a resonator is of order 1, and thus no first or even higher order insensitivity would help make the operation robust to such errors.

Figure 4:
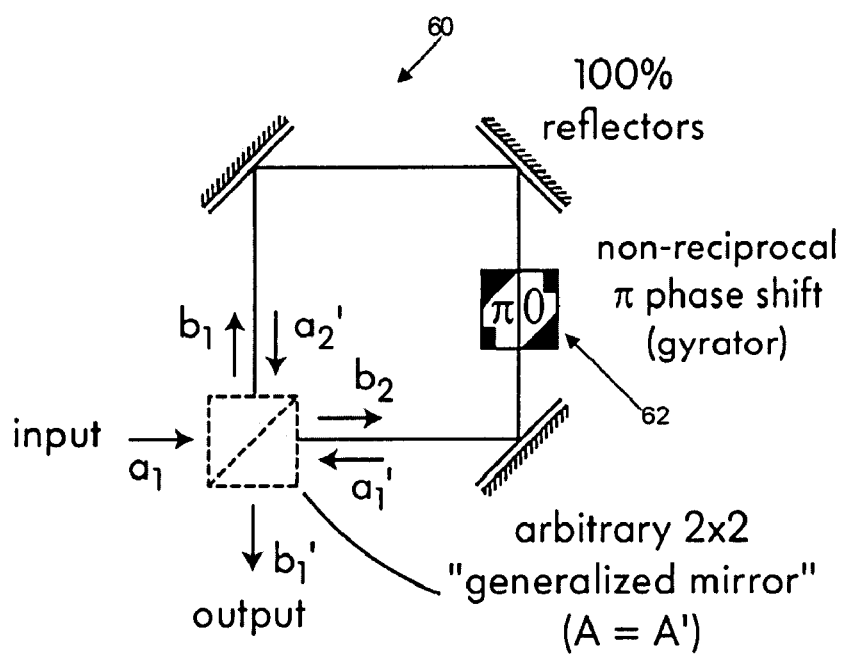
FIG. 4 is a schematic diagram illustrating a folded design of a UBI according to one implementation of the invention, in a free-space configuration, where the SE and the CE are one and the same element, and showing a non-reciprocal 180° DPS within the interferometer arms.

In one aspect of the invention, folded bypass interferometers have inherently insensitive response to asymmetry between the SE 12 and CE 14 by virtue of using one and the same device for both functions, a SCE, thus achieving in principle perfect symmetry if the SCE is an electromagnetically reciprocal device. A folded UBI 40, using an SCE 48 is shown most generally in FIG. 22A. Input signal enters port 41, while output signal leaves port 42 to the left with negligible signal leaving port 41 to the left. In the interferometer arms 43, 44 of the folded UBI 40, propagation is bidirectional because of the folded configuration. For operation of the UBI 40 over a desired OWR, an optical device 50 may act as a delay line from port 45 to port 46, or port 46 to port 45, with a non-reciprocal 180° phase shift, i.e., having a phase delay from port 45 to port 46 different by $\pi$ radians, or $(\pi+2\pi\,k)$ radians with k an integer, from the phase delay from port 46 to port 45, over the OWR. Such a non-reciprocal phase shift is also shown in the free-space embodiment 60 in FIG. 4. However, for a practical application, the optical device 50 may also include an EOD in the optical path traversing one direction only, from port 45 to port 46, and another EOD in the optical path traversing in the other direction only, from port 46 to port 45. In one embodiment, the OWR of the UBI 40 is over 100 GHz wide, more preferably over 1 THz wide, and even more preferably over 10 THz wide.

Figure 22A:
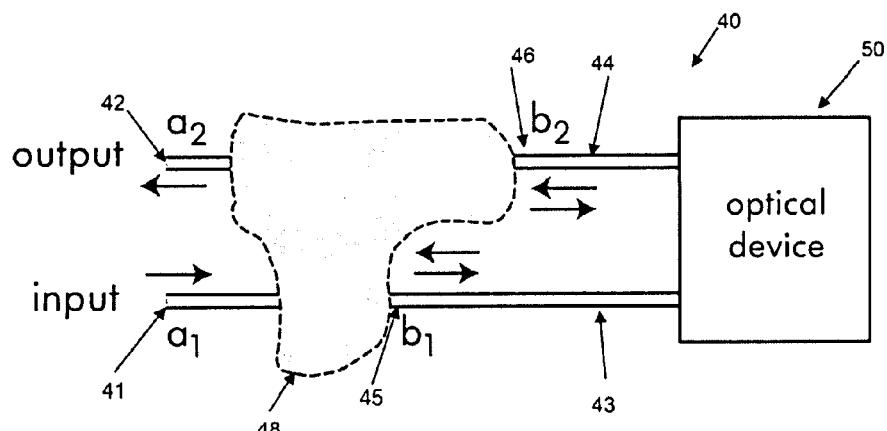
FIG. 22A is a schematic diagram illustrating a general folded UBI according to one implementation of the invention, including an SCE that is a substantially LR 4-port, and an optical device connected to two ports.
Figure 22B:
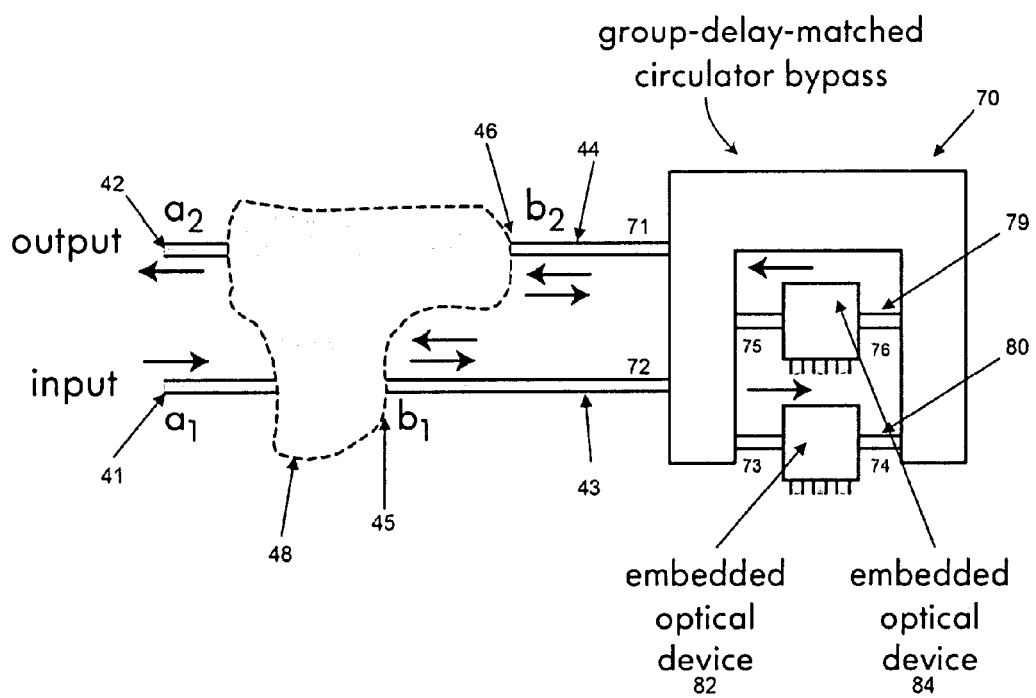
FIG. 22B is a schematic diagram illustrating a general folded UBI according to one implementation of the invention, including an SCE that is a substantially reflectionless (and more preferably LR) 4-port, and an optical device that is a 6-port GMCB, with two of the GMCB's ports connected to two ports of the SCE and the other four ports of the GMCB connected in pairs each to one of two EODs.

One exemplary embodiment of the folded scheme including two EODs 82, 84 is shown in general form in FIG. 22B. An optical device 70 is shown having six labeled ports 71, 72, 73, 74, 75, 76. Two of its ports, 71 and 72, are connected to the SCE 48, and another two pairs of ports—73, 74 and 75, 76—are each connected to an EOD 82 and an EOD 84, respectively. Therefore, signals entering port 71 of the optical device 70 exit port 76, pass along an optical path 79 through an EOD 84, enter port 75, and exit port 72; while signals entering port 72 exit port 73, pass along an optical path 80 through an EOD 82, enter port 74, and exit port 71. The EODs 82 and 84 are represented as arbitrary optical devices having at least 2 ports, connecting to the optical device 70 (and may have more than 2 ports as illustrated in FIG. 22B). Since the optical path taken is different for signal propagating from port 72 to port 71 and in the opposite direction, the optical device 70 is not electromagnetically reciprocal, and, in one embodiment, involves magneto-optical elements, such as circulators, to provide the above described operation. Because the device 70 provides two different optical bypass paths of substantially equal group delays, the device 70 is referred to as a group-delay-matched circulator bypass. Note that under successful operation in FIG. 22B, propagation is bidirectional at ports 71 and 72, and unidirectional at ports 73, 74, 75, and 76.

Figure 22C:
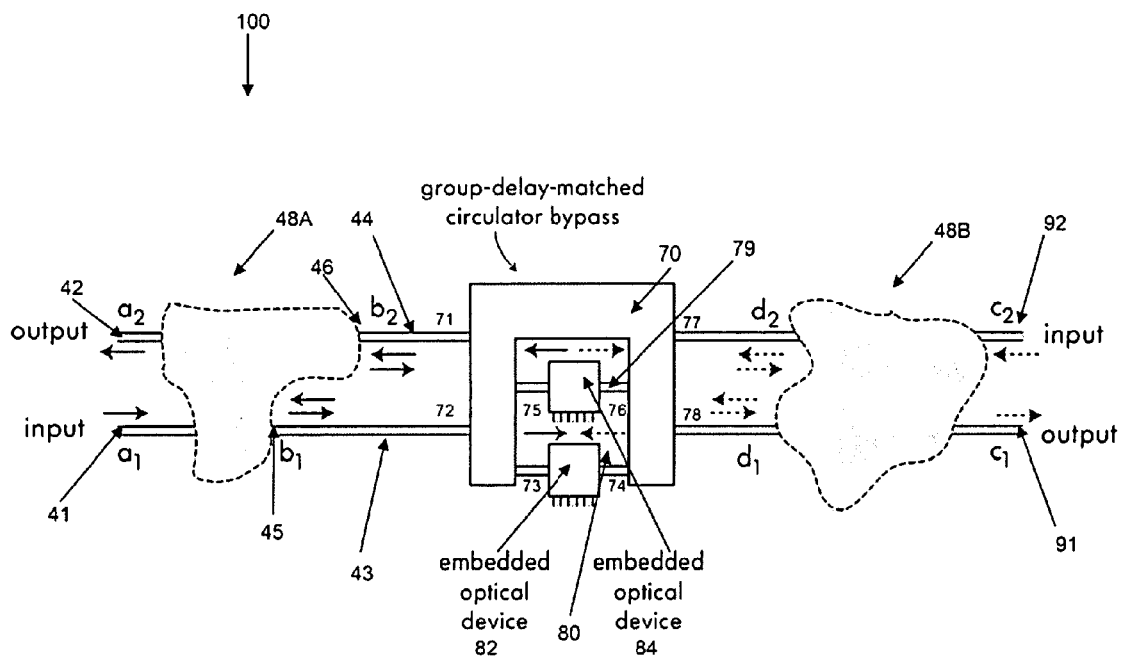
FIG. 22C is a schematic diagram illustrating a general dual folded UBI according to one implementation of the invention, including two independent SCEs, each being a substantially reflectionless (and more preferably LR) 4-port, and an optical device connected to two ports of each SCE, the optical device being an 8-port GMCB, the other four ports of the GMCB being connected in pairs each to one of two EODs.

A more general device may make use of the possibility of propagation in the opposite direction in the two optical paths 79 and 80 than that shown in FIG. 22B. A signal propagating in one optical path 80 from port 74 to port 73, or in the other optical path 79 from port 75 to port 76, will neither substantially enter nor exit ports 71 or 72. Therefore, a second pair of bi-directionally operating ports may be employed in the GMCB 70 corresponding to this second mode of propagation through the optical paths 79 and 80 containing the EODs 84 and 82, respectively. Accordingly, FIG. 22C illustrates one embodiment of a device 100 including two independent SCEs 48A and 48B, and a single, 8-port GMCB 70 shared by the two SCEs 48A and 48B. The device 100 operates as two independent UBIs, with substantially none of the signal entering ports 71 or 72 arriving at ports 91 or 92, and substantially none of the signal entering ports 77 or 78 arriving at ports 41 or 42. The GMCB 70 is shared, so that the SCE 48A and the GMCB 70 functionally form one UBI that does not substantially interact with SCE 48B, and the SCE 48B and the GMCB 70 functionally form a second UBI that does not substantially interact with the SCE 48A. However, signals entering both UBIs propagate through the same EODs 82 and 84, but in opposite directions, as illustrated in FIG. 22C by solid and dashed arrows. Such devices may find applications where one UBI is used as a primary signal path, and the second UBI is used by a local photonic circuit to monitor the state of the EODs 82 and 84. For such an application, the EODs 82 and 84 would preferably be electromagnetically reciprocal, and have substantially small parasitic reflections into the counterpropagating direction to avoid mixing signals in the first and second UBI.

It should be noted that the structures 40, 100 in FIGS. 22A, 22B, and 22C differ from Sagnac loop mirrors, also known in the literature as Sagnac loop interferometers, in at least two aspects. The first aspect is that all folded bypass interferometers according to the present invention provide optically different optical propagation paths 79 and 80 for signals traveling clockwise and counterclockwise through the circuit. This can be implemented by a non-reciprocal phase shift 62 as in FIG. 4, or by physically separated paths 79 and 80 as in FIGS. 22B and 22C. Furthermore, in the case where the bypass interferometers are UBIs, as illustrated in FIGS. 22A and 22B, the input port 41 and the output port 42 are not the same port, while in a Sagnac interferometer the input port is the same as the output port. In other implementations according to the present invention, bypass interferometer devices are shown that do use the same port for input and output. These differ from Sagnac loops as described below.

In order to construct folded bypass interferometers 40, 100, including folded UBIs, physical implementations of the GMCB 70 are required. As described above, such a device needs to contain non-reciprocal elements, in particular optical circulators that discriminate their routing according to the propagation direction. Some properties of optical circulators are described before GMCB configurations are introduced.

FIG. 10 is a schematic diagram showing an ideal 3-port optical circulator 110, and FIG. 11 is a schematic diagram showing an ideal 4-port optical circulator 120, that is used to represent any device that performs this function. FIG. 12 is a schematic diagram showing an ideal 4-port optical circulator 120 formed of four ideal 3-port circulators 110A, 110B, 110C, and 110D, and showing that the phase response of transmission from port 121→122, 122→123, 123→124 and 124→121, i.e., $\Phi_{122,121}$, $\Phi_{123,122}$, $\Phi_{124,123}$, and $\Phi_{121,124}$, respectively, can all be independently chosen without restriction. This is important because GMCB configurations need to have controlled group delay in different propagation directions as described, as well as phase shift. This is also unlike, for example, 2-input, 2-output directional couplers (also 4-ports) where there is a constraint on the transfer matrix phase relationships due to energy conservation.

In cases where the geometrical symmetries of the circulators or of the arrangements of multiple circulators employed are important, the schematic diagrams depicted in FIGS. 13 and 14 are used to represent 4-port circulators. The irregular polygon shape represents the allowed absence of any particular geometrical symmetry. FIG. 13 is a schematic diagram illustrating a representation of one embodiment of a 4-port circulator device 130. FIG. 14 is a schematic diagram illustrating a representation of another embodiment of a 4-port circulator device 140 in which the port topology differs from that depicted in FIG. 13, which is consistent with some known physical realizations of integrated optical circulators. FIGS. 13 and 14 show functionally identical devices 130, 140 in the ideal case, and can be used interchangeably. They differ in the arrangement of ports, which is of consequence in practice, where in-plane waveguide crossings may be required. FIG. 15 is a schematic diagram illustrating one possible physical realization of a 4-port optical circulator 150 having the port topology shown in the device 140 of FIG. 14, and realized in N. Sugimoto et al., *IEEE Photon. Technol. Lett.*, vol. 11, no. 3, page 355-357, March 1999.

Another important component in the construction of a GMCB, in the case where the folded interferometers are to be UBIs, is a non-reciprocal phase shift. FIG. 16 is a schematic diagram showing a bidirectional optical delay line 160 including an optical path 162 with a reciprocal group delay 164 and a non-reciprocal phase shift 166 of 180°, that is, where the phase in traversing the delay line 160 in one direction is 180° different than that in the opposite propagation direction. Such a delay line 160 is the waveguide equivalent of that used in the free-space folded UBI 60 shown in FIG. 4.

Figure 18:
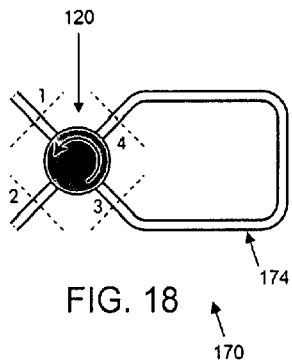
FIG. 18 is a schematic diagram illustrating one embodiment of a GMCB, wherein the EOD includes an optical delay line that is an optical waveguide.
Figure 19:
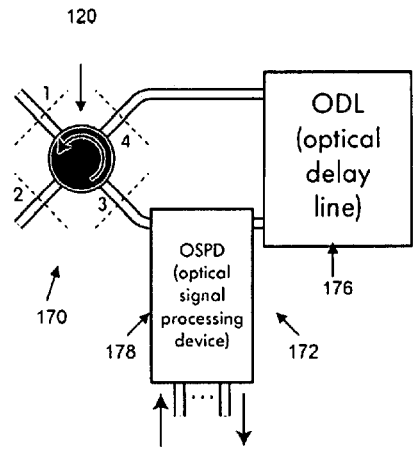
FIG. 19 is a schematic diagram illustrating one embodiment of a GMCB, wherein the EOD includes a cascade of an optical delay line and an arbitrary OSPD.

One embodiment of a general implementation of a GMCB 170 is described with reference to, and schematically illustrated in, FIG. 17. The GMCB 170 includes a 4-port optical circulator 120 of arbitrary design and an embedded optical device 172 that includes an optical delay line, where the circulator 120 phase responses are designed to ensure that the group delays in traversal of the device from ports 121 to 122, and from ports 122 to 121, are substantially the same. In passing from port 121 to port 122, the signal passes through the circulator 120 only, and sees phase $\Phi_{122,121}$ (from FIG. 12), while in passing from port 122 to port 121, the signal sees not only the circulator phase $\Phi_{123,122}+\Phi_{121,124}$ but also the attached optical delay line's group delay. This is a simplified embodiment in comparison to the generalized GMCB 70 depicted in FIG. 22B, where one EOD 84 is a simple delay line $\Phi_{72,71}$ within the circulator. For successful operation of the GMCB 170, the phase delays over the OWR need to be balanced in the two directions. The optical delay line may simply be a length of optical waveguide 174, as illustrated FIG. 18. More preferably, the EOD 172 will be a cascade of an optical delay line 176 and an arbitrary optical signal processing device 178, such as a filter, as shown in FIG. 19. In the latter case, the phase response of the filter 178 will alter the phase delay in one path with respect to the other near the resonant wavelength of the filter 178. However, the OWR of the GMCB 170 is that wavelength range over which the optical signal processing device 178 does not significantly affect the propagating signal (i.e., for channel add-drop filters, these are the off-resonance wavelengths). Over that OWR, the GMCB 170 depicted in FIG. 19 is equivalent to that depicted in FIG. 17.

Figure 17:
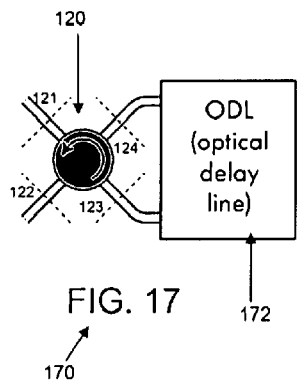
FIG. 17 is a schematic diagram illustrating a general GMCB according to one implementation of the invention, including a 4-port optical circulator of arbitrary design, with an EOD including an optical delay line, and where the circulator design phase responses are designed so that the group delays in traversal of the device from port 121 to 122 and 122 to 121 are substantially the same.

Although the circulator 120 in FIG. 17 may in general be engineered to balance the phase and group delays to form a GMCB 170 by forming the circulator 120 in any number of circulator implementations by adjusting the design for group delays, for example using four 3-port circulators 110 and inserting appropriate delay lines (as depicted in FIG. 12), there are further design qualities that such a general design doesn't address. First, it is of interest to ensure group delay balancing by a symmetry in the structure, which is not apparent in the embodiments depicted in FIGS. 17 to 19. The group delay balancing should not be sensitive to design approximations, fabrication errors, wavelength, or the state of the device in the case of reconfigurable devices. Secondly, practical circulators may have substantial insertion losses. For folded bypass interferometers, including the UBIs depicted in FIGS.

22A, 22B, and 22C, it is additionally important to have substantially equal insertion losses in the two propagation directions 79, 80 through the GMCB 70, to ensure common-mode amplitude modulation only in the interferometer arms, and therefore successful recombination into one output of the bypass interferometer.

Figure 20:
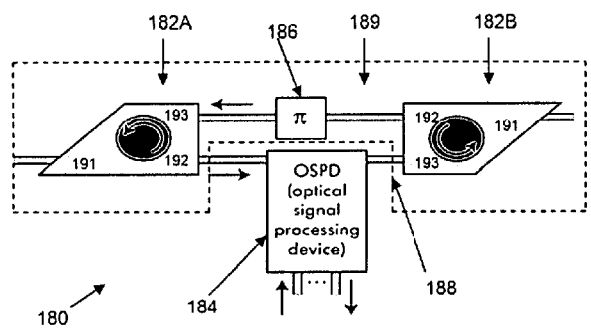
FIG. 20 is a schematic diagram illustrating a GMCB according to one implementation of the invention that includes two 3-port circulators and an EOD that is an OSPD, and that permits group-delay-matching to the EOD, a controlled non-reciprocal phase shift, and immunity to non-ideal behavior such as loss in the 3-port circulators.

A GMCB configuration 180 comprising two identical circulators 182A and 182B is sufficient to provide a geometrical symmetry that substantially guarantees balanced group delay and losses, as described accordingly with reference to FIG. 20. FIG. 20 is a schematic diagram illustrating a GMCB 180 with an EOD 184 being an OSPD, as in FIG. 19. The GMCB configuration 180 includes two 3-port circulators 182A and 182B and permits group-delay-matching to the EOD 184, a controlled non-reciprocal phase shift 186 (here showing 180°, i.e., π radians), and immunity to non-ideal behavior such as loss in the 3-port circulators 182A, 182B by virtue of the geometrical symmetry. The signal propagates along identical paths 188 and 189 over the OWR, if the circulators 182A and 182B are identical and the arms 188 and 189 are identical. If the EOD 184 imparts some loss to bypassing signals in the bottom path 188, this may be compensated by introducing a loss in the top path 189. It should be noted that in spite of geometrical resemblance of the topology, the GMCB 180 depicted in FIG. 20 does not fall into the class of devices referred to as UBIs. This is because the SE 182A and the CE 182B are non-reciprocal, yet have identical orientations of the DC bias magnetic field in relation to their respective geometries (i.e., their circulators are both "counter-clockwise"). In a UBI with a non-reciprocal SE and CE, on the other hand, the CE needs to have a reversed DC bias magnetic field in relationship to its geometry with respect to the SE, as shown in, and previously described with respect to, FIG. 2. Accordingly, for FIG. 20 to be a UBI, the circulator of the CE 182B would have to reverse its operating direction from counter-clockwise to clockwise. But, this is not the desirable configuration for a passive GMCB 180 described here.

Propagation in arms 188 and 189 or through the EOD 184 may introduce parasitic reflections into the opposite propagation direction. By themselves, small reflections may be tolerated. However, if the circulators 182A and 182B pass substantially all light entering port 192 to port 193 of the circulator 182A, 182B, a closed resonant optical path is formed by the circulators 182A, 182B and the arms 188, 189 for propagation to the left along the bottom arm 188 and to the right along the top arm 189. Therefore, small reflections may excite and build up a high-Q, narrow resonance that can have significant detrimental effects on operation of the device.

Figure 21:
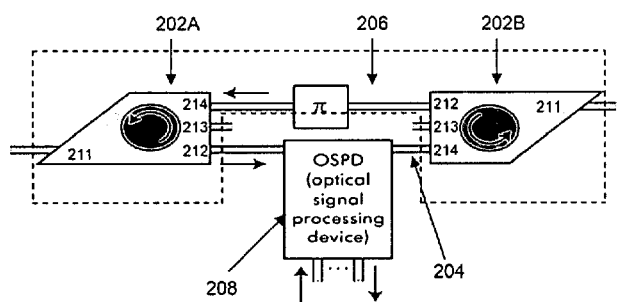
FIG. 21 is a schematic diagram illustrating a GMCB according to one implementation of the invention, which includes two 4-port optical circulators and is connected so as to prevent the build-up of a backward circulating resonance due to any spurious back-reflections.

Losses may be introduced in a circulator 182A or 182B between port 192 and port 193 to prevent resonance (one way is to break one of the four paths depicted in the 4-port case in FIG. 12; and similarly for the present 3-port case). Another explicit way to suppress the counter-propagation resonance by introducing loss is to use 4-port circulators, leaving 2 ports unused. Accordingly, in another implementation of the invention, a GMCB 200 is described based on a pair of substantially identical 4-port circulators 202A and 202B, shown in FIG. 21. In general any number of ports greater than 3 will suffice. FIG. 21 is a schematic diagram illustrating a GMCB configuration 200 according to one implementation of the invention, which includes two 4-port optical circulators 202A, 202B and is connected to prevent the build-up of a backward circulating resonance due to any spurious back-reflections. Signals propagating left along the bottom arm 204 exit port 213 of the left circulator 202A, while signals propagating right along the top arm 206 exit port 213 of the right circulator 202B, thus preventing a spurious resonance buildup.

Such GMCB configurations 200 provide all of the desired features for constructing a folded bypass interferometer and in particular a folded UBI. The configurations 200 provide balanced group delay and loss by geometrical symmetry, and are simple to trim for a given desired DPS in the arms 204 and 206 or to compensate for small losses introduced by the EOD 208 in the bottom arm 204.

An objection may be raised that a GMCB 200 relying on two identical circulators 202A and 202B is being proposed as part of a method to improve tolerance of a UBI 10 to an inability to make a perfectly identical SE 12 and CE 14 (see FIG. 1). However, the circulators 202A and 202B used as part of the GMCB 200 are to be broadband devices with slowly varying spectral response over the OWR, and furthermore fixed in time (not switchable). Broadband devices are generally not highly sensitive to dimensional, refractive index and other possible fabrication errors, and they can be more easily trimmed by adding small broadband phase shifts using thermal-optic phase shifters into the arms 204 and 206. Small losses may also be added to compensate a broadband loss imbalance by inserting a fixed or adjustable broadband compensating loss mechanism into at least one arm connecting the two circulators 202A and 202B. Such a loss mechanism may be, for example, a variable directional coupler or Mach-Zehnder interferometer, with one unused output port carrying away a certain fraction of power to produce a compensating loss.

By shifting the requirement of geometrical symmetry from the SE 12 and CE 14 pair of a conventional design depicted in FIG. 1, which may have narrowband resonances and be switched at high speed, to the circulators in the present designs which are broadband and static, the fabrication tolerances can be considerably improved and the requirement for synchronization in switching or tuning of the SCE 48 removed by the folded arrangement.

Figure 23:
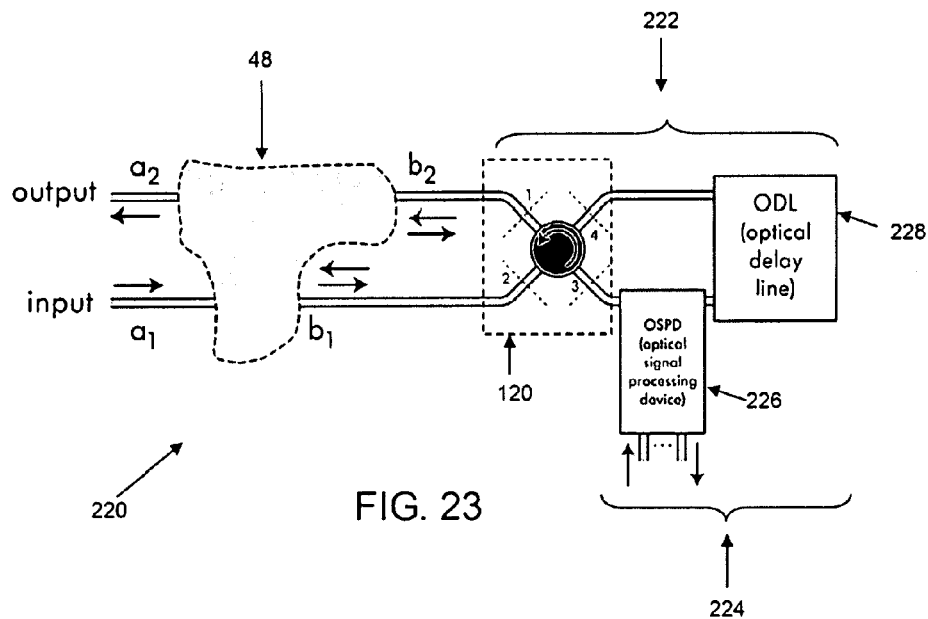
FIG. 23 is a schematic diagram illustrating a general folded UBI according to one implementation of the invention, wherein the EOD is a GMCB containing a second EOD, the latter EOD comprising an OSPD cascaded with an optical delay line.

In another aspect, the invention relates to folded UBI configurations that are based on the described GMCB configurations that balance loss and group delay by symmetry. FIG. 23 is an exemplary schematic diagram illustrating a general folded UBI 220 according to an implementation of the invention, derived from the device 40 depicted in FIG. 22A, wherein the EOD 222 is a GMCB 222 including a second EOD 224—an OSPD 226 cascaded with an optical delay line 228. The GMCB 222 includes one generic 4-port circulator 120 and has the form shown in FIG. 19.

Figure 24:
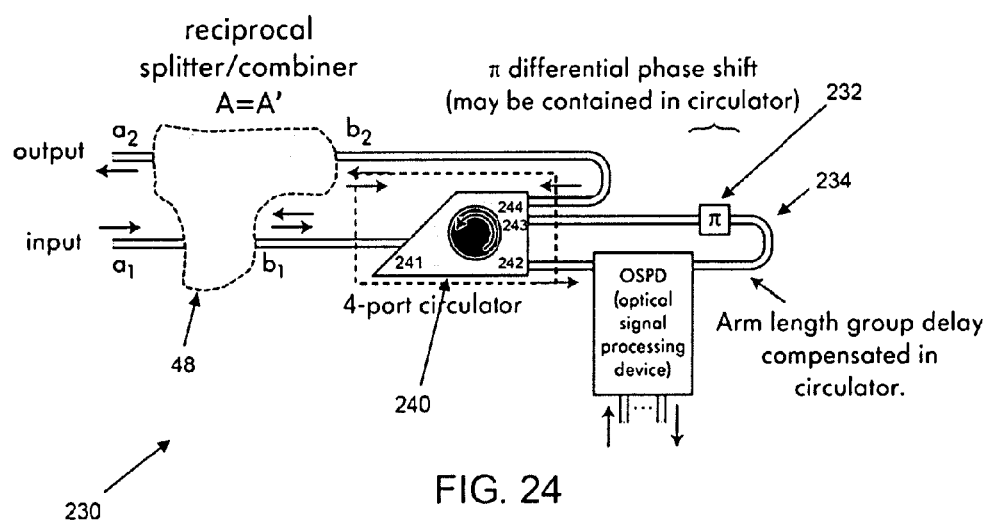
FIG. 24 is a schematic diagram illustrating a general folded UBI according to one implementation of the invention, wherein the optical delay line in a second EOD includes a 180° phase shift with respect to the bypass path from port 244 to 241 of the circulator.

FIG. 24 depicts a second exemplary schematic diagram illustrating a general folded UBI 230 according to an implementation of the invention. The optical delay line in the second EOD includes a 180° phase shift 232 relative to the bypass path from port 244 to port 241 of the circulator 240. This variant is equivalent to the folded UBI 220 depicted in FIG. 23, but shows explicitly the lack of symmetry necessary in general in the circulator design to compensate the group delay of the arm 234.

Figure 25:
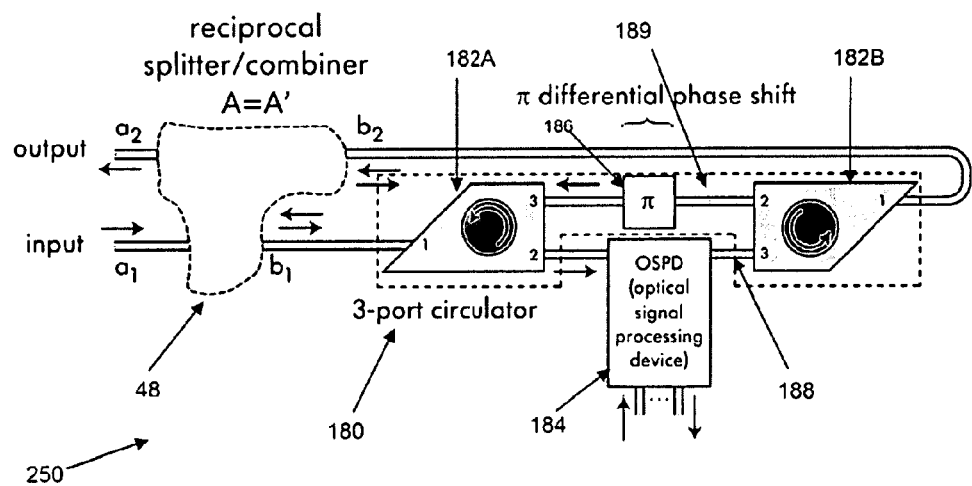
FIG. 25 is a schematic diagram illustrating a general folded UBI according to one implementation of the invention, wherein the GMCB configuration of FIG. 20 is employed.
Figure 26:
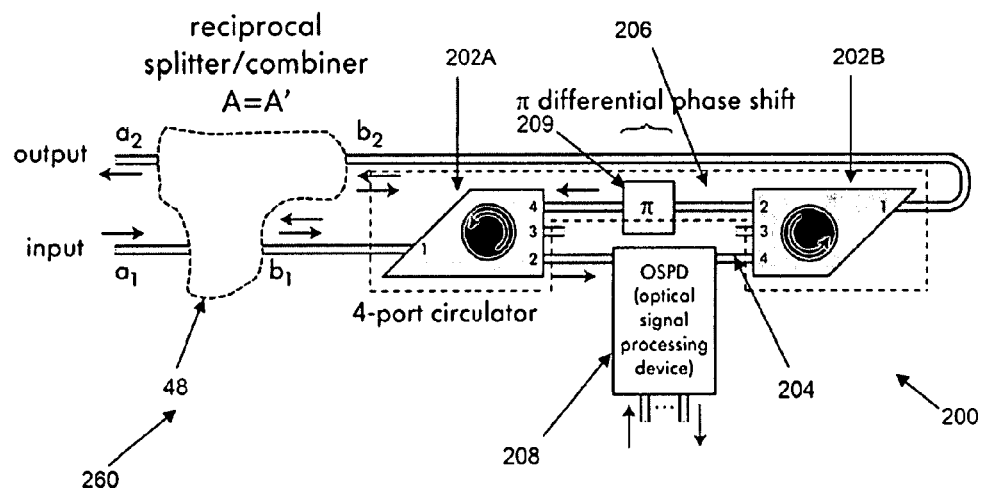
FIG. 26 is a schematic diagram illustrating a general folded UBI according to one implementation of the invention, wherein the GMCB configuration of FIG. 21 is employed.

The explicit design of the circulators 120, 240 is not specified in FIGS. 23 and 24, and may take any geometry that meets GMCB requirements in general, including use of circulators of the generic form depicted in FIG. 12. More preferable folded UBI designs, tolerant to fabrication errors and loss, result from using the symmetrized GMCB configurations 180, 200 depicted in FIGS. 20 and 21. In another aspect of the invention, such configurations are provided, as shown in FIGS. 25 and 26. FIG. 25 is an exemplary schematic diagram illustrating a general folded UBI 250 according to an implementation of the invention, wherein the GMCB configuration 180 depicted in FIG. 20 is employed. FIG. 26 is a schematic diagram illustrating a general folded UBI 260 according to another implementation of the invention, wherein the GMCB configuration 200 depicted in FIG. 21 is employed. The latter case illustrates the use of 4-port circulators 202A and 202B to suppress contra-directional parasitic resonance in the GMCB 200 that is possible in principle in the configuration 180 depicted in FIG. 25, as described previously. Both of the general embodiments of a folded UBI 250, 260 depicted in FIGS. 25 and 26 show one arm 188, 204 containing an EOD 184, 208 that is a general OSPD and a second arm 189, 206 containing an EOD 186, 209 that represents the 180° DPS desired for UBI operation. In general, one or both EODs may be arbitrary optical devices, or may not be inserted into the circuit.

Most generally, the GMCB is a 6-port device 70, as shown in FIG. 22B, or an 8-port device 70 as shown in FIG. 22C. However, when one EOD is a simple element such as a 180° phase shift, it may be considered part of the GMCB device 70, such that the 6-port variant has 4 external ports and becomes a 4-port, while the 8-port variant becomes a 6-port.

Next, several embodiments of the invention that carry out functions of hitless filter tuning, extension of the tunable FSR of a filter, and "hot swapping" of photonic circuits into a live network are described.

Figure 27:
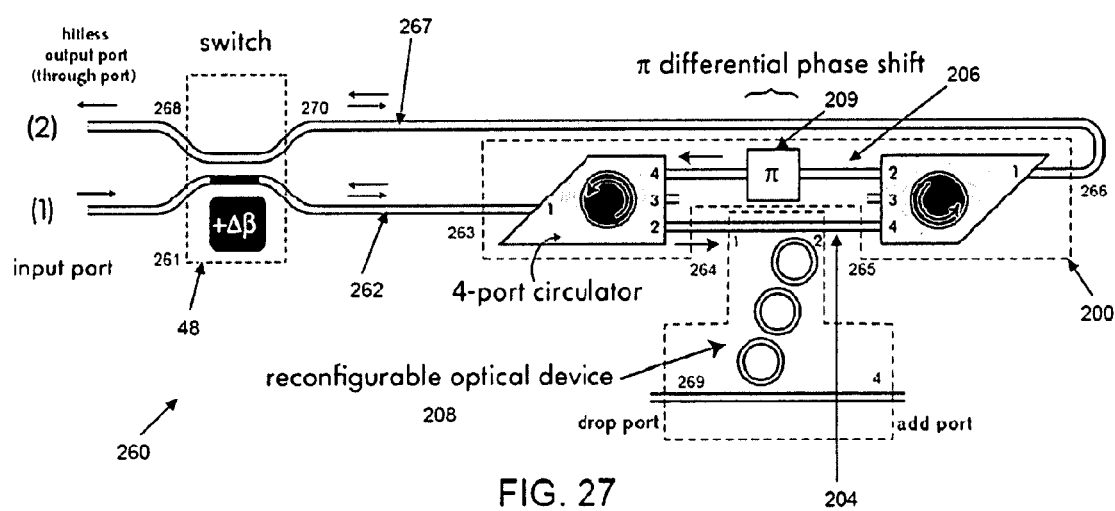
FIG. 27 is a schematic diagram of one implementation of a hitless tunable filter design, using a folded UBI, wherein the SCE is a Δβ-type switch, and the EOD within the GMCB is a third-order microring-resonator filter.

FIG. 27 is an exemplary schematic diagram of an implementation of the invention representing a hitless tunable filter design, using a folded UBI 260 according to FIG. 26, wherein the SCE 48 is a $\Delta\beta$-type switch, and the EOD 208 within the 4-port GMCB 200 is a third-order microring-resonator filter. The present embodiment 260 provides improved tolerances to fabrication error and eliminates the need to synchronize tuning or switching elements in an SE and CE. The filter design used for this example is the same as the example filter used for the unfolded, conventional UBI hitless switch described in H. A. Haus, M. A. Popovic and M. R. Watts, IEEE Photon. Technol. Lett., vol. 18, no. 10, May 15, 2005, the entire contents of which are hereby incorporated herein by reference. In operation, when the $\Delta\beta$ switch 48 is in one state, a signal within the OWR entering the first port 261 of the switch 48 traverses the circuit 260 counterclockwise, starting in the bottom arm 262, entering the second port 263 of the GMCB 200, exiting the third port 264 of the GMCB 200, passing along an optical path 204 through the microring filter 208, entering the fourth port 265 of the GMCB 200, exiting the first port 266 of the GMCB 200, traveling along the top arm 267 back to the switch 48, and exiting the device 260 at the hitless output port 268. When the $\Delta\beta$ switch 48 is in a second state, a signal within the OWR entering the first port 261 of the switch 48 traverses the circuit 260 clockwise, starting in the top arm 267, entering the first port 266 of the GMCB 200, passing through the arm 206 containing a $\pi$ radian excess phase delay 209 within the GMCB 200, exiting the second port 263 of the GMCB 200, traveling along the bottom arm 262 back to the switch 48, and also exiting the device 260 at the hitless output port 268. In the latter case, the signal bypasses the filter 208. In all intermediate states of the switch 48, which is a directional coupler with a continuously variable coupling ratio, the signal is split in an arbitrary manner between the top arm 267 and the bottom arm 262, and one fraction of the signal traverses the circuit 260 clockwise, while the rest traverses the circuit 260 counterclockwise, but substantially all output signal in the OWR exits at the hitless output port 268. This operation causes the filter 208 to be gradually bypassed by the action of the switch 48. Before, during, and after the switching, all signal outside the passband of the filter 208, which is not substantially affected by the filter 208 and is thus in the OWR of the folded UBI 260, is fully passed to the hitless output port 268. Thus, express wavelength channels are not disturbed by the switching operation. This is exemplified in FIGS. 28 and 29, which show, respectively, the response of the filter drop port 269 and the response of the total device 260 through port 268.

Figure 28:
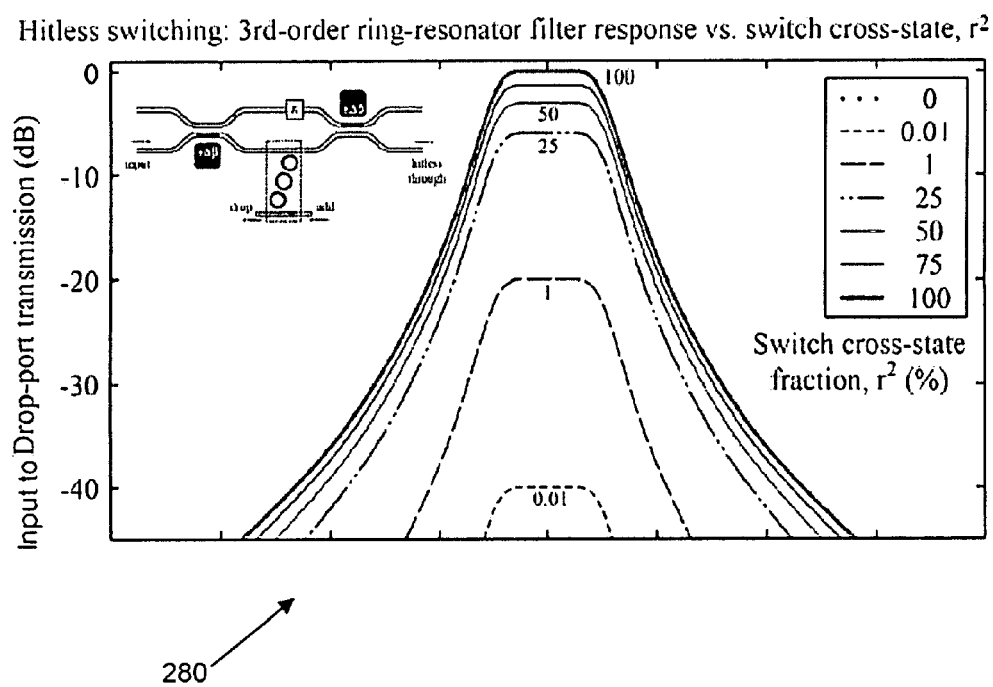
FIG. 28 is a graph illustrating the drop port spectral response of the embodiment of the hitless-switched filter illustrated in FIG. 27, for various states of the Δβ switch.
Figure 29:
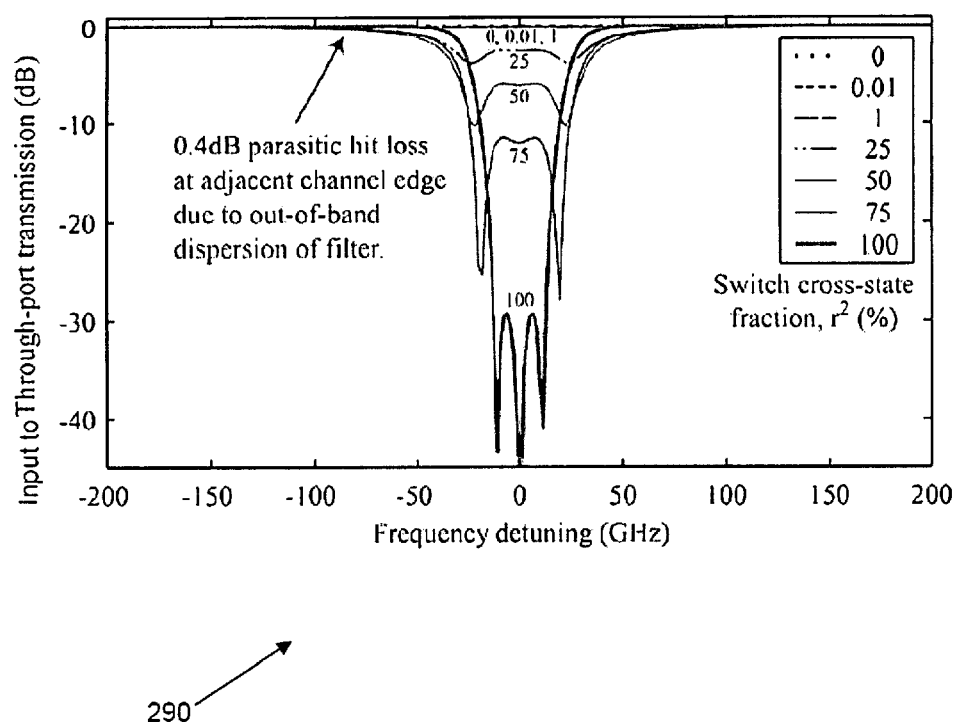
FIG. 29 is a graph illustrating the through port spectral response (in the hitless output port) of the embodiment of the hitless-switched filter illustrated in FIG. 27, for various states of the Δβ switch.

As an example, consider a three-ring filter 208, as depicted in FIG. 27, with substantially equal ring bend radii and guided mode group indices such that the ring FSR is 4 THz, and coupling gaps that give equal ring-to-bus waveguide power coupling coefficients of 7%, and ring-to-ring power coupling coefficients of 0.08%. Such a filter 208 is suitable for a 100 GHz spaced WDM channel grid. FIG. 28 is a graph 280 illustrating the drop port 269 spectral response of the hitless-switched filter 208 in FIG. 27, for various states of the $\Delta\beta$ switch 48, while FIG. 29 is a graph 290 illustrating the through port 268 spectral response (in the hitless output port 268) for various states of the $\Delta\beta$ switch 48. The switch 48 state is shown in the legends as the power coupling ratio to the cross-port of the $\Delta\beta$ switch 48, i.e., for an input signal entering the input port 261 of the switch 48, it is the fraction of power coupled to port 270 as a result of the switch 48 actuation.

Figure 30:
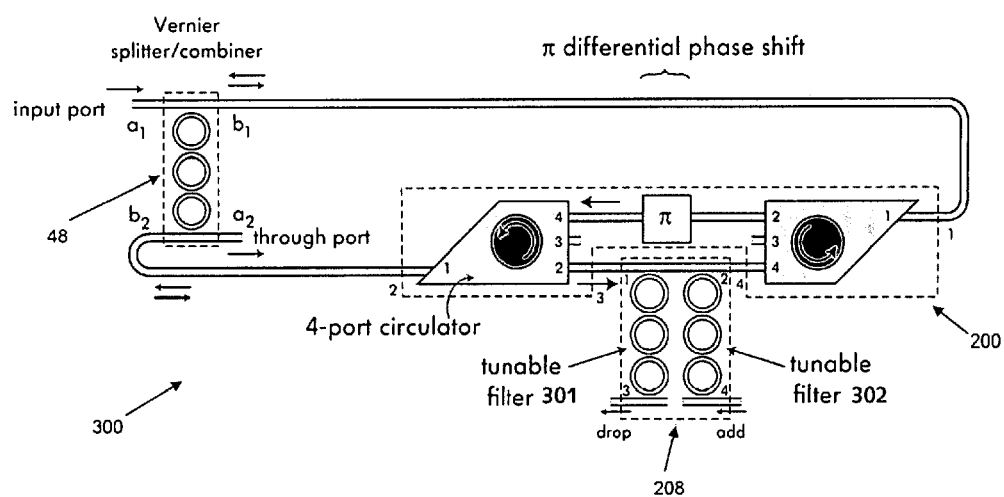
FIG. 30 is a schematic diagram of a UBI-based Vernier scheme for multiplication of the tunable FSR of a filter according to one implementation of the invention, which is based on an SCE that is a microring-resonator filter, and where the EOD within the GMCB is a cascade of two third-order microring-resonator filters.
Figure 31:
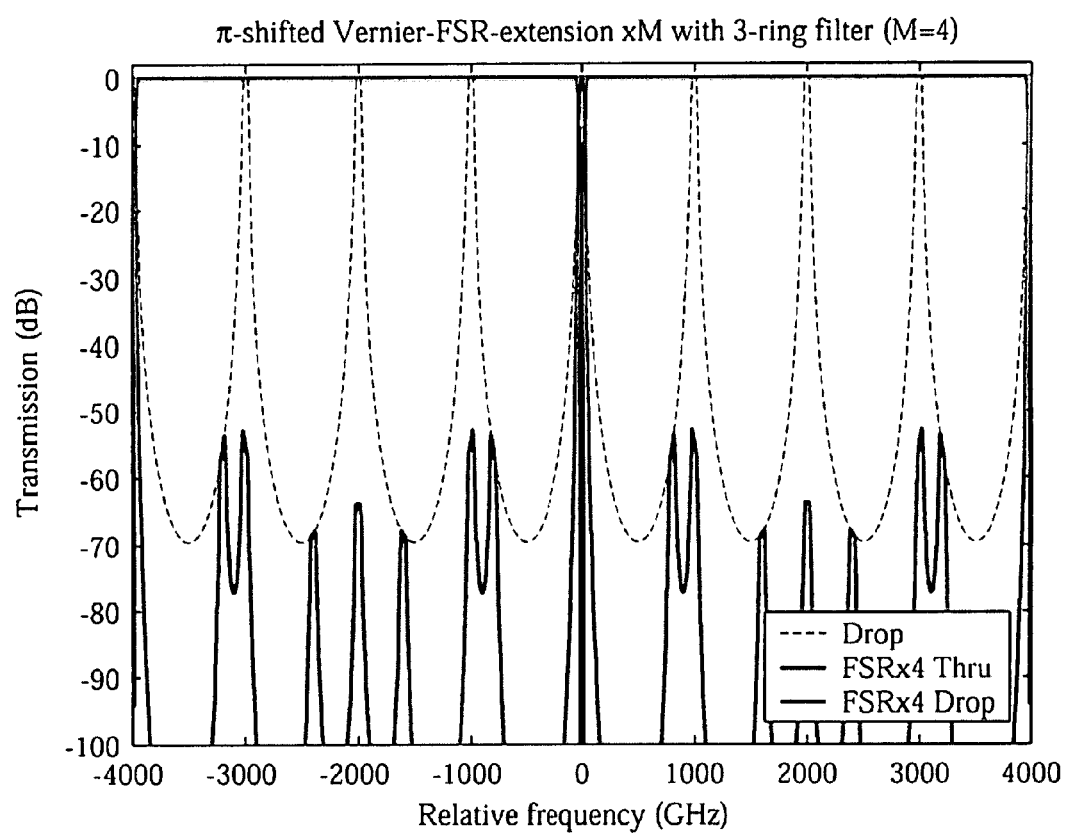
FIGS. 31 to 35 are graphs illustrating the operation of a π-shifted Vernier scheme based on the embodiment of the folded UBI and microring-resonator filter SCE illustrated in FIG. 30.
Figure 32:
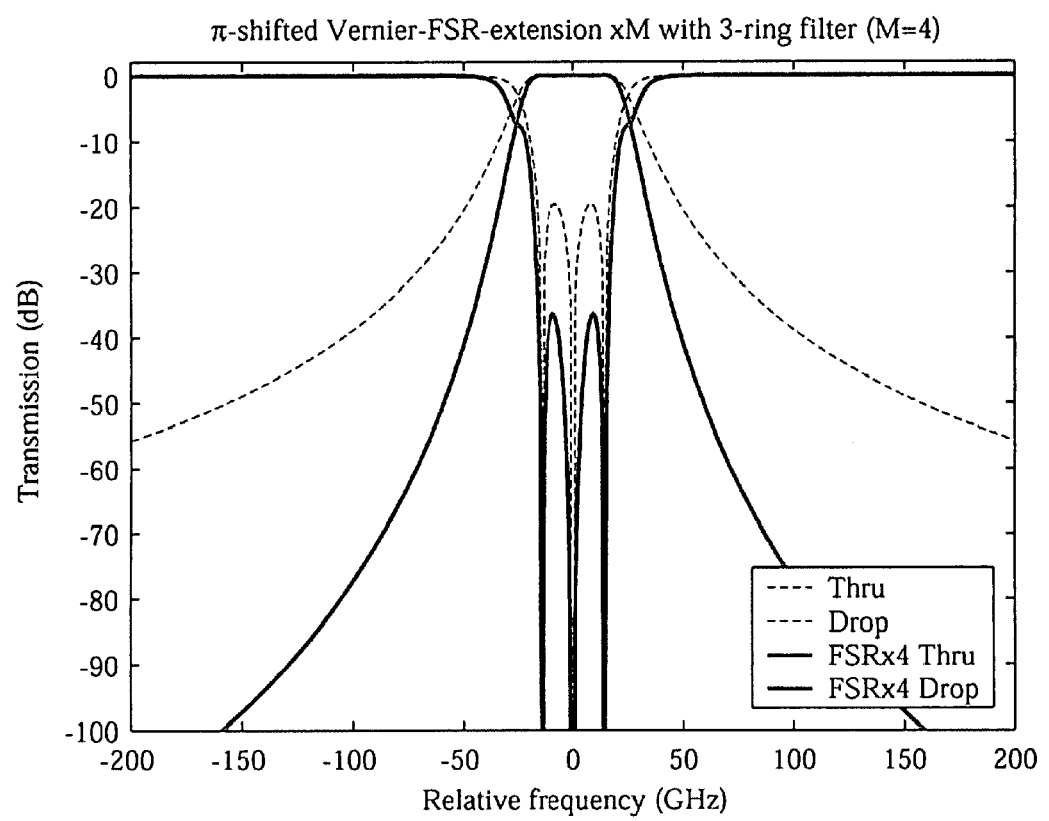
Figure 33:
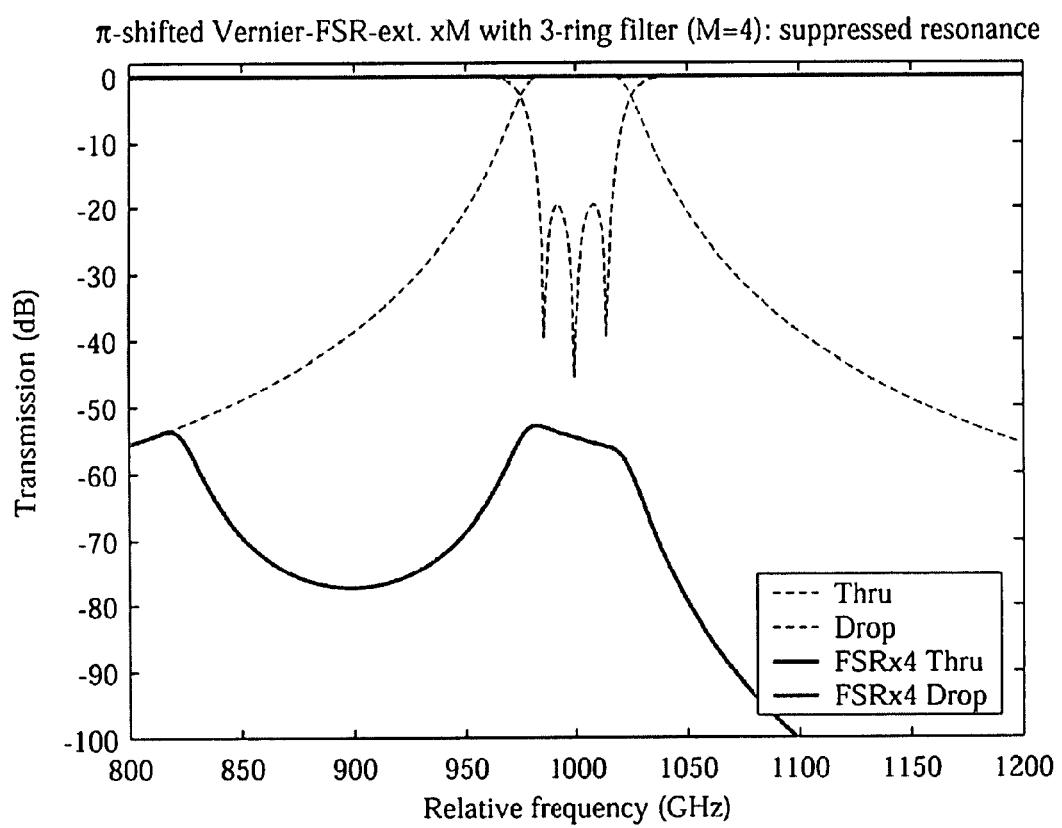
Figure 34:
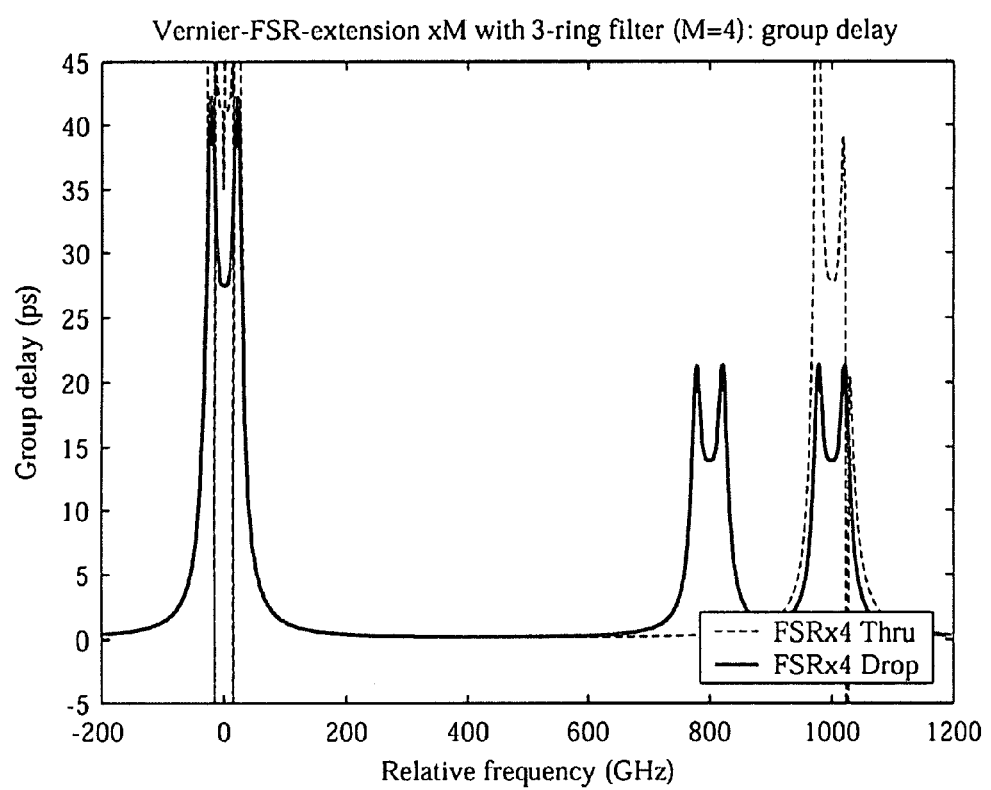
Figure 35:
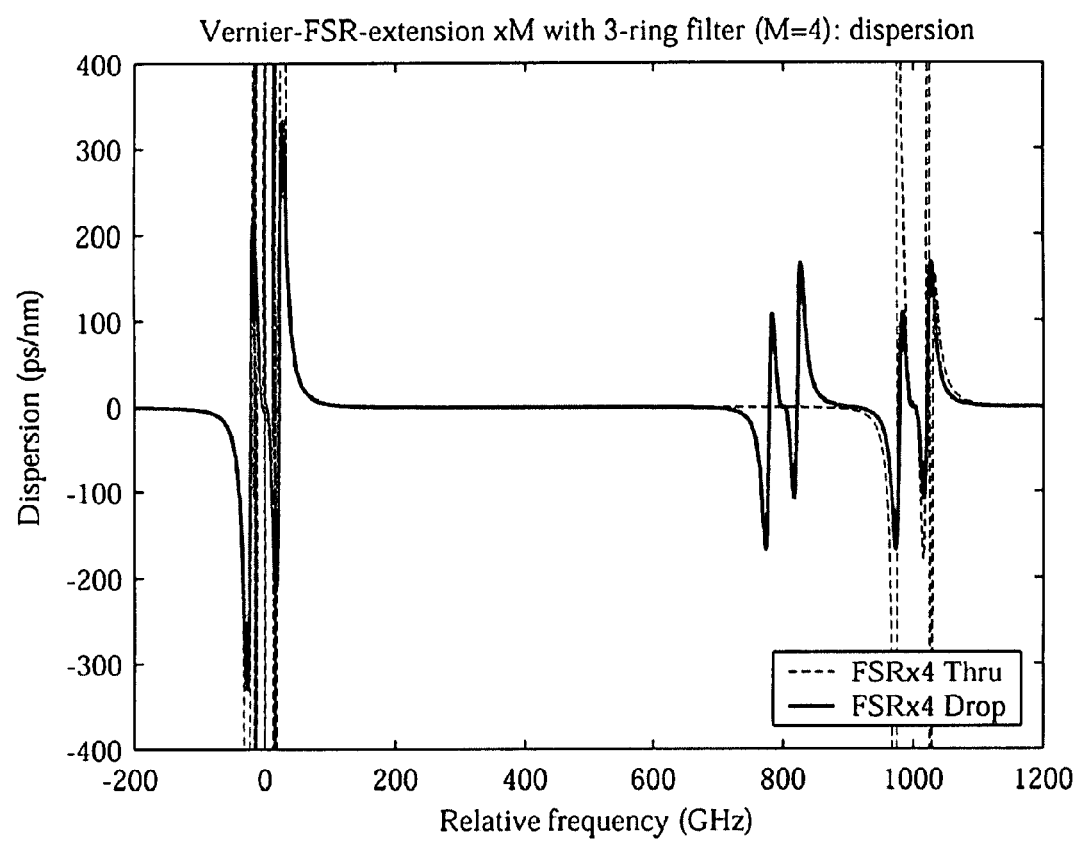

In another embodiment of the invention, schematically illustrated in FIG. 30, a folded-UBI-based Vernier scheme 300 is described for multiplication of the tunable FSR of a filter 208. The folded UBI 300 is based on an SCE 48 that is a microring-resonator filter and the EOD 208 within the GMCB 200 is a cascade of two third-order microring-resonator filters 301, 302. The result is a tunable filter 208 with a multiplied effective FSR and multiplied wavelength tuning range for a given index change, or equivalently a given temperature change in the case of thermo-optic tuning. The folded embodiment according to the invention provides improved fabrication tolerance and eliminates the need to synchronize the SE 12 and CE 14 filters, as is required in the unfolded embodiment 10 of FIG. 8. Here the single SCE filter 48 is tuned in place of the SE 12 and CE 14 being synchronously tuned. As a result, the folded embodiment 300 also uses no more than half the power for actuating the SCE 48, e.g., in the case of thermo-optic tuning, and typically fewer tuning elements (i.e., heaters).

FIGS. 31-35 are graphs illustrating in more detail the operation of the $\pi$-shifted Vernier scheme 300 shown in FIG. 30. The graphs are identical to FIGS. 5 and 13 depicted in the '848 Application, which describe the operation of the unfolded device 10 illustrated in FIG. 8, and the '848 Application may be referred to for details of operation, filter parameters, and frequency response, which are the same for either the folded embodiment 300 of FIG. 30 or the unfolded embodiment 10 of FIG. 8.

As noted in the '848 Application, a microring-based SE 12 and CE 14 in the unfolded embodiment 10 of FIG. 8 for multiplying the tunable FSR introduces dispersion into the through port of the complete device. As a result, as discussed in the '848 Application, a modified UBI-based Vernier tunable filter 10, using an SE 12 and CE 14 that are lattice filters, as illustrated in FIG. 9, was proposed. The SE 12 and CE 14 in such a filter contribute very little or no excess dispersion in the through port, which is desirable in telecom-grade tunable filters that may be cascaded many times.

Figure 36:
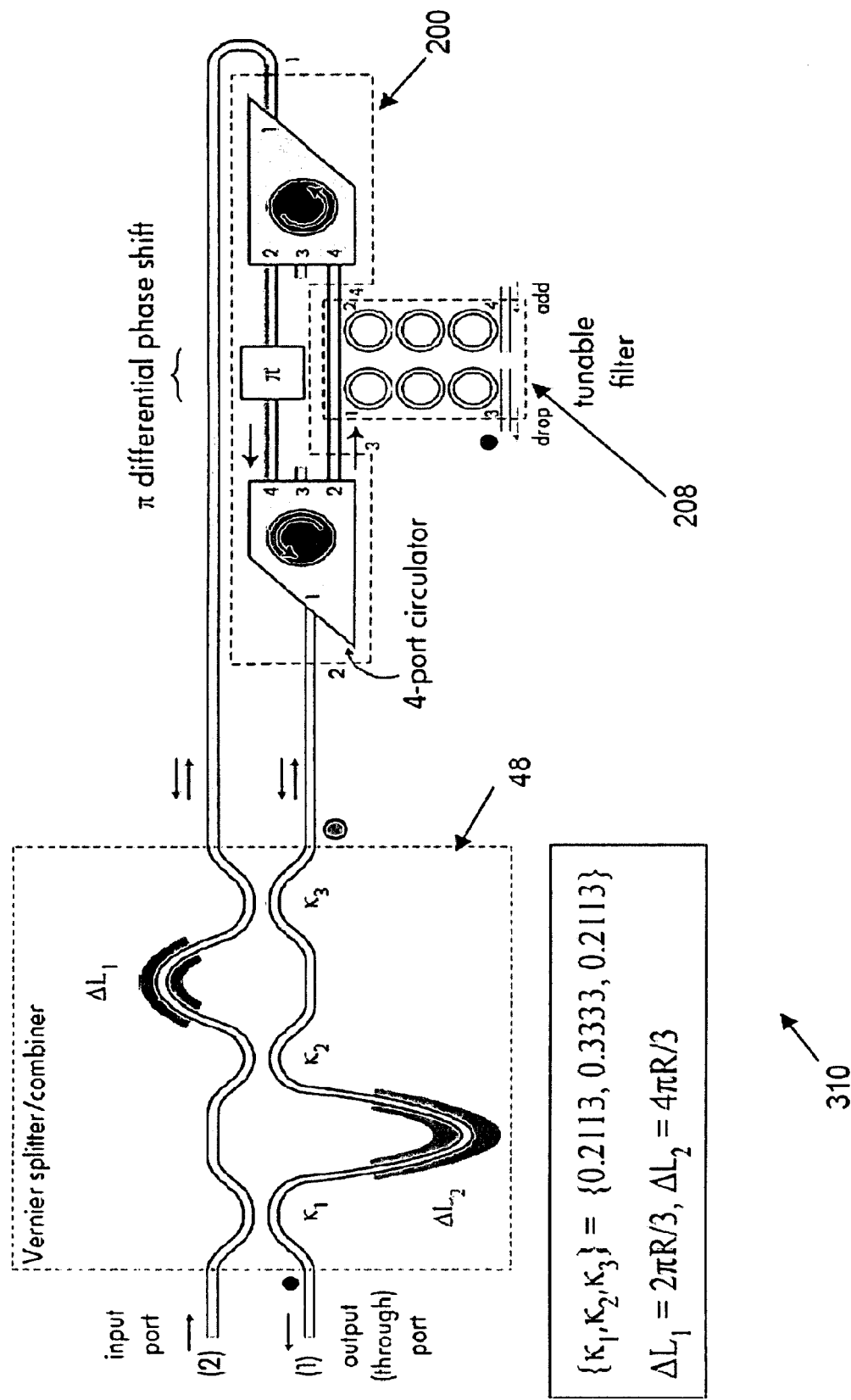
FIG. 36 is a schematic diagram of a UBI-based Vernier scheme for multiplication of the tunable FSR of a filter according to one implementation of the invention, which is based on an SCE that is a Mach-Zehnder-interferometer-like lattice filter, and where the EOD in the GMCB is a cascade of two third-order microring-resonator filters.
Figure 37:
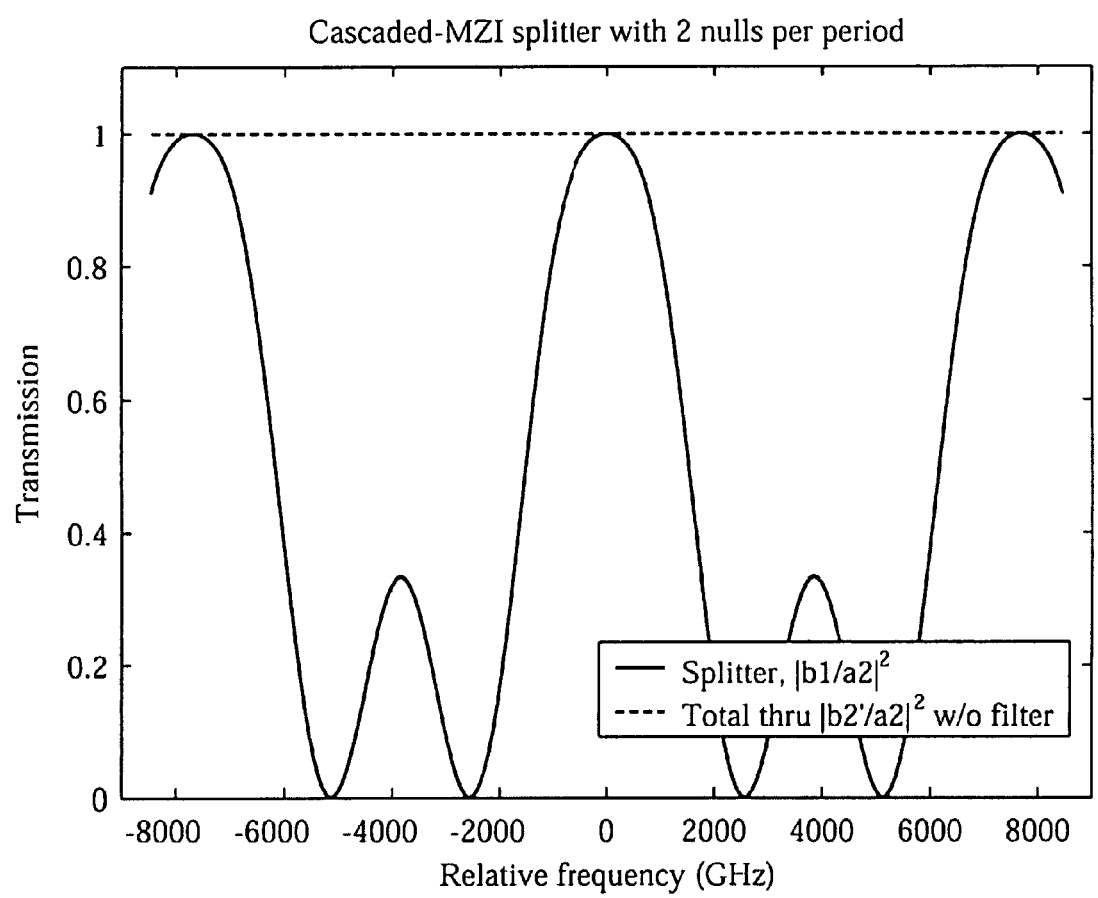
FIGS. 37 to 46 are graphs illustrating the operation of a π-shifted Vernier scheme based on the embodiment of the folded UBI and Mach-Zehnder lattice filter SCE illustrated in FIG. 36.
Figure 38:
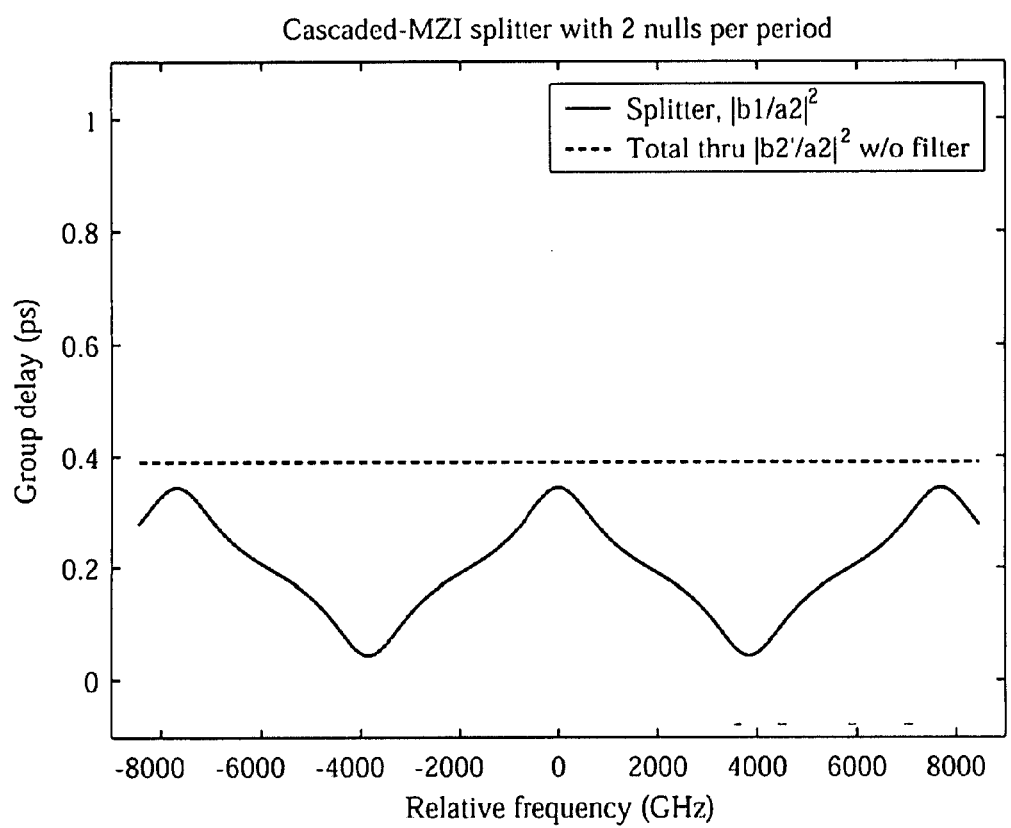
Figure 39:
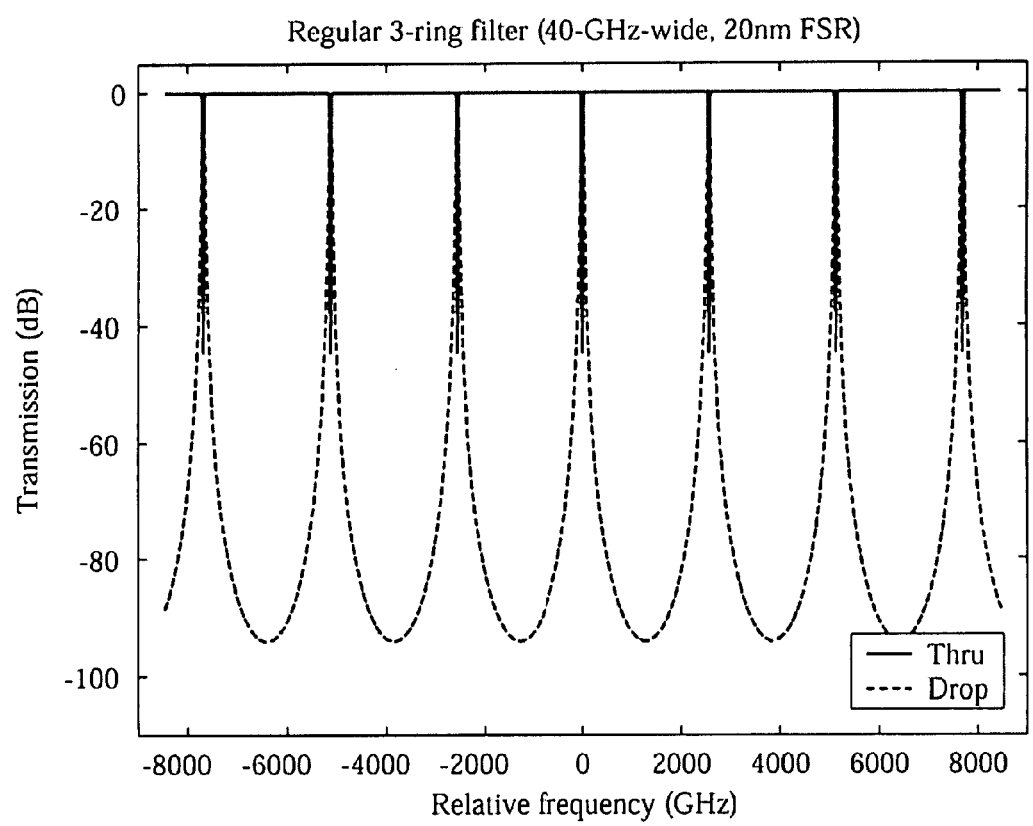
Figure 40:
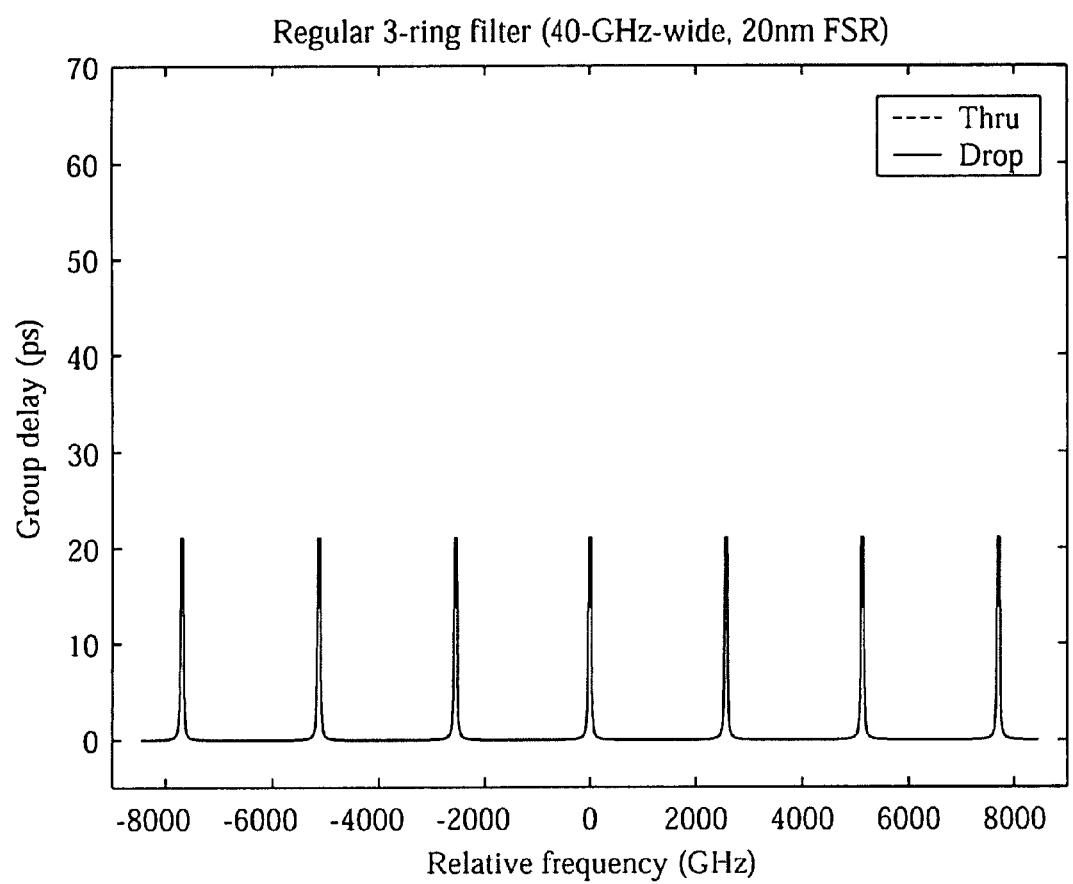
Figure 41:
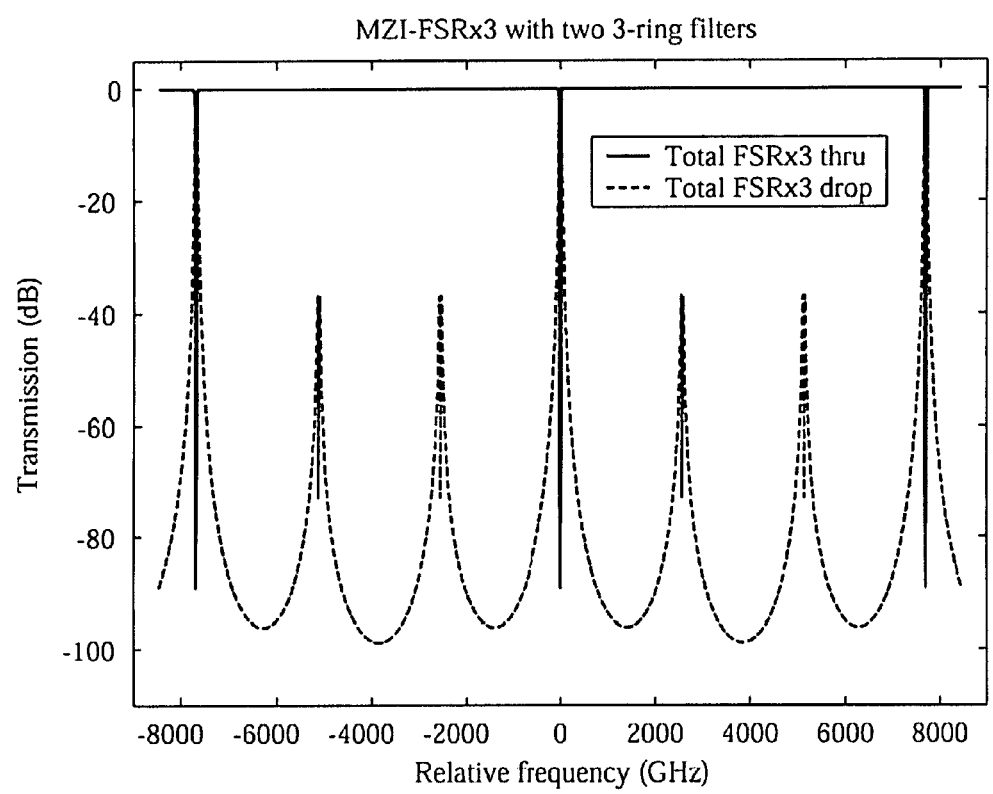
Figure 42:
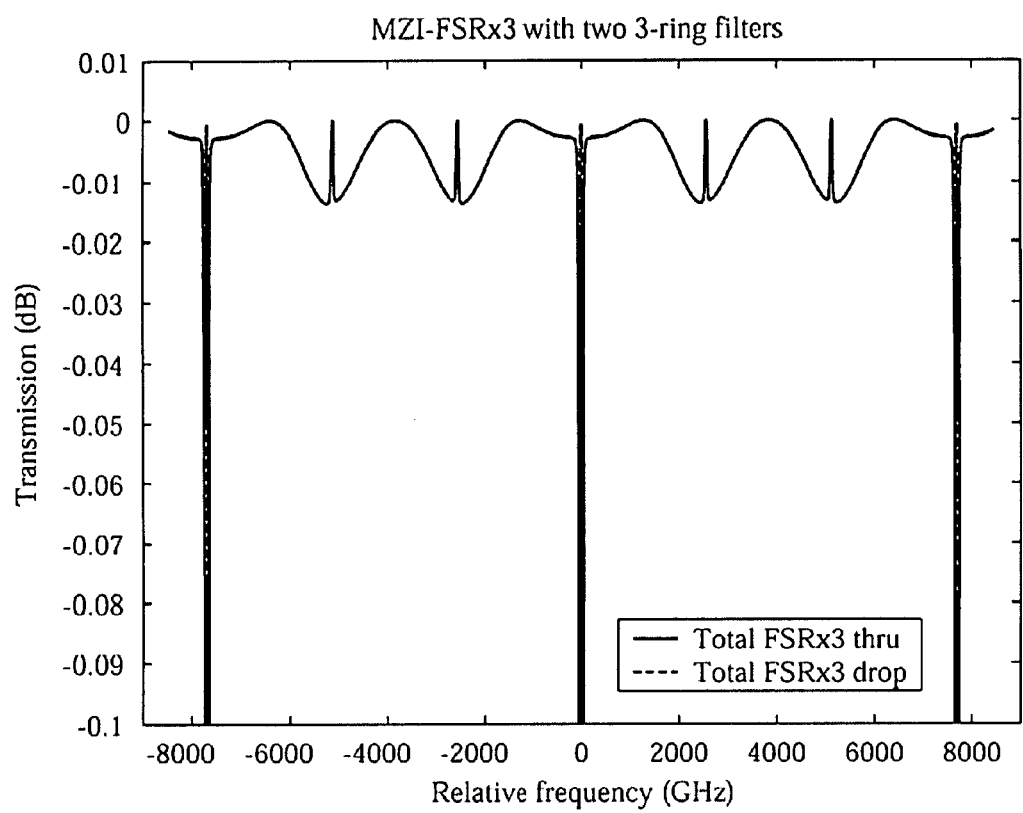
Figure 43:
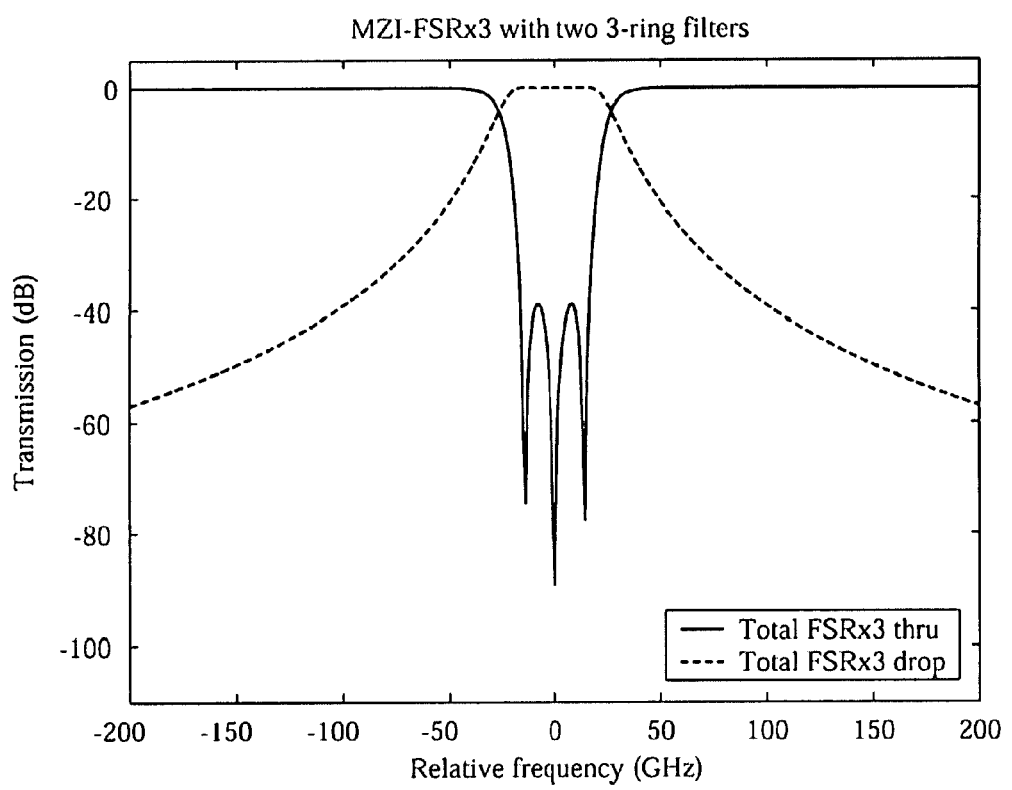
Figure 44:
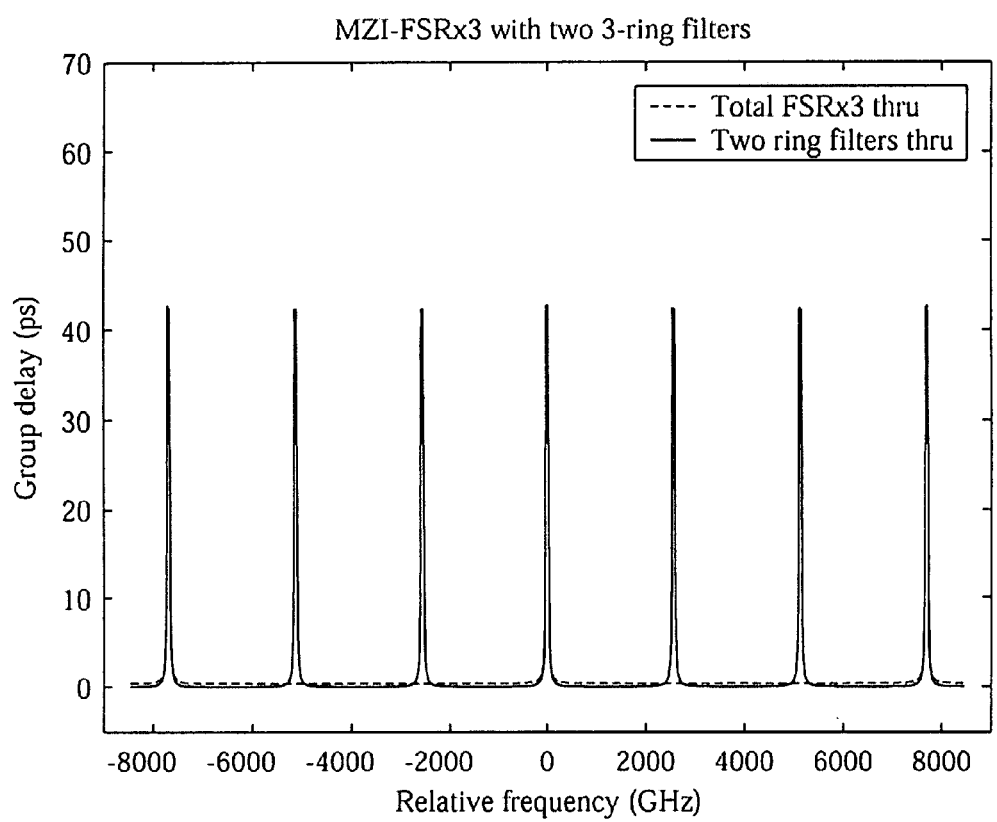
Figure 45:
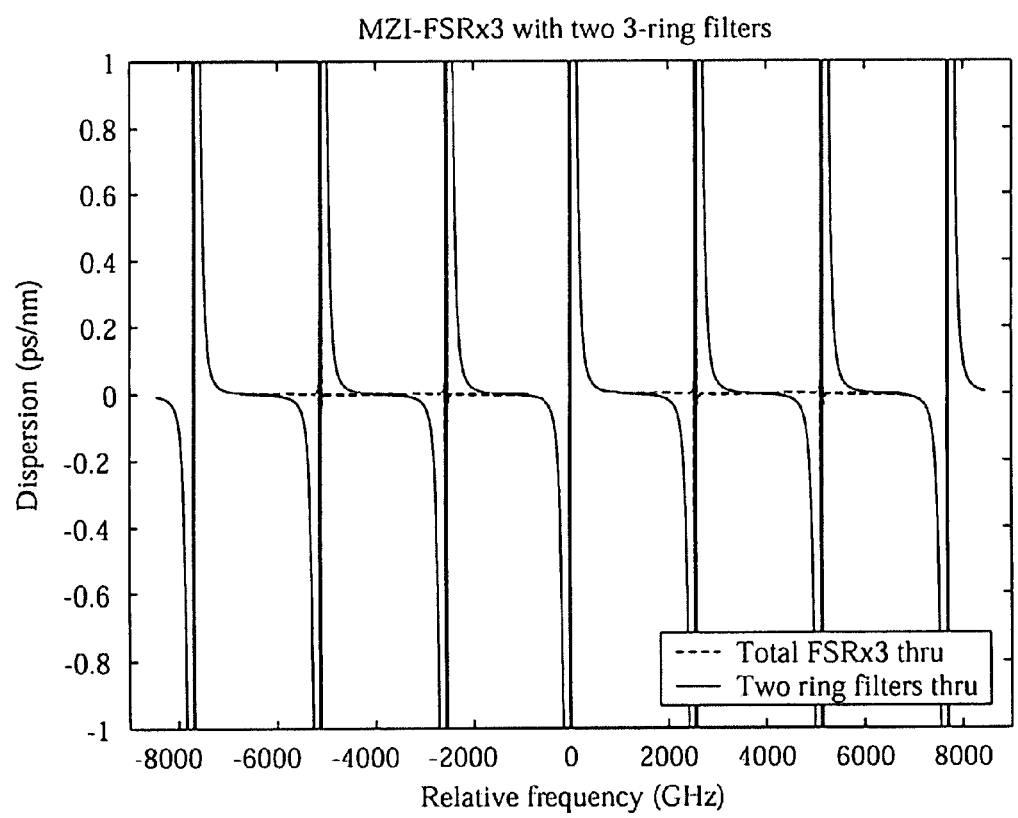
Figure 46:
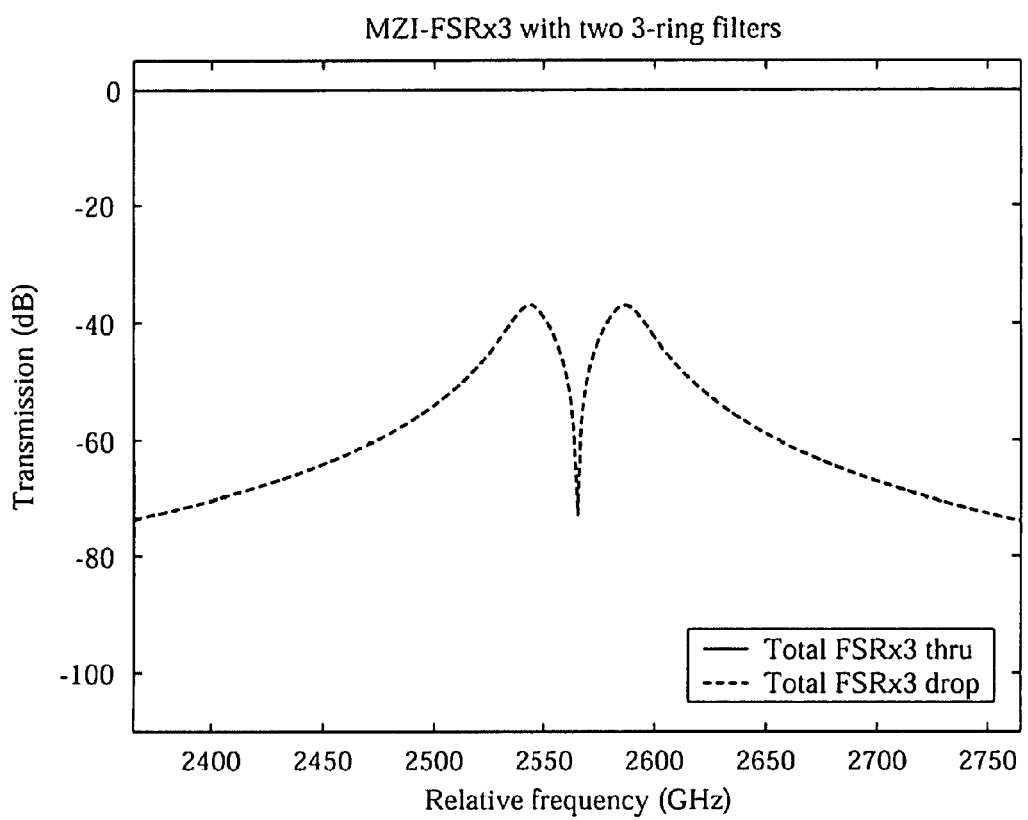

Another embodiment of the present invention relates to a folded-UBI-based Vernier scheme 310 for multiplication of the tunable FSR of a filter, based on an SCE 48 that is a Mach-Zehnder-interferometer-like lattice filter and where the EOD 208 within the GMCB 200 is a tunable filter including a cascade of two third-order microring-resonator filters. FIG. 36 is an exemplary schematic diagram of the device 310, which provides a filter with a tripled effective FSR, and a three times increased achievable wavelength tunability for a given index change.

FIGS. 37-46 are graphs illustrating the operation of the π-shifted Vernier scheme based on the folded UBI 310 and the Mach-Zehnder lattice filter SCE 48 shown in FIG. 36. The graphs depicted in FIGS. 37-46 are identical to those depicted in FIGS. 22 and 23 of the '848 Application. Thus, FIGS. 22 and 23 of the '848 Application and the description in the '848 Application related thereto may be referred to for the details of operation of the folded embodiment 310 of FIG. 36. However, again, the folded embodiment 310 of FIG. 36 provides improved fabrication tolerance, and eliminates the need to synchronize the SE 12 and CE 14 filters, as is required in the unfolded embodiment 10 of FIG. 9.

Figure 47:
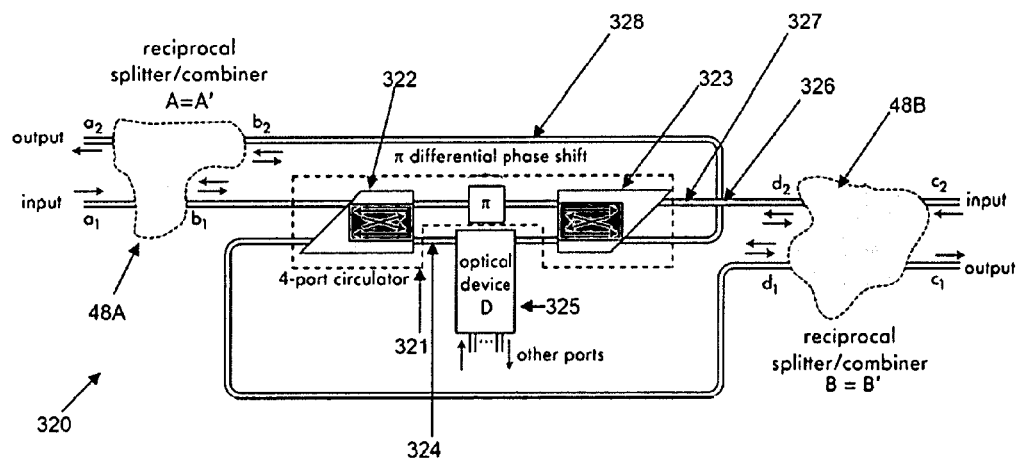
FIG. 47 is a schematic diagram illustrating a dual folded UBI according to one implementation of the invention, including a single 6-port GMCB configuration and two SCEs, connected so as to functionally form two substantially independent folded UBIs.

Another aspect of the present invention concerns the dual folded-UBI devices shown in FIG. 22C, with symmetrized embodiments of the GMCB shown in FIGS. 20 and 21. For example, a dual folded UBI, of the form shown in FIG. 22C, with the symmetrized GMCB configuration of FIG. 21 based on 4-port circulators, but making use of the 4$^{th}$ port of each circulator to make a 6-port GMCB, is illustrated schematically in FIG. 47. The directional-coupler-like form of circulators (of FIG. 14) is used in the schematic for simplicity of connecting ports in the diagram, but any 4-port circulator may be used, including ones of port topology shown in FIG. 13. The general device 320 depicted in FIG. 47 is similar to the device 260 depicted in FIG. 26, but in the present device 320 there functionally exist two independent folded UBIs, one with an SCE 48A and the other with a different SCE 48B. They share the same GMCB 321. With the arrows in the circulator symbols 322, 323 showing propagation paths for different directions of propagation, this design 320 also enables balanced loss and group delay in the two propagation directions by virtue of geometrical symmetry. Under successful operation, note that one constituent folded UBI of the device 320 depicted in FIG. 47, containing SCE 48A, may pass signal from left to right through the filter arm 324 in the EOD 325 within the GMCB 321. The other folded UBI, containing SCE 48B, may pass signal only from right to left through the filter arm 324. The two UBIs, in the ideal case, have no cross talk. An in-plane waveguide crossing 326 may be desired as seen in FIG. 47. In-plane waveguide crossings 326 with low loss (i.e., less than approximately 1 dB) and low cross talk from one waveguide 327, 328 to the other crossing waveguide 328, 327 (i.e., less than approximately −40 dB) have been shown in literature, and can be expected to pose no significant problem.

Figure 48:
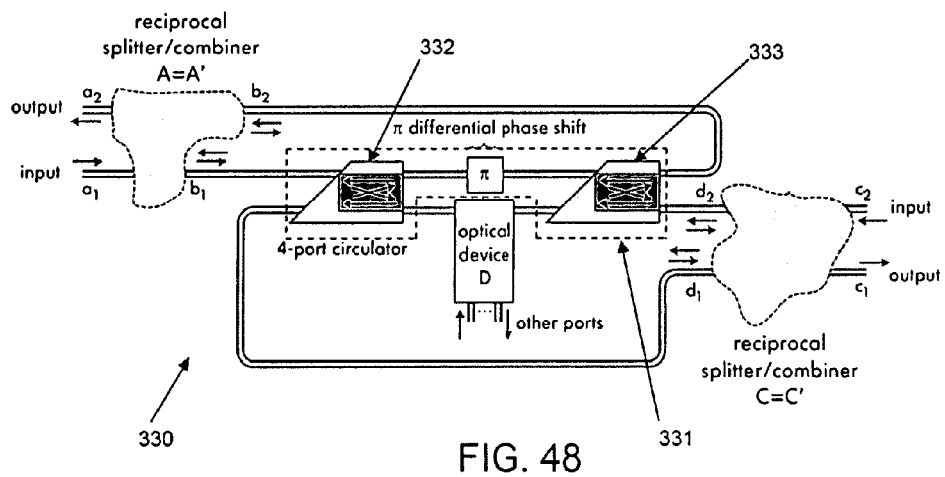
FIG. 48 is a schematic diagram illustrating a dual folded UBI according to one implementation of the invention, similar to the embodiment illustrated in FIG. 47, but containing a GMCB wherein the two constituent circulators have the same orientation.

If waveguide crossings 326—comprising the crossing of two waveguides 327, 328 in plane—are to be avoided, another dual folded UBI geometry 330 is possible according to the invention, shown in FIG. 48, which employs a different configuration of GMCB 331. In this case, however, there is no geometrical symmetry to ensure balancing of loss and group delay in the clockwise and counter clockwise traversal of the GMCB 331 within either UBI. As a result, greater precision will be needed in fabricating the GMCB 331, in particular the circulators 332, 333.

As an application of the dual folded UBIs described above, and according to another aspect of the invention, an embodiment of the dual folded UBI is described below that enables hot-swapping of photonic circuits into and out of a live optical network. For this application, a device that makes use of a single full 8-port GMCB and is configured to functionally form two independent UBIs, based on the topology shown in FIG. 22C, is considered.

In one embodiment, the concept of hot-swapping a photonic circuit into a live optical network is related to hitless switching of the signal wavelengths outside the passband of a tunable filter to a bypass path before the filter is tuned to a new passband wavelength, which is described above with reference to FIG. 27. The idea is to enable the connection and disconnection of a detachable, arbitrary integrated optical device (on a separate chip), having an input port and an output port, into a live optical network optical path. To remove the optical device from the live network, all wavelengths that are passing substantially unaffected through the device (i.e., for which, more generally, the first and second arm impose substantially the same losses and phase delays (aside from the π radian DPS)) are first transferred in a hitless manner to a bypass path. Then, the device may be detached. After connecting another device into the circuit, one first ensures that the UBI requirement is satisfied—that the group delays between the bypass arm and the device arm are balanced and that there is a 180° DPS at all wavelengths that are to pass through the new device unaffected (e.g., unfiltered wavelengths in the case of a filter). A mechanism in the circuit to sense and adjust the group and phase delays is thus needed. Once the group and phase delay are adjusted to the UBI condition, the live network WDM signal may be transferred in a hitless manner back from the bypass path to the device path.

Figure 49:
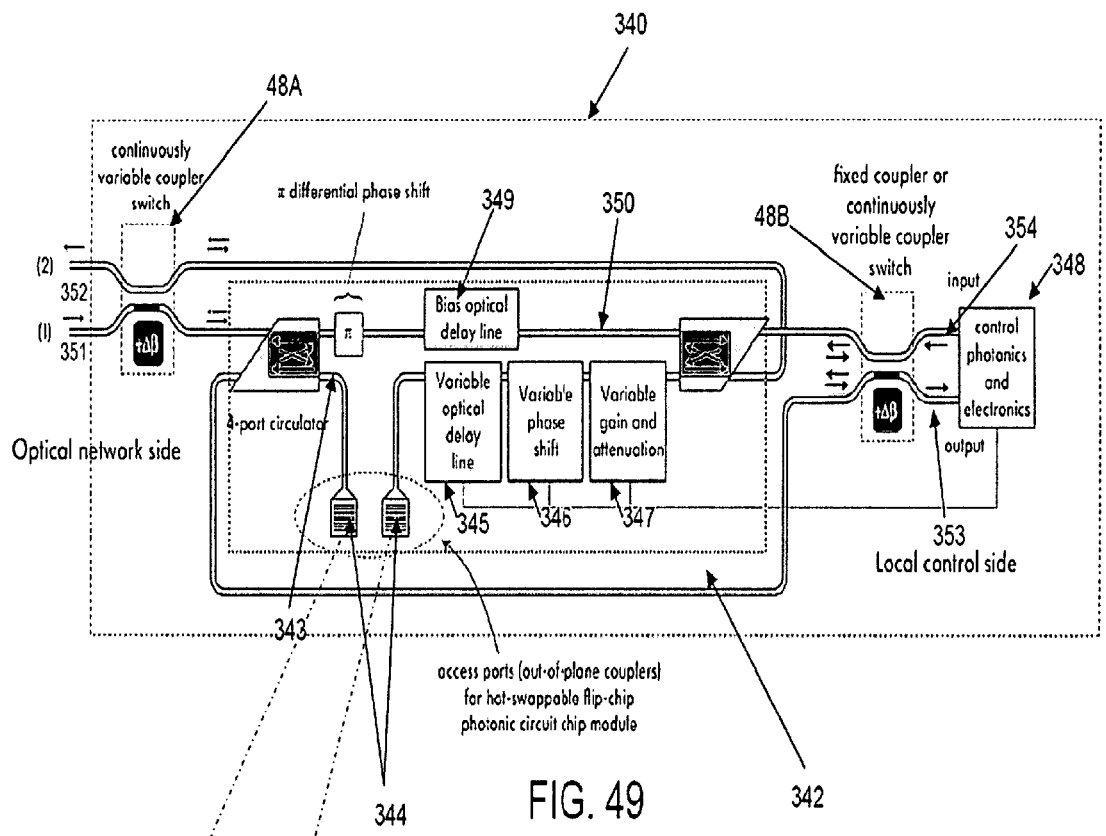
FIG. 49 is a schematic diagram of a UBI-based optical circuit that enables hot-swapping of an optical device into and out of the optical path taken by the signal propagating through the circuit according to one implementation of the invention, which includes a dual folded UBI and a GMCB, and wherein the EOD within the GMCB includes out-of-plane couplers providing access ports for a flip-chip optical device or for optical fiber connections, putting these ports in cascade with one or more of a variable optical delay line, a variable phase shifter, and a variable gain/loss element, one or more of which may be controlled by a control circuit.
Figure 50:
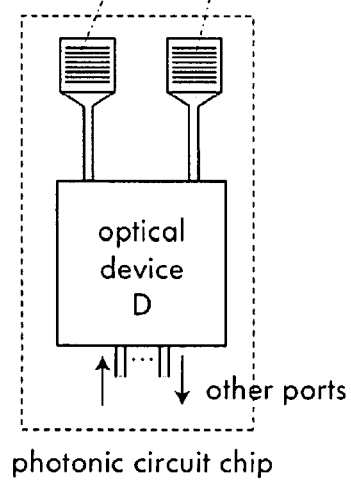
FIG. 50 is a schematic diagram of one embodiment of a flip-chip optical device compatible with the hot-swapping optical circuit illustrated in FIG. 49.

Accordingly, an embodiment of the invention is schematically illustrated in FIG. 49 representing a dual folded-UBI-based optical circuit 340 that enables hot-swapping of an optical device 341 into and out of an optical path 343. The optical circuit 340 consists of dual folded UBIs as in FIG. 47, and a GMCB 342. The EOD in one arm 343 includes out-of-plane couplers 344 providing access ports for a flip-chip-coupled optical device 341 or optical fiber connections, and may be in cascade with one or more of a variable optical delay line 345, a variable phase shifter 346, and a variable gain/loss element 347, one or more of which may be controlled by a control circuit 348. The circuit 340 may also have a second controllable or fixed bias optical delay line 349 in the other arm 350 of the GMCB 342 to permit group delay balancing for a range of possible attached optical devices 341. The top arm 350 should preferably not be adjusted during live operation, or else should preferably be adjusted over long time scales to permit the network to adiabatically, i.e., smoothly, adapt without errors, since the WDM signal is passing through the top arm 350 during most of the reconfiguration operations. FIG. 50 is a schematic diagram of a flip-chip optical device 341 compatible with the hot-swapping optical circuit 340 of FIG. 49.

From the WDM optical network side, the device 340 has two accessible ports, an input port 351 and an output port 352, which is similar to the hitless switch 260 depicted in FIG. 27. The objective is to make the device 340 act as a hitless switch, with the additional provision that the group delay balancing and 180° DPS in the arms 343 and 350 may not be satisfied in general when a new device 341 is attached to the EOD access ports 344. A control circuit 348 is thus used to adjust the group delay balancing with a variable optical delay line 345, the DPS at a wavelength in the OWR with a variable phase shifter 346, and the loss balancing between the arms 343 and 350. If the EODs 341, 345, 346, 347 in the GMCB 342 are reciprocal devices, the second UBI (with SCE 48B) of the device 340 may be used for sensing the group delay balance, phase shift, and loss balance. This may be done by sending an optical test signal into the device 340 from port 353, which propagates through the EODs 341, 345, 346, 347 in the opposite direction to the signals belonging to the live WDM network connected to the input port 351 and hitless port 352. Since in the ideal case the two UBI circuits are decoupled, and no light is coupled from one to the other, the circuit group delay may be interrogated by the second UBI using SCE 48B and launching from port 353, while the network signal is passing through the device 340 undisturbed. The control circuit may be configured to detect the optical signal returning through port 354, and thus to determine the differential group delay and loss, and the DPS in the arms 343 and 350. This may be done by adjusting switch 48B to a 50% coupling ratio, and observing the interferometric response returning from the circuit 340. When the control circuit 348 adjusts the controllable group delay, DPS, and loss, the measured test signal response in port 354 will have a substantially flat, broadband spectrum in comparison to the OWR of the device 341, i.e., a large FSR of the interference in comparison to the OWR, and a minimal insertion loss.

Further Embodiments of the Technology

1) Circulator Bypass

A circulator bypass ("CB") is most generally an optical device having a pair of bidirectional input/output ("BIO") ports whereby a substantial portion of the signal entering a first port of the pair exits either fully from one or fully from the other of the pair of ports, with a certain phase and group delay, and with substantially low, preferably wavelength independent loss across the OWR of the CB. In addition, a substantial portion of the signal entering the second port of the pair exits from the opposite port from which the signal entering the first port exits, but with substantially the same group delay and loss, and with a substantially fixed difference in phase delay, which may be zero, 180°, or any other phase. Signals entering one or the other BIO port pass through a first or a second EOD, wherein each of the two EODs is connected to the device via a further pair of ports. Finally, a second pair of BIO ports may exist and work in the same way as the first pair of BIO ports, but when these ports are excited the signal passes through the same EODs in the opposite direction. This allows two independent signals at the same wavelength to interrogate devices that have substantially no reflection, like microring and other traveling-wave resonators. If the devices are furthermore reciprocal, the same response may be tested by two independent signals.

Thus, in the most general case, the CB is an 8-port device 360, as illustrated in FIG. 51. Ports 1 and 2 are the first pair of BIO ports, ports 7 and 8 are the second pair of BIO ports, and ports 3, 4, 5 and 6 are the two pairs of ports for attachment of the two EODs. Only one EOD may be employed, in which case the second EOD is replaced by a straight waveguide section. To provide the stated function, the CB includes two 4-port circulators 361, 362. The CB 360 may be further generalized as stated later.

To meet the balanced loss and the group and phase delay (as described in the above two paragraphs) for signals entering one and the other port in a pair of BIO ports, two substantially identical circulators 361, 362 of arbitrary design may be used, with a specific geometrical symmetry of the arrangement ensuring balanced operation, as illustrated in FIG. 52. The irregular polygon for the circulators 361, 362 is used to indicate the orientation of one circulator 361, 362 with respect to the other 362, 361.

If the signal entering one port of a pair of BIO ports exits the same port, the device is a reflection-mode circulator bypass, and if it exits the opposite port, the device is a swap-mode circulator bypass. The mode of operation depends on the connection of the EODs. Referring to FIG. 53, if a first EOD 363 is connected between ports 3 and 4 and a second EOD 364 is connected between ports 5 and 6, the device 360 is a swap-mode circulator bypass. Referring to FIG. 54, if the first EOD 363 is connected between ports 3 and 5 and the second EOD 364 is connected between ports 4 and 6, the device 360 is a reflection-mode circulator bypass.

Figure 55:
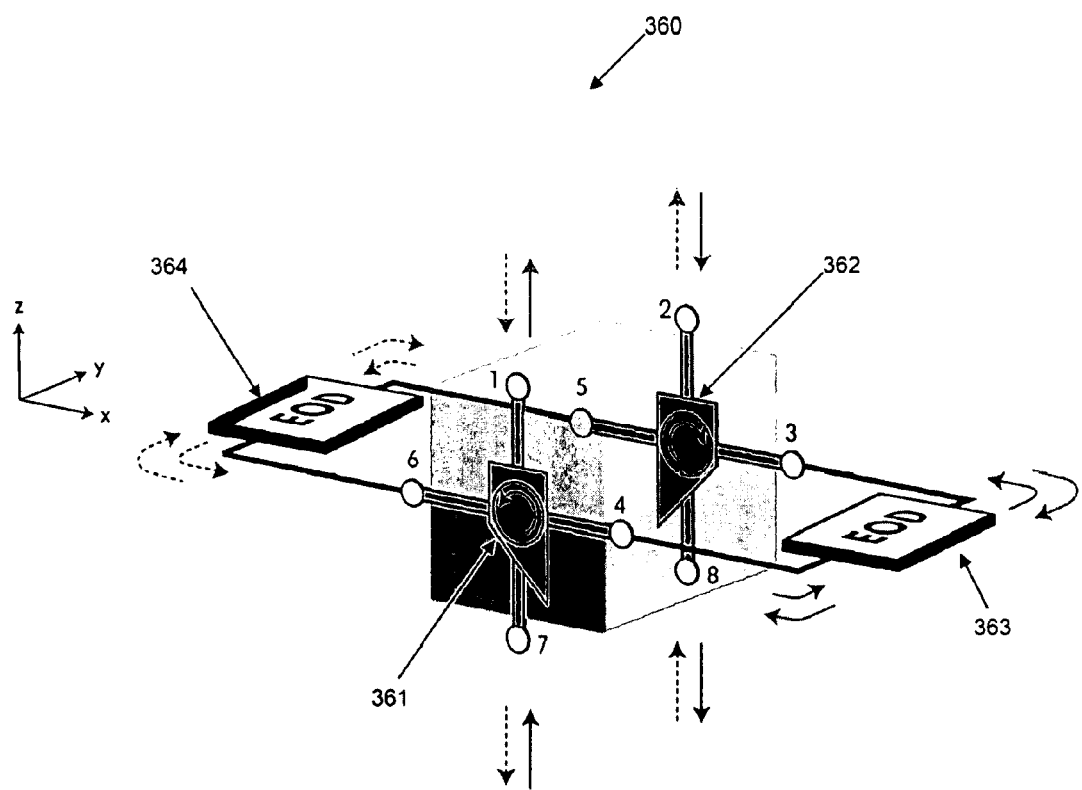
FIG. 55 is a schematic diagram of an 8-port circulator bypass with embedded optical devices connected in swap-mode according to one implementation of the invention.

To classify more generally a few configurations of the CB, a clearer topological diagram of an 8-port CB 360, with EODs 363, 364 connected in swap-mode, is shown in FIG. 55. One pair of BIO ports 1 and 2 is in the top half plane, while the other set of BIO ports 7 and 8 is in the bottom half plane. A CB 360 employing only one pair of BIO ports (e.g., in only the upper half plane in FIG. 55) is a unilateral circulator bypass ("UCB"), while one employing both pairs of BIO ports is a bilateral circulator bypass ("BCB"). The device 360 in FIG. 55 may also be generalized to trilateral and multilateral circulator bypass devices. By replacing each 4-port circulator 363, 364 with a 2N-port circulator, an N-lateral CB 360 is formed, if the ports on each circulator alternate as a BIO port and an EOD port, etc., by extension of FIG. 55, with N connected EODs.

Referring to FIG. 55, the device 360 may have both EODs 363, 364, or one EOD 363 or 364 may be a trivial delay line, and then this second trivial EOD 363 or 364 and associated connection ports may be absorbed as part of the CB 360. With two arbitrary EODs 363, 364, we have an 8-port BCB or 6-port UCB, and with only one non-trivial EOD 363 or 364, we have a 6-port BCB or a 4-port UCB.

2) Zero DPS Bypass Interferometers

It was stated above that bypass interferometers employing either a 180° DPS or a zero DPS in the interferometer arms could be used, but only examples using a 180° DPS were shown. All such examples correspond to embodiments of the universally balanced interferometer UBI type of bypass interferometer and therefore use swap-mode GMCBs. Described below are the less general set of bypass interferometers that may use a zero DPS, but have some advantages.

While UBIs, using 180° DPS, may have arbitrary SEs and CEs (see FIG. 1), a zero DPS may be used in bypass interferometer designs allowing a restricted set of SE and CE designs. Shown and described herein are some such configurations, using only Mach-Zehnder interferometer-type splitters and combiners.

Figure 56:
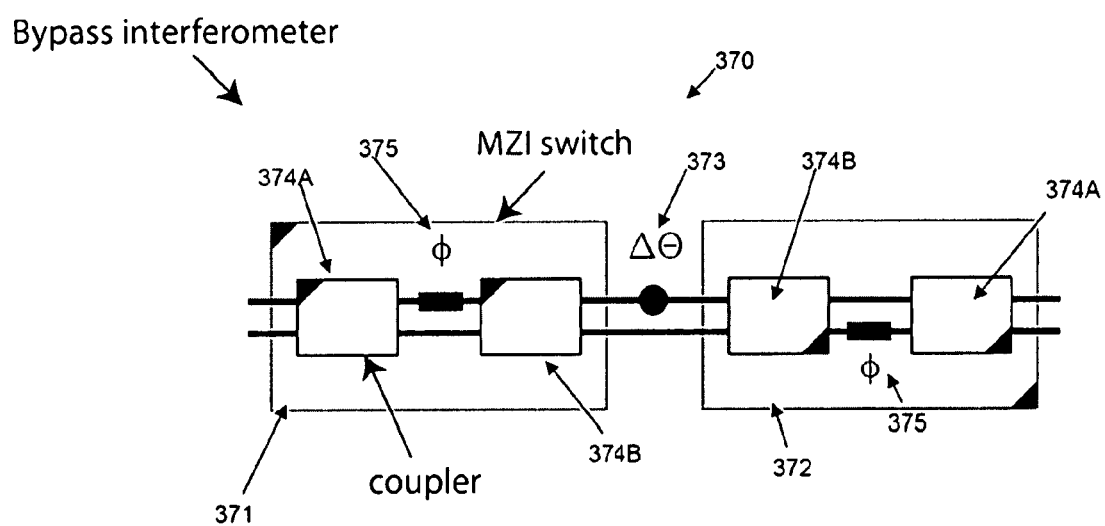
FIG. 56 is an illustration of a bypass interferometer according to one implementation of the invention, labeling various components of the interferometer whose configurations and symmetries are considered herein.

FIG. 56 identifies components of the interferometer 370 geometry to be described, including a substantially identical splitter 371 and combiner 372, separated by a DPS 373 of $\Delta\Theta$. The splitter 371 is not arbitrary, but itself contains two substantially identical coupler devices 374A, 374B, separated by a DPS 375 of $\phi$. In one embodiment, the phase $\phi$ is to remain arbitrary to allow switching of the splitter 371. The combiner 372 may be a translated copy of the splitter (T), a mirror image about a horizontal axis (H), a mirror image about a vertical-axis (V), or a 180° rotated copy (HV), as shown in FIG. 56. Similarly, within the splitter 371, the second coupler 374B may have T, H, V, or HV symmetry with respect to the first coupler 374A. Finally, each coupler 374A, 374B may have no geometrical symmetry, or be invariant with respect to an H, V, or HV transformation. The coupler 374A, 374B symmetry is illustrated by corner triangles on the box representing the coupler 374A, 374B. The phase 373 $\Delta\Theta=180°$ and $\Delta\Theta=0°$ are considered and the most general solution sought in each case.

Figure 57:
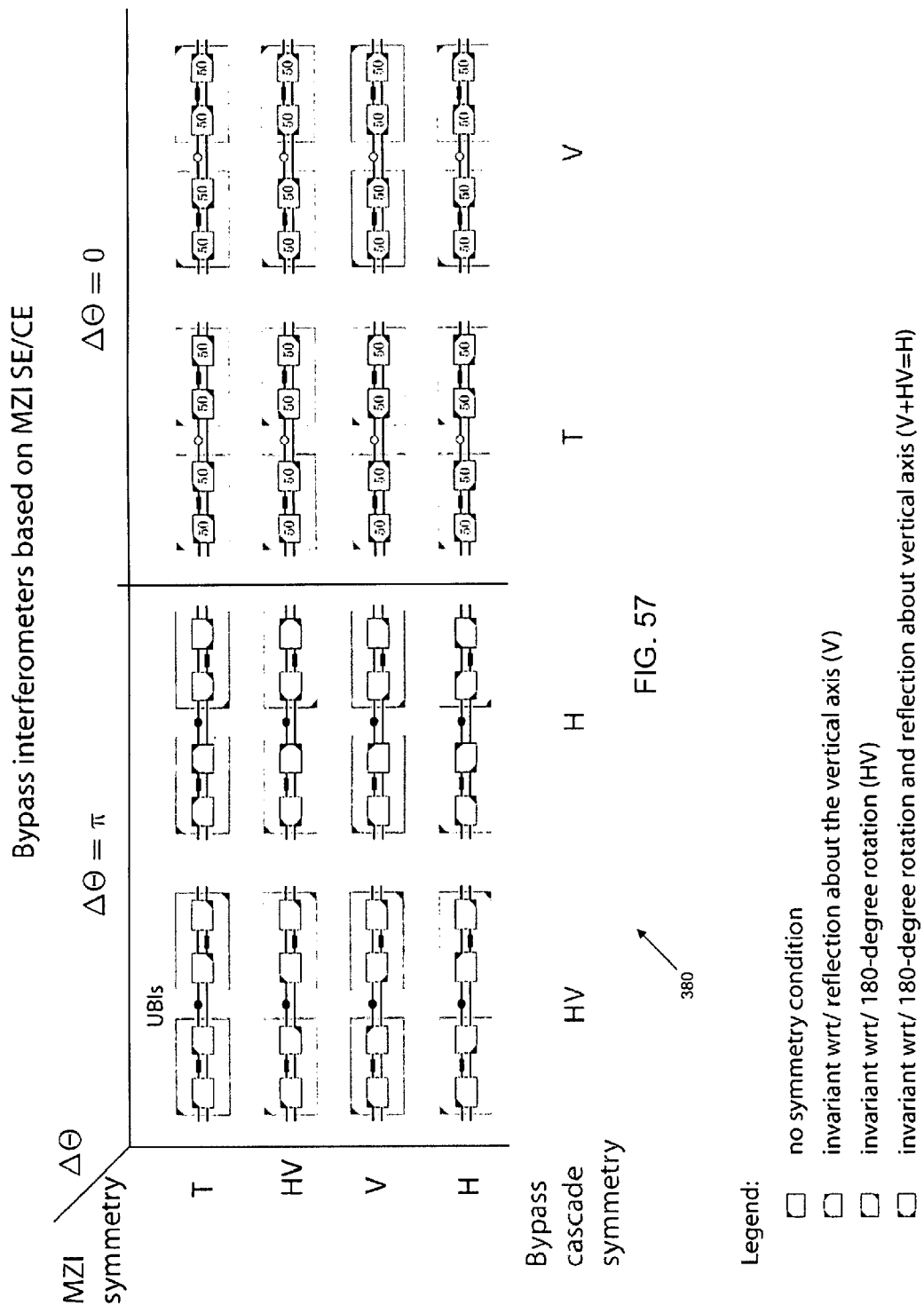
FIG. 57 is a table summarizing successful possible designs of the generic type bypass interferometer illustrated in FIG. 56, with respect to: allowed geometrical symmetries of the couplers, allowed relative geometrical symmetry of the second coupler with respect to the first coupler within the SE, and allowed relative geometrical symmetry of the total CE with respect to the total SE in the interferometer, for different choices of DPS between the SE and CE.

FIG. 57 shows working bypass interferometers (i.e., designs that have zero transmission to one of the two ports by symmetry for all configurations—parametrized by phase $\phi$—of the device). The table 380 shows working interferometers with the most general allowed symmetry of the coupler 374A, 374B for different symmetries between the splitter element 371 and combiner element 372 indexing the columns, and different symmetries between the second coupler 374B and the first coupler 374A (within the splitter element 371) indexing the rows. There are two sets of columns, one for ΔΘ=180° and one for ΔΘ=0°. There are no working designs for T or V symmetry between the splitter 371 and combiner 372 for ΔΘ=180° and no working designs at all for ΔΘ=0° for couplers 374A, 374B of completely arbitrary design. For ΔΘ=0° there are working designs only when the couplers 374A, 374B are restricted to have exactly a 50%:50% splitting ratio (as indicated in the table 180). Even then, there are no working designs for HV or H symmetry between the splitter 371 and combiner 372 for ΔΘ=0°.

For ΔΘ=180°, the HV column represents UBIs. UBIs work with arbitrary coupler 374A, 374B designs and arbitrary orientation. This is because the UBI geometry is even more general and the contents of the splitter element 371 may be arbitrary (so long as the reflectionless condition is maintained), rather than being restricted to a Mach-Zehnder geometry as was done in FIG. 57. A set of designs works with H symmetry between the splitter 371 and combiner 372, with more restricted coupler 374A, 374B geometries or arrangements, but one may observe (from the required coupler 374A, 374B symmetries) that they are equivalent to the HV cases and are all specific cases of UBIs. Thus, there are no designs shown for the ΔΘ=180° case that do not have the UBI geometry.

For ΔΘ=0°, the two most general designs are found highlighted in column 3, row 2 of the table 380, and in column 4, row 1 of the table 380. The first is most general and has arbitrary couplers 374A, 374B, HV symmetry between the first coupler 374A and the second coupler 374B, and T symmetry between the splitter 371 and the combiner 372. The second general case is different, requiring couplers 374A, 374B with H symmetry, but having T symmetry between the first coupler 374A and the second coupler 374B, and V symmetry between the splitter 371 and the combiner 372. The rest of the cases in column 3 and 4 of the table can be seen to be more restricted designs, equivalent to one of these two.

Transfer matrix analysis, based on generic matrix representations of the various device geometries, was used to generate the table 380 of working geometries shown in FIG. 57. A general substantially lossless coupler 374A, 374B was taken to have a transfer matrix of the form in eq. (1). For the cases using 3 dB couplers 374A, 374B (50%:50% splitting), $\theta_k=\pi/4$. The splitter element 371 transfer matrix results by multiplying the transfer matrix of the second coupler 374B, the propagation matrix between couplers 374A, 374B representing the control phase 375φ, and the transfer matrix of the first coupler 374A. The SE 371 transfer matrix also has the form of eq. (1). Finally, the complete bypass interferometer transfer matrix is the multiplication of the CE 372 transfer matrix, the transfer matrix of the ΔΘ DPS 373, and the SE 371 transfer matrix. Reciprocity is assumed for the study of the interferometers in FIG. 57. The form of the transfer matrices for couplers 374A, 374B, SEs 371 and CEs 372, and the complete bypass interferometer are restricted by symmetries. If the device is invariant with respect to an HV transformation, its transfer matrix has $\theta_1=0$. If the device is invariant with respect to a V transformation, its transfer matrix has $\theta_2=0$. If the device is invariant with respect to an H transformation, its transfer matrix has $\theta_1=\theta_2=0$. Furthermore, the transfer matrix of the second coupler 374B and of the CE 372 is determined from the transfer matrix of the first coupler 374A and of the SE 371, respectively, depending on their relative symmetry. The transfer matrix of a device obtained by an HV transformation of a first device is the diagonal transpose of that of the first device. The transfer matrix of a device obtained by a V transformation of a first device is the transpose of that of the first device. The transfer matrix of a device obtained by an H transformation of a first device is the transpose of the diagonal transpose of that of the first device.

The two generic designs that work with zero DPS in the interferometer arms are a more restricted family of devices than UBIs, where the splitter 371 and combiner 372 are completely general, but the symmetry of these devices gives rise to a second set of embodiments for folded bypass interferometers, using reflection-mode CBs, since the unfolded devices in FIG. 57 have T or V splitter/combiner symmetry, placing the phase shift φ in the top arm in both the splitter 371 and combiner 372. Some such embodiments are described next.

3) Embodiments Using Zero-DPS Bypass Interferometers and Reflection-Mode CBs

All previous examples made use of swap-mode CBs 360. Here, examples are added of embodiments using reflection-mode CBs 360, which are embodiments of zero-DPS bypass interferometers.

Figure 58:
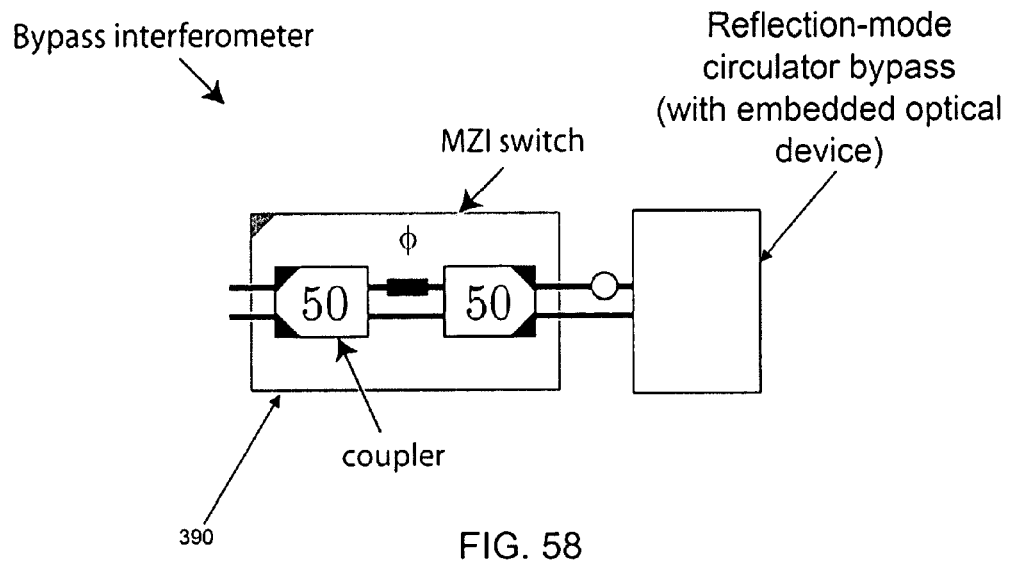
FIG. 58 is a schematic diagram of an SCE design for a reflection-mode bypass interferometer using a zero DPS and a reflection-mode GMCB, according to one implementation of the invention.
Figure 59:
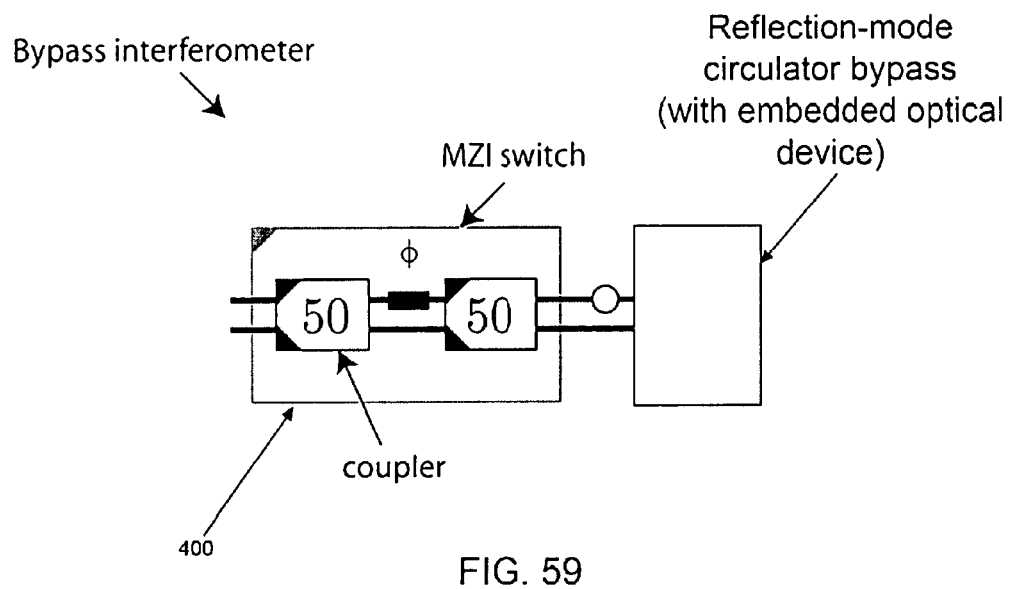
FIG. 59 is a schematic diagram of an SCE design for a reflection-mode bypass interferometer using a zero DPS and a reflection-mode GMCB, according to another implementation of the invention.

FIGS. 58 and FIG. 59 show two types of SCE designs 390, 400 permitted for zero-DPS folded bypass interferometers. FIG. 58 results from folding the first general case (column 3, row 2 of the table 380 illustrated in FIG. 57), while FIG. 59 results from folding the second general case (column 4, row 1 of the table 380 illustrated in FIG. 57).

Figure 60:
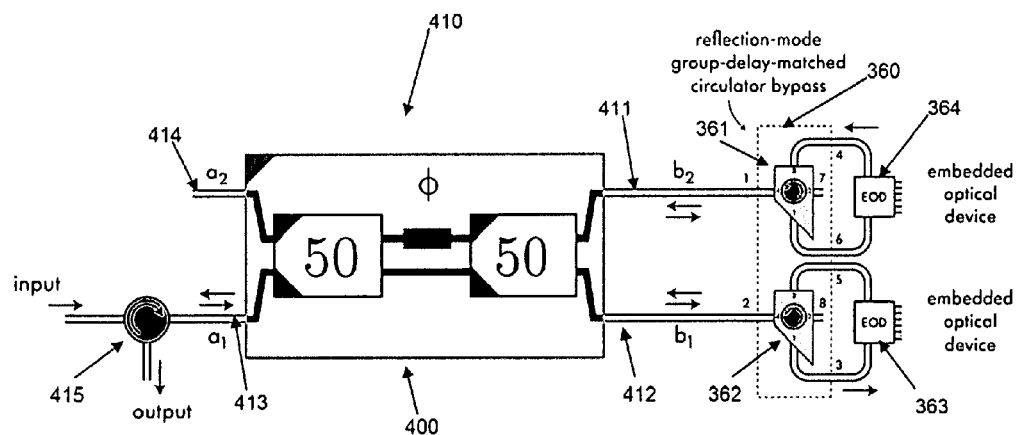
FIG. 60 is a schematic diagram of a reflection-mode bypass interferometer using a reflection mode GMCB, according to another implementation of the invention.

FIG. 60 is an illustration of a bypass interferometer 410 according to one implementation of the invention, exemplarily using an SCE 400 of the geometry shown in FIG. 59, and a reflection-mode 6-port UCB 360, with two EODs 363, 364 in general. The reflection-mode UCB 360 is the one illustrated in FIG. 54, but oriented to show explicitly the balancing of loss and group delay by symmetry in the top arm 411 and the bottom arm 412. In the bypass interferometer 410, at all wavelengths in the OWR of the interferometer 410, the EODs 363, 364 do not substantially affect the loss and phase difference between the top arm 411 and the bottom arm 412, or more generally they affect both in common-mode, i.e., equally in the top arm 411 and in the bottom arm 412. As a result, at all states φ of the switch 400, the output exits at the same port as the input, port 413. This is different from UBI-based bypass interferometers, where the output is in the opposite port 414. Here, a circulator 415 at the input may be used to separate the input and output into separate waveguides. The interferometer 410 is also different from a Sagnac interferometer in that the interferometer arms 411, 412 are not connected in a loop in this implementation and in that the two optical paths used in the interferometer 410 do not trace the same physical path (in two directions, as done in a Sagnac loop).

Figure 61:
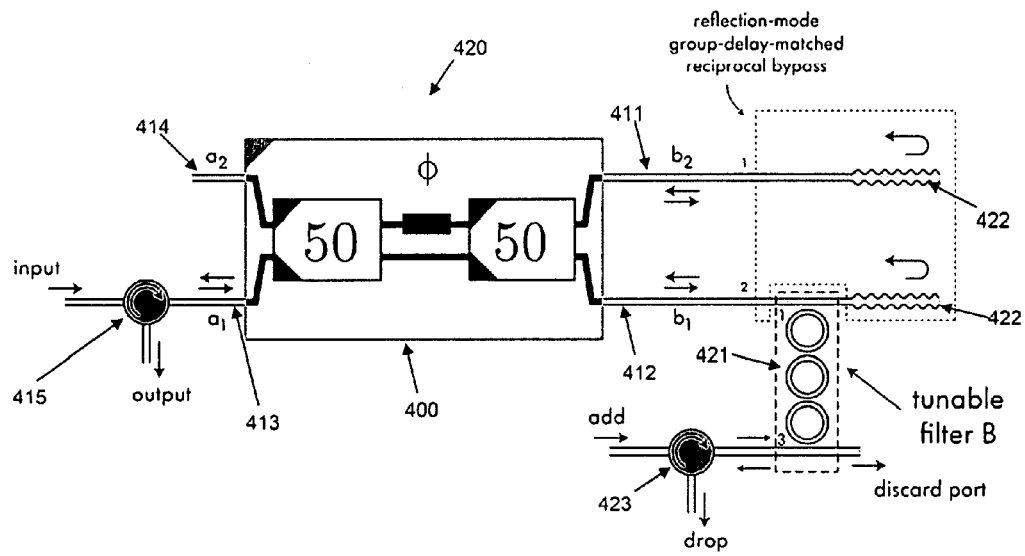
FIG. 61 is a schematic diagram of a hitless tunable filter using a folded bypass interferometer without circulators within the bypass circuit, according to one implementation of the invention.

In special cases, the reflection-mode CB 360 may be constructed without the use of circulators 361, 362 or non-reciprocal elements. FIG. 61 shows an embodiment of a hitless-tunable filter using a folded bypass interferometer 420, and an embedded EOD 421 being a microring-resonator filter in the bottom arm 412. Use of circulators 361, 362 is avoided by using reflectors 422, here illustrated as waveguide Bragg reflectors. However, as a result the EOD 421 is passed twice in the bottom arm 412, once in each direction. Thus, the device 420 is functionally equivalent to the device 260 depicted in FIG. 27, except that the filter 421 is effectively a two-stage 3-ring filter, such as the filter 208 in FIG. 36, because the through-port signal passes the filter 421 twice. Similar to the device 410 depicted in FIG. 60, the input and output (through) ports are separated by a circulator 415, and here in addition the add and drop ports may be separated by a circulator 423. The advantage of this embodiment is that no circulators 361, 362 are present within the interferometer 420, where optical lengths need to be carefully balanced. The circulators 415, 423 may even be off-chip, and no magneto-optical elements are needed on-chip.

Figure 62:
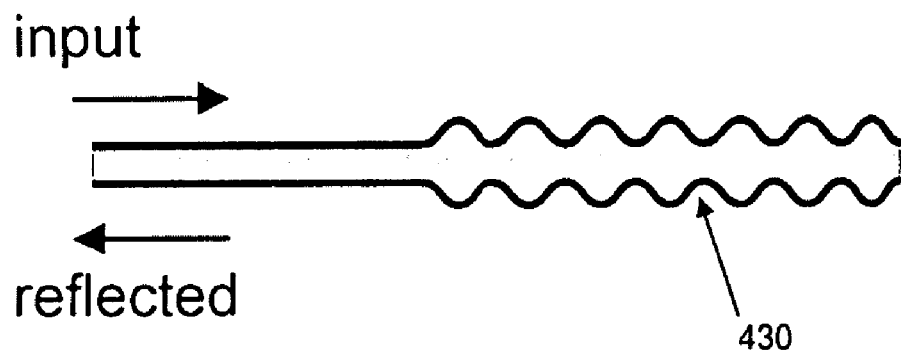
FIG. 62 is a schematic diagram of a side-corrugated waveguide Bragg reflector for use in accordance with one implementation of the invention.
Figure 63:
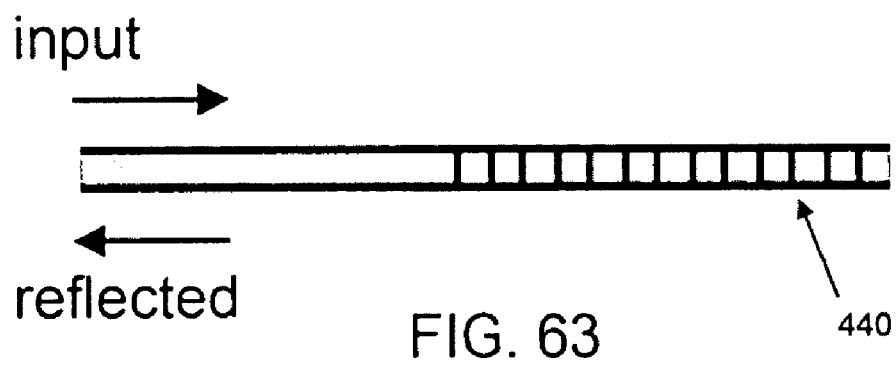
FIG. 63 is a schematic diagram of a waveguide top-surface-corrugated Bragg reflector for use in accordance with one implementation of the invention.
Figure 64:
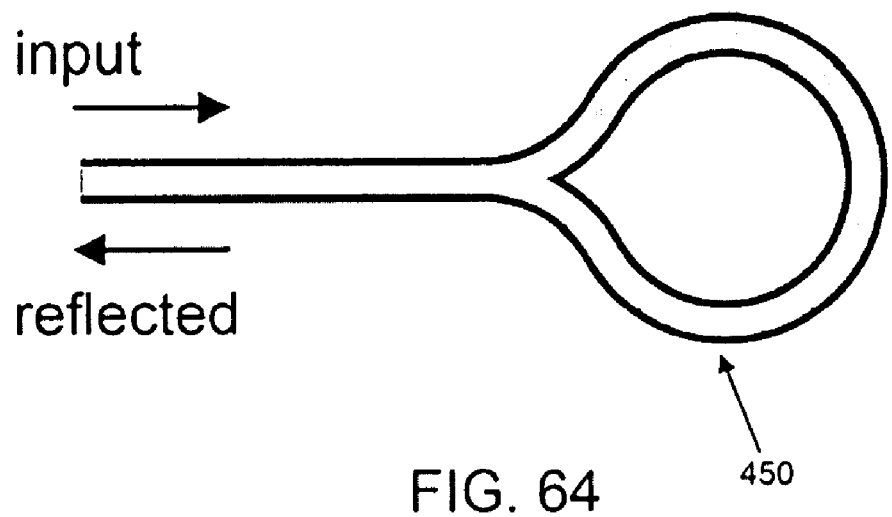
FIG. 64 is a schematic diagram of an integrated waveguide loop mirror for use in accordance with one implementation of the invention.

Reflectors 422 used in the embodiment depicted in FIG. 61 are exemplary. Any device reflecting a substantially high proportion of the input signal in the reverse direction in the waveguide, over the OWR of the bypass interferometer 420 and of the filter 421, will suffice. This includes, but is not limited to, a side-corrugated waveguide Bragg reflector 430 as depicted in FIG. 62, a waveguide top-surface-corrugated Bragg reflector 440 as depicted in FIG. 63 (which each have an optical periodicity of a half wavelength), and an integrated waveguide loop mirror 450, conceptually illustrated in FIG. 64, that promotes high reflection efficiency and bandwidth by symmetry.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. An interferometer system comprising:
    a first splitter/combiner element (SCE) having an input port, an output port, a first bi-directional port, and a second bi-directional port, the first SCE configured to (i) split an input signal received at the input port into a first portion of light for exit at the first bi-directional port and a second portion of light for exit at the second bi-directional port and (ii) combine signals received at the first and second bi-directional ports into an output signal at the output port;
    a first optical path for communicating the first portion of light from the first bi-directional port of the first SCE through an optical device and to the second bi-directional port of the first SCE at an operating wavelength; and
    a second optical path for communicating the second portion of light from the second bi-directional port of the first SCE through the optical device and to the first bi-directional port of the first SCE at the operating wavelength,
    wherein there is a non-overlapping portion, in the optical device, between the first and second optical paths such that the first and second portions of light split from the input signal by the first SCE among the first and second bi-directional ports always travel simultaneously along two at least partially non-overlapping paths, and wherein a substantial portion of the first portion of light at the operating wavelength that exits the first SCE through the first bi-directional port re-enters the first SCE through the second bi-directional port.

2. The system of claim 1 further comprising the optical device.

3. The system of claim 2, wherein the optical device is a group-delay-matched circulator bypass (GMCB).

4. The system of claim 3, wherein the GMCB comprises a first and second embedded optical device (EOD).

5. The system of claim 4, wherein the first optical path travels through the first EOD and the second optical path travels through the second EOD.

6. The system of claim 5, wherein the second EOD introduces a phase shift to a signal that propagates through the second optical path that is different from a phase shift introduced by the first EOD to a signal that propagates through the first optical path.

7. The system of claim 3, wherein the GMCB comprises at least one optical circulator.

8. The system of claim 2, wherein the optical device introduces a phase delay to a first signal propagating through the optical device from the first bi-directional port of the first SCE to the second bi-directional port of the first SCE that differs by approximately $(\pi+2\pi k)$ radians, k an integer, from the phase delay of a second signal propagating through the optical device from the second bi-directional port of the first SCE to the first bi-directional port of the first SCE.

9. The system of claim 2 further comprising a second SCE in communication with the optical device.

10. The system of claim 9, wherein the second SCE comprises an input port, an output port, a first bi-directional port, and a second bi-directional port, the second SCE configured to split an input signal received at the input port of the second SCE among the first and second bi-directional ports of the second SCE and to combine signals received at the first and second bi-directional ports of the second SCE into an output signal at the output port of the second SCE.

11. The system of claim 1, wherein a substantial portion of the second portion of light at the operating wavelength that exits the first SCE through the second bi-directional port re-enters the first SCE through the first bi-directional port.

12. The system of claim 11, wherein the first portion of light that exits the first SCE through the first bi-directional port and re-enters the first SCE through the second bi-directional port experiences a first phase shift spectrum and the second portion of light that exits the first SCE through the second bi-directional port and re-enters the first SCE through the first bi-directional port experiences a second phase shift spectrum, the first phase shift spectrum and the second phase shift spectrum differing by approximately π radians plus an integer multiple of $2\pi$ radians over an operating wavelength range of the interferometer system.

13. An interferometer system comprising:
    a splitter/combiner element (SCE) having a first bi-directional port, a second bi-directional port, and a third bi-directional port, the SCE configured to split an input signal received at the first bi-directional port among the second and third bi-directional ports and to always combine all signals received at the second and third bi-directional ports into an output signal that always exits the SCE through the first bi-directional port, the SCE having at least one of a time-variable or wavelength-variable switching state that varies the portion by which the input signal is split between the second and third bi-directional ports;
    a first optical path for bi-directionally communicating light between the second bi-directional port of the SCE and a first reflective optical device;

a second optical path for bi-directionally communicating light between the third bi-directional port of the SCE and a second reflective optical device; and a wavelength-selective device, separate from the first and second reflective optical devices, in one of the first and second optical paths, wherein the first and second optical paths are not connected in a loop, a substantial portion of light at least one wavelength that exits the SCE through the second bi-directional port re-enters the SCE through the second bi-directional port, a substantial portion of light at said at least one wavelength that exits the SCE through the third bi-directional port re-enters the SCE through the third bi-directional port, and the phase shift of a first signal accumulated by propagating in the first optical path from the SCE, to the first reflective optical device, and back to the SCE and the phase shift of a second signal accumulated by propagating in the second optical path from the SCE, to the second reflective optical device, and back to the SCE are substantially equal or differ by a multiple of $2\pi$ radians at said at least one wavelength.

14. The system of claim 13, wherein at least one of the first and second reflective optical devices comprises a reflector.

15. The system of claim 13 further comprising an optical circulator coupled to the first bi-directional port.

16. The system of claim 13, wherein the wavelength-selective device comprises a filter.

17. The system of claim 13, wherein the wavelength-selective device comprises a resonator.

18. The system of claim 13, wherein at least one of the first and second reflective optical devices comprises a side-corrugated waveguide Bragg reflector.

19. The system of claim 13, wherein at least one of the first and second reflective optical devices comprises a waveguide top-surface-corrugated Bragg reflector.

20. The system of claim 13, wherein at least one of the first and second reflective optical devices comprises an integrated waveguide loop mirror.

* * * * *

UNITED STATES PATENT AND TRADEMARK OFFICE
CERTIFICATE OF CORRECTION

PATENT NO.        : 8,111,994 B2
APPLICATION NO.   : 11/840028
DATED             : February 7, 2012
INVENTOR(S)       : Milos Popovic It is certified that error appears in the above-identified patent and that said Letters Patent is hereby corrected as shown below:

In Claim 12, column 32, line 49, please delete "it radians" and insert --π radians--.

In Claim 13, column 33, line 8, please delete "light at least" and insert --light at at least--.

Signed and Sealed this
Twentieth Day of March, 2012

David J. Kappos
*Director of the United States Patent and Trademark Office*